US009891337B2

(12) United States Patent
Olsson et al.

(10) Patent No.: US 9,891,337 B2
(45) Date of Patent: Feb. 13, 2018

(54) UTILITY LOCATOR TRANSMITTER DEVICES, SYSTEMS, AND METHODS WITH DOCKABLE APPARATUS

(71) Applicants: Mark S. Olsson, La Jolla, CA (US); Jesse O. Casares, El Cajon, CA (US); Jan Soukup, San Diego, CA (US); Stephanie M. Bench, Carlsbad, CA (US); Justin W. Taylor, Flagstaff, AZ (US); Ray Merewether, La Jolla, CA (US); David A. Cox, San Diego, CA (US)

(72) Inventors: Mark S. Olsson, La Jolla, CA (US); Jesse O. Casares, El Cajon, CA (US); Jan Soukup, San Diego, CA (US); Stephanie M. Bench, Carlsbad, CA (US); Justin W. Taylor, Flagstaff, AZ (US); Ray Merewether, La Jolla, CA (US); David A. Cox, San Diego, CA (US)

(73) Assignee: SEESCAN, INC., San Diego, CA (US)

(*) Notice: Subject to any disclaimer, the term of this patent is extended or adjusted under 35 U.S.C. 154(b) by 533 days.

(21) Appl. No.: 14/332,268

(22) Filed: Jul. 15, 2014

(65) Prior Publication Data

US 2015/0077120 A1    Mar. 19, 2015

Related U.S. Application Data

(60) Provisional application No. 61/859,738, filed on Jul. 29, 2013, provisional application No. 61/846,565, filed on Jul. 15, 2013.

(51) Int. Cl.
  *G01V 3/08* (2006.01)
  *G01V 3/10* (2006.01)
  *G01V 3/02* (2006.01)

(52) U.S. Cl.
  CPC .............. *G01V 3/02* (2013.01); *G01V 3/081* (2013.01); *G01V 3/088* (2013.01)

(58) Field of Classification Search
  CPC ... G01V 3/02; G01V 3/04; G01V 3/06; G01V 3/08; G01V 2003/084; G01V 3/081;
  (Continued)

(56) References Cited

U.S. PATENT DOCUMENTS 4,945,305 A * 7/1990 Blood .................... F41G 3/225
                                                              324/207.11
5,055,793 A * 10/1991 Mulcahey ................ G01V 3/06
                                                              324/326

(Continued)

OTHER PUBLICATIONS

International Searching Authority, "Written Opinion of the International Searching Authority" for PCT Patent Application No. PCT/US14/046760, May 6, 2015, European Patent Office, Munich.

*Primary Examiner* — Jermele M Hollington
*Assistant Examiner* — Sean Curtis
(74) *Attorney, Agent, or Firm* — Steven C. Tietsworth, Esq.

(57) ABSTRACT

Buried utility transmitters and associated locator devices, systems, and methods used for locating utility lines, pipes, and/or other conductors that are obscured from view are disclosed. In one embodiment a buried utility transmitter includes a module generating an output current for provision to the utility so as to generate a magnetic field for detection by a utility locator, with the output current signal having modulated signaling. The transmitter system may include a tray apparatus configured to be removably dockable to the transmitter module or element or a body or frame of the transmitter system.

27 Claims, 44 Drawing Sheets

(58) Field of Classification Search
CPC . G01V 3/083; G01V 3/10; G01V 3/15; G01V 3/16; G01V 3/165; G01V 3/101; G01V 3/102; G01V 3/104; G01V 3/105; G01V 3/107; G01V 3/108; G01V 3/088
USPC ............... 324/326, 329, 354, 332, 357, 360
See application file for complete search history.

(56) References Cited

U.S. PATENT DOCUMENTS

| | | | |
|---|---|---|---|
| 5,231,355 A | 7/1993 | Rider et al. | |
| 5,264,795 A | 11/1993 | Rider | |
| 5,361,029 A | 11/1994 | Rider et al. | |
| 6,768,307 B2* | 7/2004 | Brune | E21B 47/024 175/45 |
| 6,791,329 B2* | 9/2004 | Nelson | G01V 3/105 324/329 |
| 6,838,881 B2* | 1/2005 | Mercer | E21B 47/02216 324/326 |
| 7,009,399 B2* | 3/2006 | Olsson | G01V 3/15 324/326 |
| 7,057,383 B2* | 6/2006 | Schlapp | G01V 3/088 324/326 |
| 7,276,910 B2* | 10/2007 | Prsha | G01V 3/088 324/326 |
| 7,288,929 B2* | 10/2007 | Prsha | G01V 3/081 324/127 |
| 7,356,421 B2* | 4/2008 | Gudmundsson | G01V 3/081 324/207.11 |
| 7,372,276 B2* | 5/2008 | Mulcahey | G01V 3/08 324/326 |
| 7,443,154 B1* | 10/2008 | Merewether | G01V 3/104 324/326 |
| 7,518,374 B1* | 4/2009 | Olsson | G01V 3/15 324/260 |
| 7,619,516 B2* | 11/2009 | Olsson | G01S 7/03 324/329 |
| 7,642,784 B2* | 1/2010 | Reddig | G01V 3/083 324/329 |
| 7,825,647 B2* | 11/2010 | Olsson | G01V 3/081 324/326 |
| 7,830,149 B1* | 11/2010 | Olsson | G01S 7/03 324/326 |
| 7,990,151 B2* | 8/2011 | Olsson | G01R 19/00 324/326 |
| 8,188,745 B2* | 5/2012 | Overby | G01V 3/12 324/326 |
| 8,248,056 B1* | 8/2012 | Olsson | G01R 29/0871 324/228 |
| 8,264,226 B1* | 9/2012 | Olsson | G01V 3/15 324/326 |
| 9,158,024 B2* | 10/2015 | Overby | G01V 3/12 |
| 9,207,350 B2* | 12/2015 | Olsson | G01V 3/104 |
| 9,435,907 B2* | 9/2016 | Olsson | G01V 3/081 |
| 2003/0034778 A1* | 2/2003 | Nelson | G01V 3/105 324/329 |
| 2004/0070535 A1* | 4/2004 | Olsson | G01S 7/03 342/459 |
| 2005/0128125 A1* | 6/2005 | Li | F41H 11/12 342/22 |
| 2006/0091888 A1* | 5/2006 | Holman | G01V 3/15 324/326 |
| 2006/0181280 A1* | 8/2006 | Mulcahey | G01V 3/08 324/326 |
| 2007/0018649 A1* | 1/2007 | Prsha | G01V 3/088 324/326 |
| 2008/0111553 A1* | 5/2008 | Mulcahey | G01V 3/08 324/326 |
| 2010/0002365 A1* | 1/2010 | Mulcahey | G01V 3/08 361/679.01 |
| 2010/0141261 A1* | 6/2010 | Overby | G01V 3/12 324/329 |
| 2011/0006772 A1* | 1/2011 | Olsson | G01V 3/15 324/326 |
| 2011/0024459 A1 | 2/2011 | Smrt et al. | |
| 2012/0232800 A1* | 9/2012 | Overby | G01V 3/12 702/7 |
| 2012/0242341 A1* | 9/2012 | Olsson | G01V 3/15 324/326 |
| 2013/0200901 A1* | 8/2013 | Olsson | G01V 3/081 324/326 |
| 2013/0207791 A1* | 8/2013 | Olsson | G01V 3/12 340/407.1 |
| 2014/0012505 A1* | 1/2014 | Smith | G01V 3/12 702/2 |
| 2014/0132269 A1* | 5/2014 | Olsson | G01V 3/10 324/326 |
| 2014/0159729 A1* | 6/2014 | Olsson | G01V 3/08 324/326 |
| 2014/0167765 A1* | 6/2014 | Olsson | G01V 3/08 324/329 |
| 2014/0191759 A1* | 7/2014 | Olsson | G01V 3/08 324/329 |
| 2014/0266213 A1* | 9/2014 | Olsson | G01V 3/17 324/329 |
| 2014/0312903 A1* | 10/2014 | Olsson | G01V 3/102 324/326 |
| 2014/0340086 A1* | 11/2014 | Olsson | G01V 3/38 324/326 |
| 2015/0077120 A1* | 3/2015 | Olsson | G01V 3/081 324/326 |
| 2015/0123664 A1* | 5/2015 | Olsson | G01V 3/15 324/326 |
| 2015/0204995 A1* | 7/2015 | Olsson | G01V 3/15 324/329 |
| 2015/0355363 A1* | 12/2015 | Merewether | G01V 3/101 324/329 |
| 2016/0097873 A1* | 4/2016 | Haddy | G01R 31/021 324/326 |
| 2016/0141766 A1* | 5/2016 | Olsson | H01Q 7/00 343/728 |
| 2016/0187522 A1* | 6/2016 | Olsson | G01V 3/104 324/326 |
| 2017/0115424 A1* | 4/2017 | Olsson | G01V 3/10 |
| 2017/0235010 A1* | 8/2017 | Olsson | G01V 3/104 324/326 |
| 2017/0307670 A1* | 10/2017 | Olsson | G01R 29/085 |

* cited by examiner

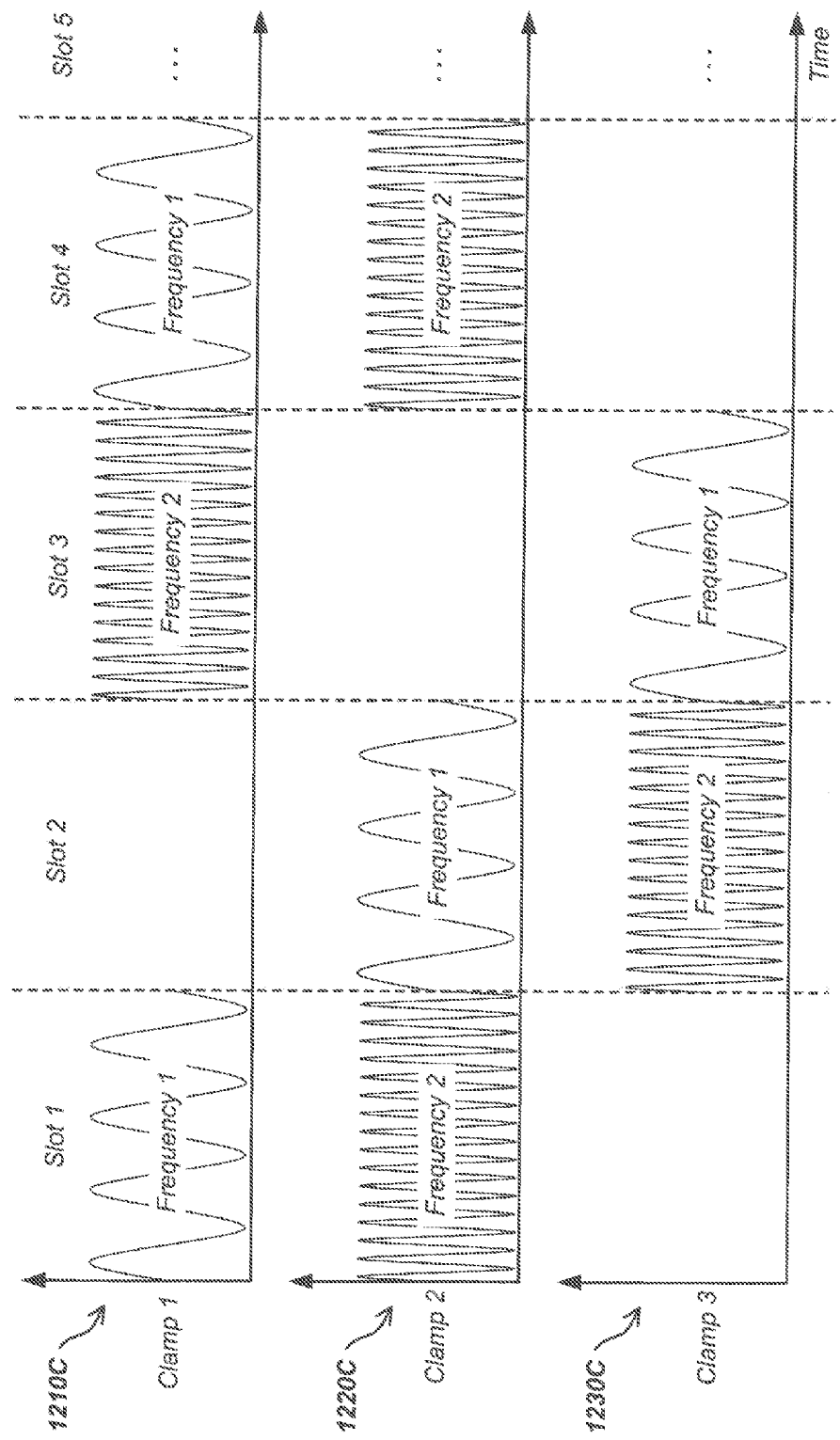

FIG. 20  Example Buried Utility Transmitter Module Embodiment

*Example Embodiment of Multi-frequency Output Signal Waveform Generation*

Example Embodiment of Multi-Output Signal Generation
(Either the Same or Different Frequencies and/or Amplitudes on Each Output)

Example Embodiment of Multi-frequency Output Signal Generation with Combined Output Signal

2500

| | Low/Base Freq. (Hz) | Med. Freq. (Hz) | High Freq. (Hz) | Very High Freq. (Hz) | Color Code | Utility Type | Base Freq. Increment |
|---|---|---|---|---|---|---|---|
| 1 | 690 | 8,730 | 79,770 | 488,130 | Red | Electric | 20 |
| 2 | 710 | 8,750 | 79,790 | 488,150 | Orange 1 | Telco 1 | 20 |
| 3 | 730 | 8,770 | 79,810 | 488,170 | Orange 2 | Telco 2 | 20 |
| 4 | 750 | 8,790 | 79,830 | 488,190 | Yellow | Gas | 60 |
| 5 | 810 | 8,850 | 79,890 | 488,250 | Green | Sewer | 20 |
| 6 | 830 | 8,870 | 79,910 | 488,270 | Blue | Water | 20 |
| 7 | 850 | 8,890 | 79,930 | 488,290 | Purple | Recycle | 20 |
| 8 | 870 | 8,910 | 79,950 | 488,310 | Pink | Sewer | 60 |
| | | | | | | | |
| $S_1$ | 930 | 8,970 | 80,010 | 488,370 | | Sondes | 20 |
| $I_1$ | 950 | 8,990 | 80,030 | 488,390 | | Induction | 20 |
| $I_2$ | 970 | 9,010 | 80,050 | 488,410 | | Induction | 20 |
| $I_3$ | 990 | 9,030 | 80,070 | 488,430 | | Induction | 20 |

*FIG. 25*

*Example Utility/Frequency Table For Multi-Frequency Operation*
*(60 Hz, 300 Hz Span)*
*(Frequencies Selected to Avoid 60 Hz Power Harmonics)*

2600

| | Low/Base Freq. (Hz) | Med. Freq. (Hz) | High Freq. (Hz) | Very High Freq. (Hz) | Color Code | Utility Type |
|---|---|---|---|---|---|---|
| 1 | 676 | 8,676 | 79,776 | 132,776 | Red | Electric |
| 2 | 692 | 8,692 | 79,792 | 132,792 | Orange 1 | Telco 1 |
| 3 | 708 | 8,708 | 79,808 | 132,808 | Orange 2 | Telco 2 |
| 4 | 724 | 8,724 | 79,824 | 132,824 | Yellow | Gas |
| 5 | 776 | 8,776 | 79,876 | 132,876 | Green | Sewer |
| 6 | 792 | 8,792 | 79,892 | 132,892 | Blue | Water |
| 7 | 808 | 8,808 | 79,908 | 132,908 | Purple | Recycle |
| 8 | 824 | 8,824 | 79,924 | 132,924 | Pink | Survey |
| | | | | | | |
| $S_1$ | 876 | 8,876 | 79,976 | 132,976 | | Sondes |
| $I_1$ | 892 | 8,892 | 79,992 | 132,992 | | Induction |
| $I_2$ | 908 | 8,908 | 80,008 | 133,008 | | Induction |
| $I_3$ | 924 | 8,924 | 80,024 | 133,024 | | Induction |

*Example Utility/Frequency Table*
*(60 Hz, 300 Hz Span)*

UTILITY LOCATOR TRANSMITTER DEVICES, SYSTEMS, AND METHODS WITH DOCKABLE APPARATUS

CROSS-REFERENCE TO RELATED APPLICATIONS

This application claims priority under 35 U.S.C. § 119(e) to co-pending U.S. Provisional Patent Application Ser. No. 61/846,565, entitled UTILITY LOCATOR TRANSMITTER DEVICES, SYSTEMS, AND METHODS WITH DOCKABLE APPARATUS, filed on Jul. 15, 2013, and to co-pending U.S. Provisional Patent Application Ser. No. 61/859,738, entitled UTILITY LOCATOR TRANSMITTER DEVICES, SYSTEMS, AND METHODS WITH DOCKABLE APPARATUS, filed on Jul. 29, 2013. The content of each of these applications is incorporated by reference herein in its entirety for all purposes.

FIELD

This disclosure relates generally to transmitter and associated locator devices, systems, and methods used for locating utility lines, pipes, and/or other conductors that are obscured from view. More specifically, but not exclusively, this disclosure relates to transmitter devices, systems, and methods used to provide current signals to utility lines, pipes, and/or other conductors so that the conductors generate magnetic fields, along with utility locator devices and systems used for sensing such signals.

BACKGROUND

Buried utility locators (also denoted for brevity as "buried object locators" or just "locators") are devices for sensing magnetic fields emitted from hidden or buried conductors (e.g., underground utilities such as pipes, conduits, or cables), and processing the received signals to determine information about the conductors and the associated underground environment.

While some buried utilities are electrically energized (e.g., underground power cables) or carry currents coupled from radio signals or other electromagnetic radiation, in some buried utility location operations (also denoted herein as a "locate" for brevity) currents are coupled, either directly, inductively, or capacitively, from a buried utility transmitter (also denoted herein as a "transmitter" for brevity). These transmitters are configured to generate output current signals at predefined frequencies, phases, duty cycles, and/or having other signal characteristics of use in locating operations, and then couple the output current signals to the buried utility via a direct contact, and/or via inductive or capacitive coupling.

Existing transmitter devices typically lack the ability to communicate information with other locate system tools such as buried utility locators. Furthermore, existing systems including a transmitter device may require a user to transport a wide array of tools during the locate operation. These tools may be numerous and burdensome for a user to carry, however, they are commonly carried around by hand by a user or in a bag with various other items.

Accordingly, there is a need in the art to address the above-described as well as other problems.

SUMMARY

The present disclosure relates generally to transmitter and locator devices, systems, and methods used to induce signals on utility lines, pipes, and/or other conductors during utility locating operations. A transmitter device in keeping with aspects of the present disclosure may be configured to generate output current signals at one or more frequencies and then couple these current signals to hidden or buried utilities so that other system devices, such as a corresponding utility locator device, can sense the corresponding emitted magnetic field signals. The locator may then process the received magnetic field signals to determine information about the buried utility, such as depth, position or orientation, presence of other utilities/conductors, ground conditions, and other related information. Received magnetic field signals may be processed in conjunction with a model and/or other signals, such as location or positional signals, inertial sensor signals, reference time signals, and/or other sensor signals or data to generate the information about the buried utility.

In one aspect, the disclosure relates to a transmitter system for providing current to a utility when performing a locate operation. The transmitter system may, for example, include a transmitter module or transmitter element for generating an output current for provision to the utility so as to generate a magnetic field for detection by a utility locator. The transmitter system may include a tray apparatus configured to be removably dockable to the transmitter module or element or a body or frame of the transmitter system.

In another aspect, the disclosure relates to a tray apparatus configured to be removably dockable to a transmitter module or element or a body or frame of a transmitter system.

In another aspect, the disclosure relates to a transmitter module element for generating an output current for provision to the utility so as to generate a magnetic field for detection by a utility locator.

Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying drawings, wherein:

FIG. 12C is a diagram of another example embodiment of a time multiplexing scheme of frequencies.

FIG. 25 illustrates details of one embodiment of a multi-frequency output current frequency table for use in environments with 60 Hz power.

DETAILED DESCRIPTION OF EMBODIMENTS

Overview

Figure 1:
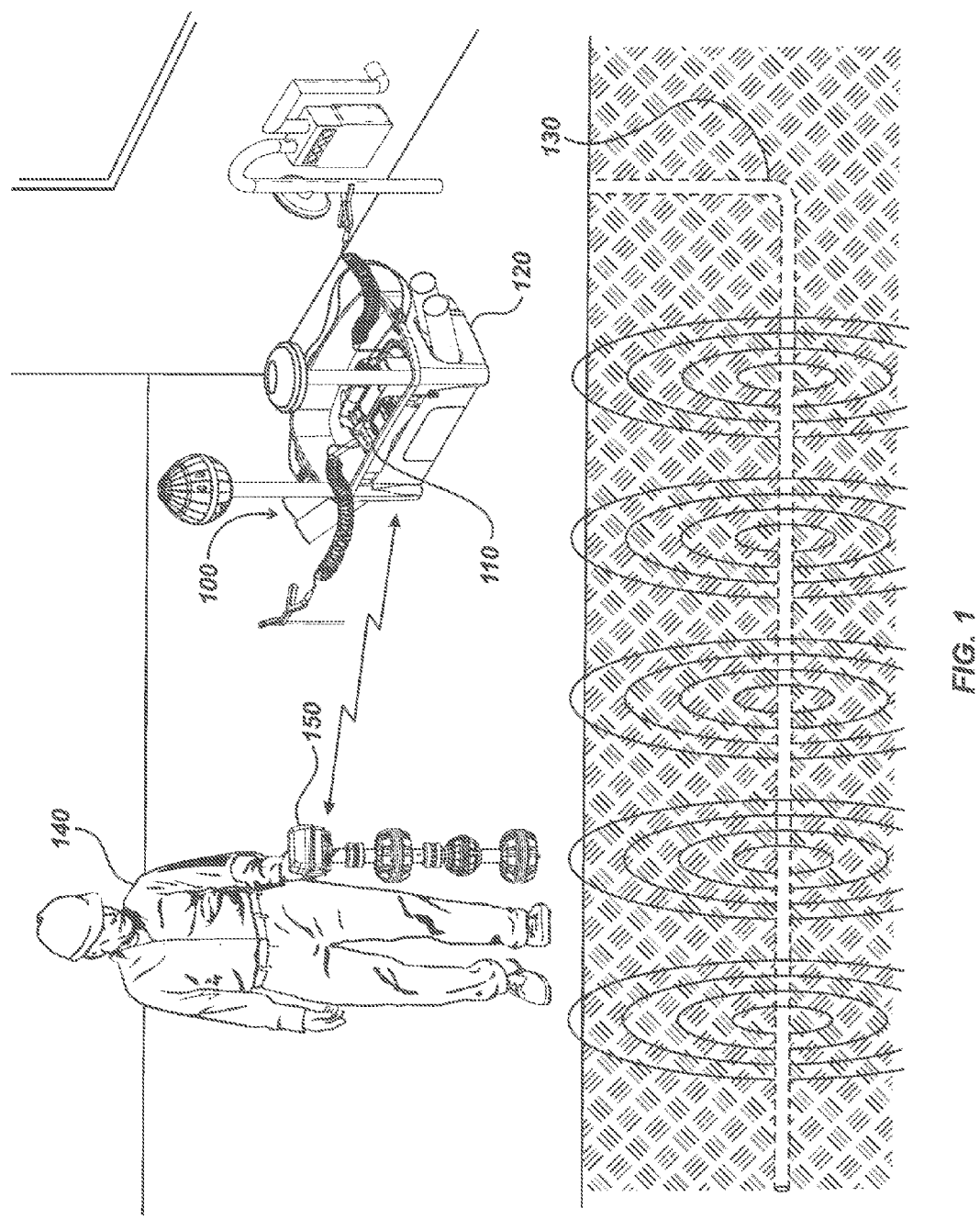
FIG. 1 is an illustration of a system using an embodiment of a transmitter device with dockable tray apparatus.

The present disclosure relates generally to transmitter and locator devices, systems, and methods used to induce signals on utility lines, pipes, and/or other conductors during utility locating operations. A transmitter device in keeping with aspects of the present disclosure may be configured to generate output current signals at one or more frequencies and then couple these current signals to hidden or buried utilities so that other system devices, such as a corresponding utility locator device, can sense the corresponding emitted magnetic field signals. The locator may then process the received magnetic field signals to determine information about the buried utility, such as depth, position or orientation, presence of other utilities/conductors, ground conditions, and other related information. Received magnetic field signals may be processed in conjunction with a model and/or other signals, such as location or positional signals, inertial sensor signals, reference time signals, and/or other sensor signals or data to generate the information about the buried utility.

The disclosures herein may be combined in various embodiments with the disclosures in co-assigned patents and patent applications, including transmitter and locator devices and associated apparatus, systems, and methods, as are described in U.S. Pat. No. 7,009,399, entitled OMNI-DIRECTIONAL SONDE AND LINE LOCATOR, issued Mar. 7, 2006, U.S. Pat. No. 7,443,154, entitled MULTI-SENSOR MAPPING OMNIDIRECTIONAL SONDE AND LINE LOCATOR, issued Oct. 28, 2008, U.S. Pat. No. 7,518,374, entitled RECONFIGURABLE PORTABLE LOCATOR EMPLOYING MULTIPLE SENSOR ARRAY HAVING FLEXIBLE NESTED ORTHOGONAL ANTENNAS, issued Apr. 14, 2009, U.S. Pat. No. 7,288,929, entitled INDUCTIVE CLAMP FOR APPLYING SIGNAL TO BURIED UTILITIES, issued Oct. 30, 2007, U.S. Pat. No. 7,276,910, entitled A COMPACT SELF-TUNED ELECTRICAL RESONATOR FOR BURIED OBJECT LOCATOR APPLICATIONS, issued Oct. 2, 2007, U.S. Pat. No. 7,990,151, entitled TRI POD BURIED LOCATOR SYSTEM, issued Aug. 2, 2011, U.S. Pat. No. 7,825,647, entitled COMPACT LINE ILLUMINATOR FOR LOCATING BURIED PIPES AND CABLES, issued Nov. 2, 2010, U.S. Pat. Nos. 8,264,226, 7,619,516, entitled SINGLE AND MULTI-TRACE OMNIDIRECTIONAL SONDE AND LINE LOCATORS AND TRANSMITTERS USED THEREWITH, issued Nov. 17, 2009, U.S. Pat. No. 8,264,226, entitled SYSTEM AND METHOD FOR LOCATING BURIED PIPES AND CABLES WITH A MAN PORTABLE LOCATOR AND A TRANSMITTER IN A MESH NETWORK, issued Sep. 11, 2012, U.S. Provisional Patent Application entitled OMNIDIRECTIONAL SONDE AND LINE LOCATOR, issued Mar. 7, 2006, U.S. Pat. No. 8,248,056, entitled A BURIED OBJECT LOCATOR SYSTEM EMPLOYING AUTOMATED VIRTUAL DEPTH EVENT DETECTION AND SIGNALING, issued Aug. 21, 2012, U.S. Provisional Patent Application Ser. No. 61/618, 746, entitled DUAL ANTENNA SYSTEMS WITH VARIABLE POLARIZATION, filed Mar. 31, 2012, U.S. patent application Ser. No. 13/570,211, entitled PHASE-SYN- CHRONIZED BURIED OBJECT LOCATOR APPARATUS, SYSTEM, AND METHODS, filed Aug. 8, 2012, U.S. patent application Ser. No. 13/469,024, entitled BURIED OBJECT LOCATOR APPARATUS AND SYSTEMS, filed May 10, 2012, U.S. patent application Ser. No. 13/676,989, entitled QUAD-GRADIENT COILS FOR USE IN A LOCATING SYSTEM, filed Nov. 11, 2012, U.S. Provisional Patent Application Ser. No. 61/859,718, entitled INDUCTIVE CLAMP DEVICES, SYSTEMS, and METHODS, filed Jul. 29, 2013, and U.S. Provisional Patent Application Ser. No. 61/485,078, entitled LOCATOR ANTENNA CONFIGURATION, filed on May 11, 2011. The content of each of these applications is incorporated by reference herein in its entirety (these applications may be collectively denoted herein as the "incorporated applications").

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure.

In one aspect, the disclosure relates to a buried utility transmitter system with a rechargeable battery system including one or more batteries, which may be intelligent batteries. The rechargeable batteries may be upward facing when coupled on the transmitter system and may indicate the charge status of the battery. In some embodiments, the charge status may be indicated on the battery itself.

In another aspect, the disclosure relates to a transmitter module or element in keeping with aspects of the disclosure that is configured to connect multiple output devices, such as one or more of inductive devices, capacitive devices, and/or direct contact coupling devices simultaneously. For example, a transmitter may include various jacks for connecting different inductive clamps, spring loaded direct contact clips, and/or other current coupling devices. A data link communication between the transmitter and each connected induction device may be established to identify the device and to exchange data with the device during operation.

In another aspect, the disclosure relates to a transmitter module or element configured to induce an output signal or signals at multiple frequencies and/or at multiple phase angles and/or at different or varying amplitudes. These frequencies may, when used with a correspondingly enabled locating system, be multiplexed in time and/or frequency. Various switching methods may be used with an enabled locator or other system devices to allow for time and/or phase synchronization. Communication signals between an enabled locator and transmitter may be used to communicate data or information usable to provide phase synchronization. Additional data, such as global navigation system (GNS) data, such as data from a GPS or other positioning system or timing communication system signals, may also be used to facilitate phase synchronization between the transmitter and an enabled locator. The switching of frequencies may be adaptive whereby the transmitted frequency or frequencies may be determined by the nearest utility.

In another aspect, the disclosure relates to a clamp configured to indicate orientation by which the clamp may be correctly applied to a utility, pipe, and/or other conductor to allow for phase synchronization with the induced signal from the transmitter device.

In another aspect, the disclosure relates to a transmitter module or element including one or more sensors or devices such as, but not limited to, receivers for global navigation systems (GNS) which may be global positioning satellite (GPS) receivers, Bluetooth, and industrial, scientific and medical (ISM) radio transceivers. In embodiments utilizing GPS or other GNS receivers, the receiver may be used to time sync the transmitter as well as other system devices. The time sync may synchronize with multiple spaced apart frequencies but still be phase locked to the receiver(s) on a timed interval.

In another aspect, the disclosure relates to a mathematical model for use in utility locator, whereby data representing sensed electromagnetic frequencies may be input into a mathematical data model in combination with other sensor and/or navigational data and thereby derive the position of utilities or other conductors being locator. In such systems, a Kalman filter and/or various multivariate estimation techniques may be used to process the data. Display information derived in such a way may be displayed on an enabled locator or other system devices in combination with or instead of the sensed electromagnetic data.

In another aspect, the disclosure relates to a transmitter system including a dockable tray apparatus. Such a tray apparatus may be configured to enhance portability of job site tools. For instance, such a tray apparatus may include one or more of a tool tray(s) or enclosure(s), spray can storage, a support point for a GPS antenna mast(s), a support point for an Omni-Induction device, a shoulder strap that attaches to a handle, a shoulder strap that attaches to the end of the tray near a center point of balance, and a storage space for one or more ground stakes. The ground stakes may further be secured magnetically to the dockable tray apparatus. The transmitter may further be removable from the tray apparatus.

In another aspect, the disclosure relates to a transmitter module or element configured to connect multiple induction devices simultaneously. For instance, such a transmitter may include various jacks for connecting different clamps and/or other devices. A data link communication to each connected induction device may be established to identify the device and to exchange data with the device.

In another aspect, the disclosure relates to a transmitter module or element configured to induce multiple frequencies into a utility, either via a single output current signal or multiple current output signals. These frequencies may, when used with an enabled locating system, be multiplexed in time and/or frequency. Various switching schemes may be used with an enabled locator or other system devices to allow for phase synchronization. The switching of frequencies may be adaptive whereby the transmitted frequency or frequencies may be determined by the nearest utility to the receiver.

In another aspect, the disclosure relates to a transmitter module or element including one or more sensors/devices such as, but not limited to, receivers for global navigation systems (GNS) which may be global positioning satellite (GPS) receivers, Bluetooth, and industrial, scientific and medical (ISM) radio transceivers. In embodiments utilizing GPS or other GNS receiver, the receiver may be used to time sync the transmitter as well as other system devices. The time sync may synchronize with multiple spaced apart frequencies but still be phase locked to the receiver(s) on a timed interval.

In another aspect, the disclosure relates to a transmitter system for providing current to a utility when performing a locate operation. The transmitter system may, for example, include a transmitter module or transmitter element for generating an output current for provision to the utility so as to generate a magnetic field for detection by a utility locator. The transmitter system may include a tray apparatus configured to be removably dockable to the transmitter module or element or a body or frame of the transmitter system.

The tray apparatus may, for example, include one or more container holders. The one or more container holders may include a paint canister receptacle feature configured to hold one or more spray paint cans. The system may include one or more antenna elements, and the tray apparatus may include one or more mounting elements for securing the antenna elements to the tray. The one or more antenna elements may include a GPS antenna. The one or more antenna elements may include a Wi-Fi or Bluetooth antenna or other short-range wireless data system antenna. The one or more antenna elements may include an antenna mast, and the antenna mast may be configured to be removably attached to the tray apparatus and/or the transmitter element or element.

The tray apparatus may include a ground stake receptacle element. The ground stake receptacle element may include one or more magnets and an area of the tray accessory may be formed or molded to receive a ground stake. The tray apparatus may further include a carrying structure. The tray apparatus may further include one or more storage drawers. The one or more drawers may be retained with one or more latch mechanisms. The tray apparatus may further include a latch punch element. The carrying structure may include one or more strap mounting elements for securing a strap to the tray apparatus. The transmitter system may include one or more latch mechanisms to removably couple the tray apparatus to the transmitter element or a body or frame of the transmitter system. The latch mechanisms may include a latch element, a spring, and a spring retainer nubbin formed on the body of the tray apparatus. The transmitter module may include one or more lip features to which the latch element is secured.

The transmitter system may, for example, further include an induction device coupled to an output of the transmitter module or transmitter element to induce current flow in the utility. The induction device may be an omni-directional induction device. The induction device may be a coil and the coil may be disposed within a shell of the transmitter element or module.

The transmitter module or element may, for example, include a top shell half and a bottom shell half. The top shell half may include one or more clamp jacks. The system may further include one or more clamps, wherein the top shell half and the bottom shell half may be secured together with the one or more clamps. An induction coil may be disposed within the top half shell and the bottom half shell. The system may further include a direct connect ohmic clamp. The direct connect clamp may be electrically coupled to the transmitter element through an accessory device clamp jack. The direct connect clamp may be an intelligent clamp or a non-intelligent clamp. The direct connection clamp may include a polarization indicator to allow a user to connect the clamp to a utility with the correct polarity to determine direction of current flow. The direct connection claim includes a utility type selector to allow a user to select a utility type and provide information on the utility type to the transmitter module or element.

The transmitter module or element may be configured to provide a plurality of output current signals. Ones of the plurality of output current signals may comprise signal components of multiple frequencies. The signal components of multiple frequencies may be combined at an output of a digital signal processor other electronic signal generation element. The plurality of output current signals may include three or more signals and the three or more signals may be simultaneously provided as outputs. The plurality of output current signals may include signals provided in different time slots. The different time slots may be at least partially non-overlapping. The different time slots of two or more of the plurality of output current signals may overlap. The plurality of output current signals may be provided at a plurality of different frequencies, and the time slots may be selected to provide an integral number of phases of each of the plurality of different frequencies. The plurality of output current signals may be provided at the same frequency.

The plurality of output current signals may, for example, be provided in a plurality of time slots, and the plurality of time slots may be at least partially non-overlapping. A first of the plurality of output current signals may be provided at a first frequency, and a second of the plurality of output current signals may be provided at a second frequency different than the first frequency. A first of the plurality of output current signals and the second of the plurality of time slots may be at least partially non-overlapping. Ones of the plurality of output current signals may be provided in a predefined sequence. The predefined sequence may be a periodic sequence. The predefined sequence may be a pseudo-random sequence. Data defining the predefined pseudo-random sequence may be communicated from the transmitter element to an associated utility locator. One or more of the output current signals may be suppressed during a transition window between time slots. The output current signals may be adaptively selected based at least in part on one or more utility types.

The transmitter element may, for example, be configured to receive information from an associated locator defining nearest utility information, and may generate output current signals to be supplied only to the defined nearest utility. The transmitter element may be configured to receive information from an associated locator defining one or more utility to which output current should be coupled, and may generate output current signals to be supplied to the defined one or more utilities.

The system may, for example, further include a timing system module. The timing system module may be a GPS module. The timing system module may be a terrestrial timing system module. The system may further include a cellular data communications system module. The cellular data communications system module may be a long term evolution (LTE) system module. The cellular data communications system module may be a CDMA system module. The system may further include a wireless data communications module configured to communicate with an associated utility locator via a wireless data communications link. The system may further include an anti-theft module configured to sense a motion of the transmitter system and generate an alarm response. The alarm response may be wirelessly transmitter to a corresponding utility locator.

The transmitter element may, for example, include a processing element, and the processing element may be configured to control, at least partially via a wireless data communications link, operation of the transmitter element.

The system may further include an intelligent rechargeable battery removably coupled to the transmitter. The system may further include a first intelligent rechargeable battery removably coupled to the transmitter and a second intelligent rechargeable battery removably coupled to the transmitter. The transmitter element may be further configured to dynamically switch power supplied to the transmitter from the first rechargeable battery to the second rechargeable battery.

The system may, for example, further include one or more magnets disposed on the tray apparatus for attaching one or more ground stakes to the tray apparatus. The system may further include an inductive current clamp including a connection polarity indicator. The system may further include an intelligent inductive current clamp. The intelligent inductive current clamp may include a utility type selector.

In another aspect, the disclosure relates to a tray apparatus configured to be removably dockable to a transmitter module or element or a body or frame of a transmitter system.

The tray apparatus may, for example, include one or more container holders. The one or more container holders may include a paint canister receptacle feature configured to hold one or more spray paint cans. The system may include one or more antenna elements, and the tray apparatus may include one or more mounting elements for securing the antenna elements to the tray. The one or more antenna elements may include a GPS antenna or antenna array. The one or more antenna elements may include a Wi-Fi or Bluetooth antenna or other short-range wireless data system antenna. The one or more antenna elements may include an antenna mast, and the antenna mast may be configured to be removably attached to the tray apparatus and/or to a transmitter module or element. The tray apparatus may include a ground stake receptacle element. The ground stake receptacle element may include one or more magnets and an area of the tray accessory may be formed or molded to receive a ground stake. The tray apparatus may further include a carrying structure. The tray apparatus may further include one or more storage drawers. The one or more drawers may be retained with one or more latch mechanisms. The tray apparatus may further include a latch punch element. The carrying structure may include one or more strap mounting elements for securing a strap to the tray apparatus. One or more magnets may be disposed on the tray apparatus for attaching one or more ground stakes to the tray apparatus.

In another aspect, the disclosure relates to a transmitter module element for generating an output current for provision to the utility so as to generate a magnetic field for detection by a utility locator.

The transmitter module or element may, for example, include a top shell half and a bottom shell half. The top shell half may include one or more clamp jacks. The system may further include one or more clamps, wherein the top shell half and the bottom shell half may be secured together with the one or more clamps. An induction coil may be disposed within the top half shell and the bottom half shell. A direct connect clamp may be electrically coupled to the transmitter element through an accessory device clamp jack. The direct connect clamp may be an intelligent clamp or a non-intelligent clamp. The direct connection clamp may include a polarization indicator to allow a user to connect the clamp to a utility with the correct polarity to determine direction of current flow. The direct connection claim may include a utility type selector to allow a user to select a utility type and provide information on the utility type to the transmitter module or element.

The transmitter module or element may be configured to provide a plurality of output current signals. Ones of the plurality of output current signals may comprise signal components of multiple frequencies. The signal components of multiple frequencies may be combined at an output of a digital signal processor other electronic signal generation element. The plurality of output current signals may include three or more signals and the three or more signals may be simultaneously provided as outputs. The plurality of output current signals may include signals provided in different time slots. The different time slots may be at least partially non-overlapping. The different time slots of two or more of the plurality of output current signals may overlap. The plurality of output current signals may be provided at a plurality of different frequencies, and the time slots may be selected to provide an integral number of phases of each of the plurality of different frequencies. The plurality of output current signals may be provided at the same frequency.

The plurality of output current signals may, for example, be provided in a plurality of time slots, and the plurality of time slots may be at least partially non-overlapping. A first of the plurality of output current signals may be provided at a first frequency, and a second of the plurality of output current signals may be provided at a second frequency different than the first frequency. A first of the plurality of output current signals and the second of the plurality of time slots may be at least partially non-overlapping. Ones of the plurality of output current signals may be provided in a predefined sequence. The predefined sequence may be a periodic sequence. The predefined sequence may be a pseudo-random sequence. Data defining the predefined pseudo-random sequence may be communicated from the transmitter element to an associated utility locator. One or more of the output current signals may be suppressed during a transition window between time slots. The output current signals may be adaptively selected based at least in part on one or more utility types.

The transmitter module or element may, for example, be configured to receive information from an associated locator defining nearest utility information, and may generate output current signals to be supplied only to the defined nearest utility. The transmitter element may be configured to receive information from an associated locator defining one or more utility to which output current should be coupled, and may generate output current signals to be supplied to the defined one or more utilities.

The transmitter module or element may, for example, further include a timing system module. The timing system module may be a GPS module. The timing system module may be a terrestrial timing system module. The transmitter module or element may further include a cellular data communications system module. The cellular data communications system module may be a long term evolution (LTE) system module. The cellular data communications system module may be a CDMA system module. The transmitter module or element may further include a wireless data communications module configured to communicate with an associated utility locator via a wireless data communications link. The transmitter module or element may further include an anti-theft module configured to sense a motion of the transmitter system and generate an alarm response. The alarm response may be wirelessly transmitter to a corresponding utility locator.

The transmitter element may, for example, include a processing element, and the processing element may be configured to control, at least partially via a wireless data communications link, operation of the transmitter element.

The transmitter module or element may further include an intelligent rechargeable battery removably coupled to the transmitter module or element. The system may further include a first intelligent rechargeable battery removably coupled to the transmitter and a second intelligent rechargeable battery removably coupled to the transmitter module or element. The transmitter module or element may be further configured to dynamically switch power supplied to the transmitter from the first rechargeable battery to the second rechargeable battery.

Various additional aspects, features, and functions are described below in conjunction with FIGS. 1 through 34B of the appended Drawings.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Transmitter Devices Used in Locating Systems

Turning to FIG. 1, an exemplary embodiment 100 of a transmitter system including a transmitter module or element and a removably dockable try apparatus is illustrated. Transmitter system embodiment 100 as shown may include a transmitter element, module, or device 110 and a removably dockable tray apparatus 120. The transmitter system 100 may be configured to generate current signals to be provided to hidden or buried utilities to induce electromagnetic signals onto a conductor(s), such as the utility line 130, which is typically buried underground or otherwise at least partially hidden from direct access. A user 140 equipped with a corresponding utility locator, such as locator device 150 as shown, which is configured to sense the emitted magnetic field signal(s) associated with current flow in the utility 130, may then determine information associated with the buried utility 130, such as depth, position, location, orientation, conductor current, soil condition, presence of other utilities, and the like. The locator device 150 may include or be coupled to additional elements (not shown in FIG. 1) such as one or more GPS systems including one or more GPS antennas and receivers, as well as other elements not shown in FIG. 1. In some embodiments the GPS system may include a sonde device fixedly attached to or coupled to the GPS antenna such that magnetic field signals, such as, for example, low frequency signals in the 1-20 kHz frequency range, are detected by the locator so as to determine the relative difference in position between the GPS antenna and the locator. Such a configuration may be advantageous in various embodiments, but in particular in embodiments where the GPS system antenna is positioned separately from the locator, such as a GPS antenna worn on user 140's back or positioned on a vehicle or other separate position from the locator. The sonde may be in an air core coil configuration, and the sonde center or centroid may be positioned at a defined position relative to the antenna phase center of the GPS antenna. In some embodiments the centroid and the antenna phase center may be aligned. In such a configuration the GPS system may determine location coordinate based on the antenna phase center of the GPS antenna, and the locator may determine the relative position or distance, typically in three dimensions, of the GPS antenna compared to the position of the locator. The locator may then associated this relative position or distance with buried utility information determined from magnetic field signals emitted by the buried utility or object, such as depth and/or relative horizontal offset and/or other utility locator information, and store the associated information. This information may include a precise location (e.g., in latitude/longitude/depth or other reference coordinates) of the buried utility. Data, such as latitude/longitude/altitude coordinates of the GPS antenna phase center, may be communicated between the GPS system and locator via wired or wireless connections via transmitter, receiver, and/or transceiver modules, such as via Bluetooth, WiFi, and the like.

A wireless data communications link may be established between the transmitter module 110 and the locator device 150 to communicate data between the transmitter module 110 and the locator device 150. The link may be established using a wireless data communications module in or coupled to the transmitter module 110 to receive data and information from the locator and/or send data and information to the locator, such as data received from a corresponding locator or other electronic computing device, or data sent to a corresponding locator or other electronic computing device. An associated locator, such as locator 150 as shown, may include a corresponding wireless data communications module.

The data communicated between the locator and transmitter may, for example, be information related to transmitter or locator operation, such as signal(s) being sent by the transmitter, phase or timing information at either the transmitter, locator, or both, output signal power levels at the transmitter, received signal information provided from the locator, control signals from the locator to control transmitter operation, or vice-versa, other operational information from the transmitter or locator, and the like. For example, in some embodiments, the locator device 150 may be configured with a processing module to control, at least in part, the transmitter module 110 through the use of the wireless link. The transmitter module 110 may include or be coupled to a corresponding processor module to effect control functions and/or send or receive associated data. For instance, powering on/off, attached device control, and frequency selection controls for the transmitter module 110 may be provided, via the wireless link, through the interface on the locator device 150. The wireless data communications module may, for example, be a Bluetooth, Wi-Fi, Zigbee, cellular, or other wireless data communications module as known or developed in the art.

The transmitter module 110 and/or locator device 150 may be equipped with global navigation system (GNS) modules or sensors, such as global positioning system (GPS) receiver modules, GLONASS system modules, Galileo system modules, as well as time synchronization receivers or modules, cellular or data communications modules, and/or other sensors or modules, such as inertial sensors, environmental condition sensors, or other data sensing or acquisition sensors or modules. Data from these navigation systems and/or inertial sensors, as well as other sensors and/or devices, may be communicated via wireless link from the transmitter module 110 to the locator device 150 and vice versa.

In some embodiments, the transmitter system 100 may include a security or anti-theft module that may be coupled to or integral with the transmitter module. For example, in one embodiment an alarm warning, which may be generated in a processing module and/or anti-theft alarm module of the transmitter, may be generated and communicated to a buried object locator and/or other system device that includes a corresponding receiver, such as when there is a detected motion, tilt, or movement of the transmitter system. Movement detection may, for example, be based on a tilt sensor, inertial sensor, GNS module output, or other motion detection module or device. This warning alarm may be used as part of an anti-theft system and aid in protecting a transmitter device which, in some applications, may be operating out of sight during the locate procedure and/or may be stored away from a user. The alarm system may include internal alarm elements in the transmitter, such as lights or other visual alarm indicators, buzzers or other audio alarm generation elements, or other elements for signaling that the transmitter has been moved, such as a wired or wired alarm signal provided to a separate alarm device, such as a pager, cellular phone, tablet, or other device that may be carried by a user and/or monitored at a remote sight.

In some embodiments, a wireless link may also be established between other devices within the utility locating system. For instance, the transmitter module 110 may also be configured to communicate with one or more locators, GPS systems, a smart paint stick device, laptop computer, tablet computer, wireless local area network (WLAN) or wide area network (WAN) module, smart phone or other cellular device or system, and/or other electronic computing systems or devices incorporating processing elements. Examples of technologies that may be used to establish such a wireless link may include, but are not limited to, Bluetooth wireless devices, industrial, scientific and medical (ISM) radio devices, and/or wireless area network (WAN) technologies such as Wi-Fi (WLAN) and Wi-Max networks as well as cellular or other data networks.

Figure 2A:
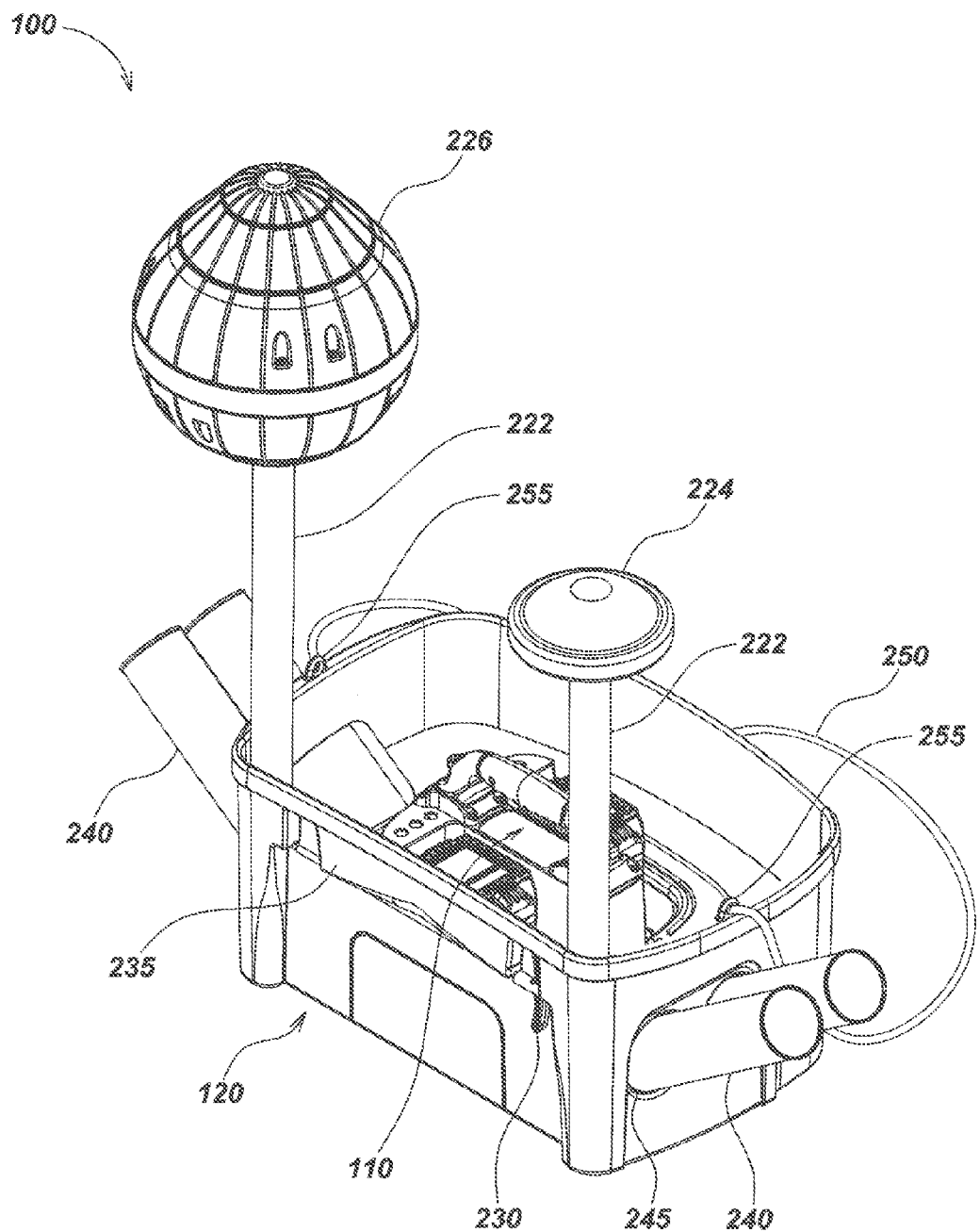
FIG. 2A is a detailed isometric view of the transmitter device with dockable tray apparatus embodiment of FIG. 1.
Figure 2B:
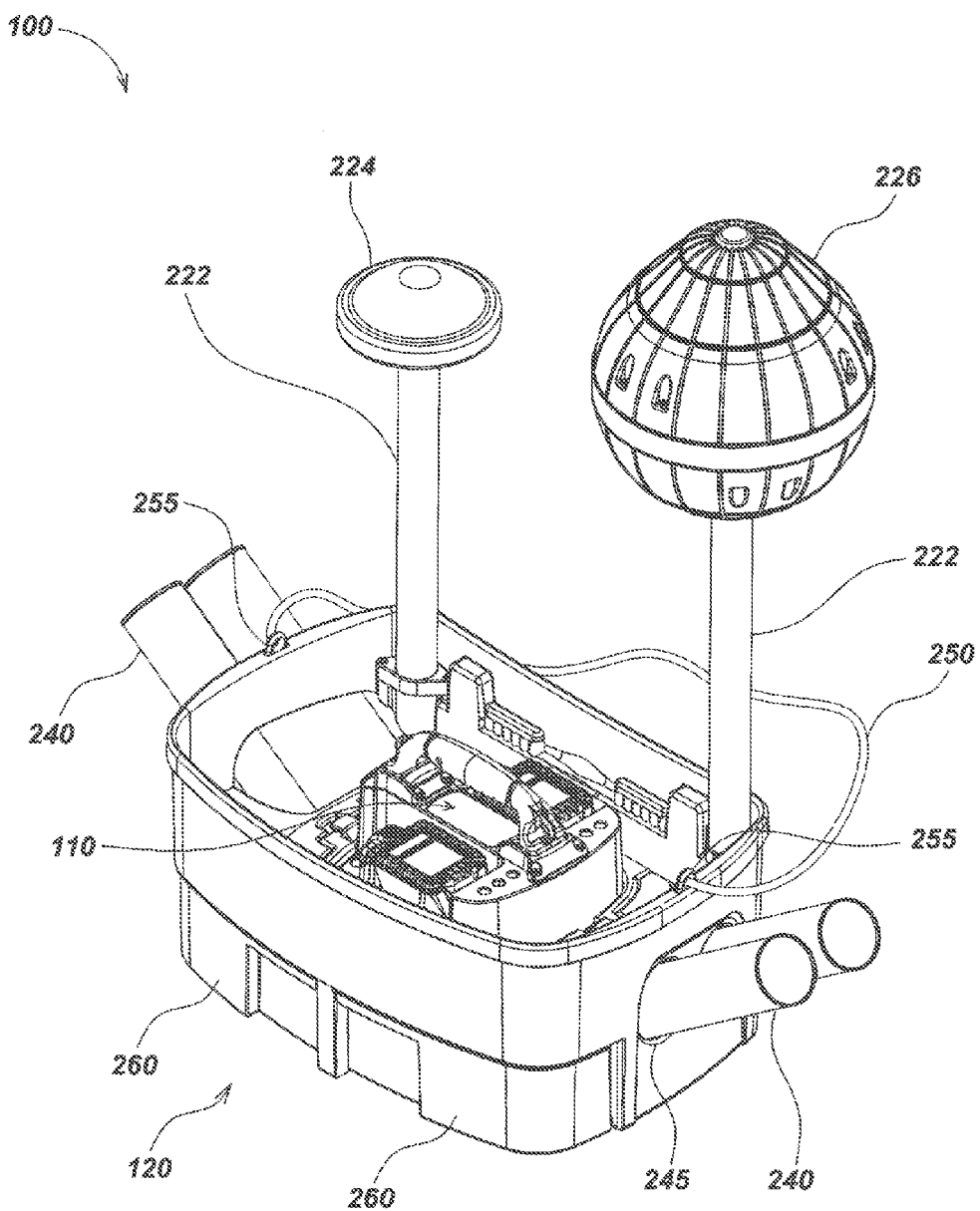
FIG. 2B is the view of the embodiment shown in FIG. 2A rotated to show the opposite side.
Figure 3:
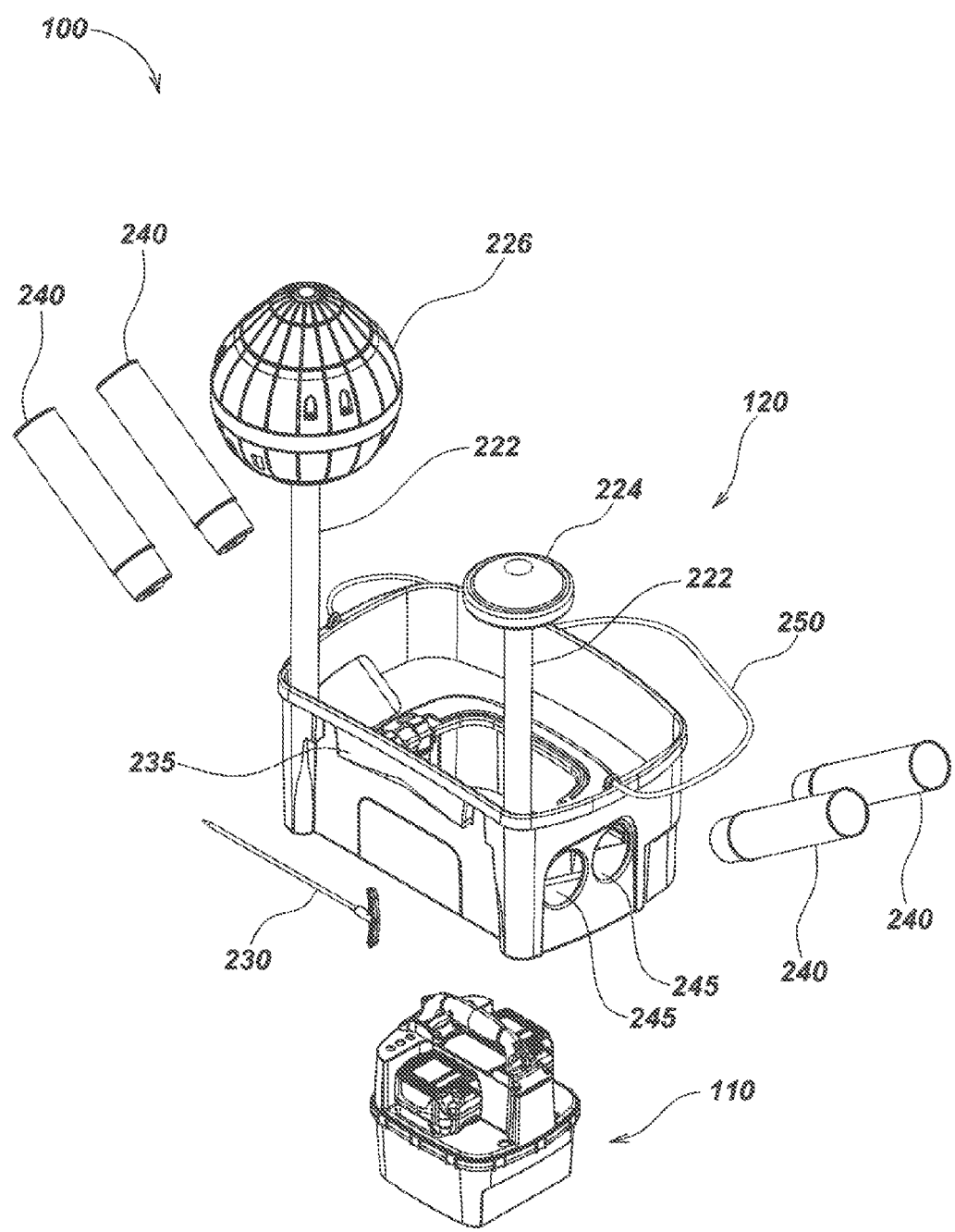
FIG. 3 is a partially exploded view of the embodiment of FIG. 2A.

Turning to FIGS. 2A-3, in exemplary embodiments, the transmitter module 110 may be removably coupled to a tray apparatus, such as example tray apparatus embodiment 120 as shown. The tray apparatus may be coupled to the transmitter module, and/or to an associated body or support frame, via various mechanical connection mechanisms, such as tabs and slots, spring mechanisms, screws or pins, hinges, clips, and the like. In an exemplary embodiment the transmitter body or frame is integral with the transmitter module; however, in some embodiments the tray apparatus may be removably attachable to the body or frame in place of, or in addition to, the transmitter module.

A tray apparatus such as embodiment 120 may include inserts, cutouts, molded shapes or forms, or other structures or forms to store and carry various tools, devices, and other apparatus that may be used at a job site. For example, one or more antenna masts, such as the antenna masts 222, may secure to the tray apparatus 120 via mounting elements. The antenna masts may include cabling to electrically connect various mast attachments devices such as the GPS antenna 224 and/or the omni-directional induction device 226 as shown. Further teachings regarding some example GPS antenna devices that may be used in various transmitter system embodiments are disclosed in co-assigned U.S. patent application Ser. No. 13/851,951, entitled DUAL ANTENNA SYSTEMS WITH VARIABLE POLARIZATION, filed Mar. 15, 2013, the content of which is incorporated by reference herein. Further teachings regarding example omni-directional induction devices are disclosed in co-assigned U.S. patent application Ser. No. 13/894,038, entitled OMNI-INDUCER TRANSMITTING DEVICES AND METHODS, filed May 14, 2013, the content of which is incorporated by reference herein.

In some embodiments, the GPS antenna 224 and/or the omni-directional induction device 226 may be replaced with a combined satellite navigation and sonde antenna node. Illustrated in FIG. 31, a transmitter system 3100 in keeping with the present disclosure may include a combined GPS and sonde antenna node 3110 (further illustrated in detail in FIG. 32) which may be such a combined satellite navigation and sonde antenna node. A similar configuration of GPS and sonde may also be used with various locator embodiments.

A combined satellite navigation and sonde antenna may further include one or more satellite navigation system antennas and one or more sonde antenna coils such that all antennas within the node share a common center (i.e., a GPS antenna phase center and a sonde outer coil centroid at a fixed point in space relative to the antenna structures. For example, the combined GPS and sonde antenna node 3110 of FIGS. 31 and 32 may include a GPS antenna 3112 and a sonde antenna 3114 aligned with the GPS antenna 3112 nested within the sonde antenna 3114 such that the GPS antenna 3112 and the sonde antenna 3114 share a common center. The GPS antenna 3112 may be similar to the GPS antenna 224 disclosed with respect to FIGS. 2A-3 and further configured to receive GPS and/or other satellite navigation system for purposes of determining position and/or precisely keeping time. The sonde antenna 3114 may be a singular or multiple antenna coils in various geometries configured to transmit output current signals which may further be induced onto utility lines and/or other nearby conductors and/or received by a corresponding locator. In some embodiments the GPS antenna and coupled sonde may be disposed on a user's back, such as in the form of a combined GPS and sonde mast antenna system. Additional sonde elements may include driver circuitry to generate current signals to be applied to the sonde coils and/or power supply modules, such as in the form of wired power and/or batteries to power the sonde and driver circuitry. In some embodiments, the sonde antenna 3114 and/or other sonde antennas may further be configured to receive signal(s) from other elements of the locator system. Further disclosures regarding sonde antenna embodiments that may be used in conjunction with the disclosures here are detailed in the incorporated patents and patent applications.

In some embodiments, an antenna mast, such as the antenna masts 222, may be configured to be removable from the tray apparatus 120 and further be configured to be re-attached directly to an enabled transmitter device or other enabled system device, thereby allowing for the various attachments or devices to operate with the transmitter device or other system devices without the presence of the tray apparatus 120. Specialized compartments for other job site tools, devices, and or other apparatus, such as one or more ground stakes 230 and marking paint canisters 240, may also be included. For example, cutouts or other structures may be formed or molded to receive spray cans, which are commonly used during locate operations. These may be formed as receptacle features, such as paint canister receptacle features 245 as shown, or in other shapes or forms to receive and retain cans or other paint containers or receptacles.

In the tray apparatus 120, the ground stake 230 may be configured to be attached to and transported within a ground stake receptacle element 235. The ground stake receptacle element 235 may utilize internal magnets to aid in holding one or more ground stakes 230 in place, such as in an area of the tray formed or molded to receive a ground stake.

Paint canister receptacle features 245 formed or molded or attached to the tray apparatus 120 may hold marking paint canisters 240 in place when not in use. In other embodiments, different quantities of such receptacles may be included. Further, in some alternative embodiments, other tool specific receptacles, such as, for example, flag marker or wrench receptacles may also be included. Further details regarding the ground stake receptacle element embodiment 235 and the paint canister receptacle feature embodiment 245 are described in subsequent paragraphs. The tray apparatus embodiment 210 may be fitted with a shoulder strap 250, or other carrying structure, which may secure to shoulder strap mounting elements 255 on two sides of the tray apparatus 120. As illustrated in FIG. 2B, the tray apparatus 120 may include one or more storage drawers 260 allowing for further storage of tools or other items.

Figure 4:
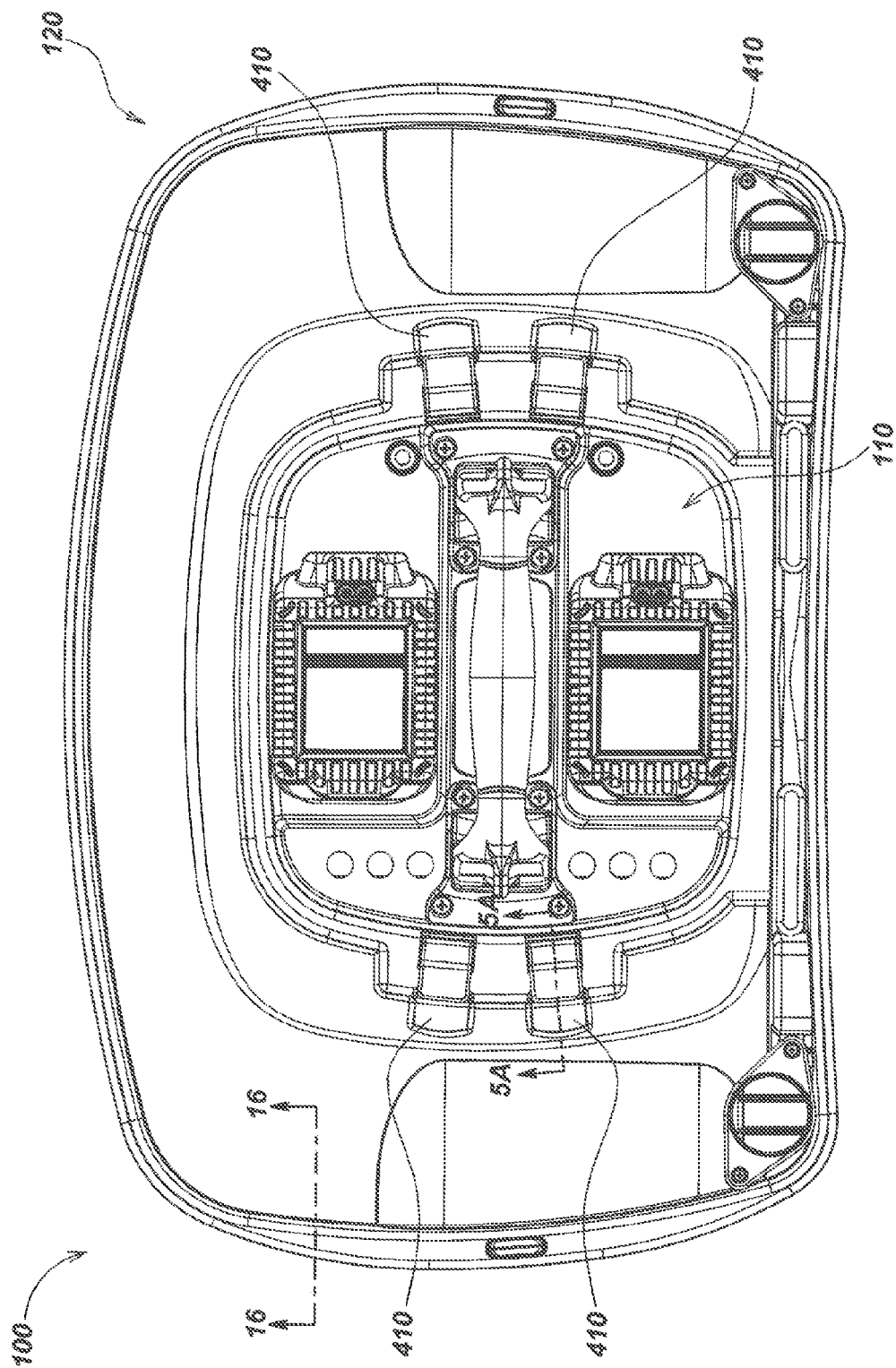
FIG. 4 is a top down view of the embodiment of FIG. 2A with masts removed.
Figure 5A:
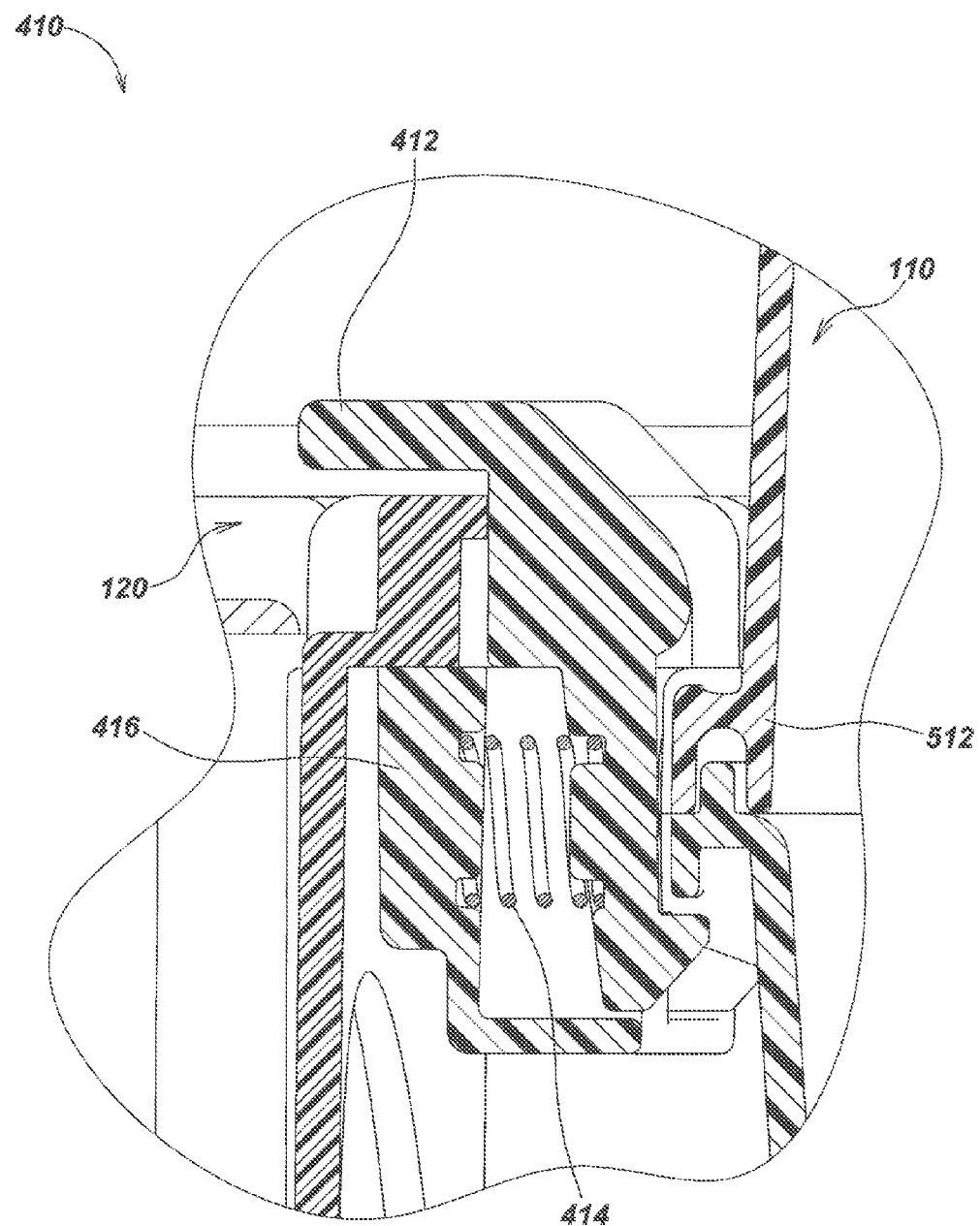
FIG. 5A is a sectional view along line 5A-5A of FIG. 4 illustrating an embodiment of a latch mechanism.
Figure 5B:
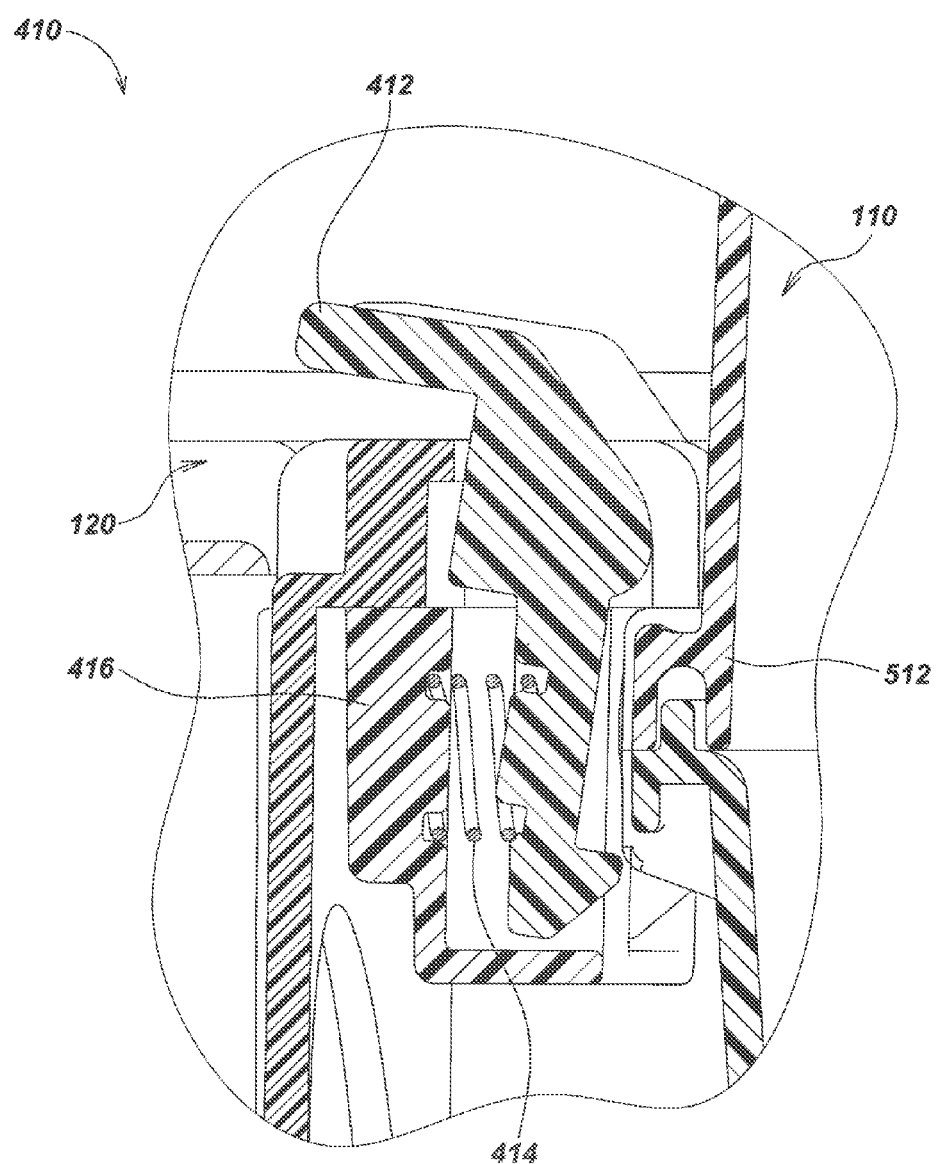
FIG. 5B is the view of the latch mechanism of FIG. 5A with the latch moved to an open position.

Turning to FIGS. 3-5B, the tray apparatus embodiment 120 may be configured to be removably attachable to the transmitter module 110 and/or to an associated transmitter element body or frame. In an exemplary embodiment as shown, the transmitter element may be integral with the body or frame; however, in some embodiments the tray apparatus may be separately attachable to the body or frame. Further, in some embodiments the transmitter element may be separately removably attachable to the body or frame (not shown). The removable attachment may be implemented using various attachment mechanisms as are known or developed in the art. For example, in an exemplary embodiment as best illustrated in FIGS. 4-5B, the tray apparatus 120 may include one or more latch mechanisms 410 that when released allow the tray apparatus 120 to be freed and pulled away from the transmitter module 110.

Turning to FIGS. 5A and 5B, the latch mechanisms 410 may further comprise a latch element 412, a spring 414, and spring retainer nubbin 416 formed on the body of the tray apparatus 120. One end of each of the springs 414 may secure to a spring retainer nubbins 416. The opposite end of each spring 414 may secure to one of the latch elements 412. Each latch element 412 may be configured to secure about the top and bottom of a lip feature 512 formed about the transmitter device 110.

When a rotational force, such as the rotational force 520 as illustrated in FIG. 5B, is applied to each of the latch elements 412 the springs 414 may compress, allowing the latch element 412 to pivot and free the tray apparatus 120 from the transmitter module 110. The tray apparatus 120 may then be lifted upward away from the transmitter module 110. In alternative embodiments in keeping with the present disclosure, other latch mechanisms or other attachment mechanisms, such as hinges, pins, clips, screws or other threaded connectors, or other attachment mechanisms may also be used to dock a tray apparatus with a transmitter device.

Figure 6:
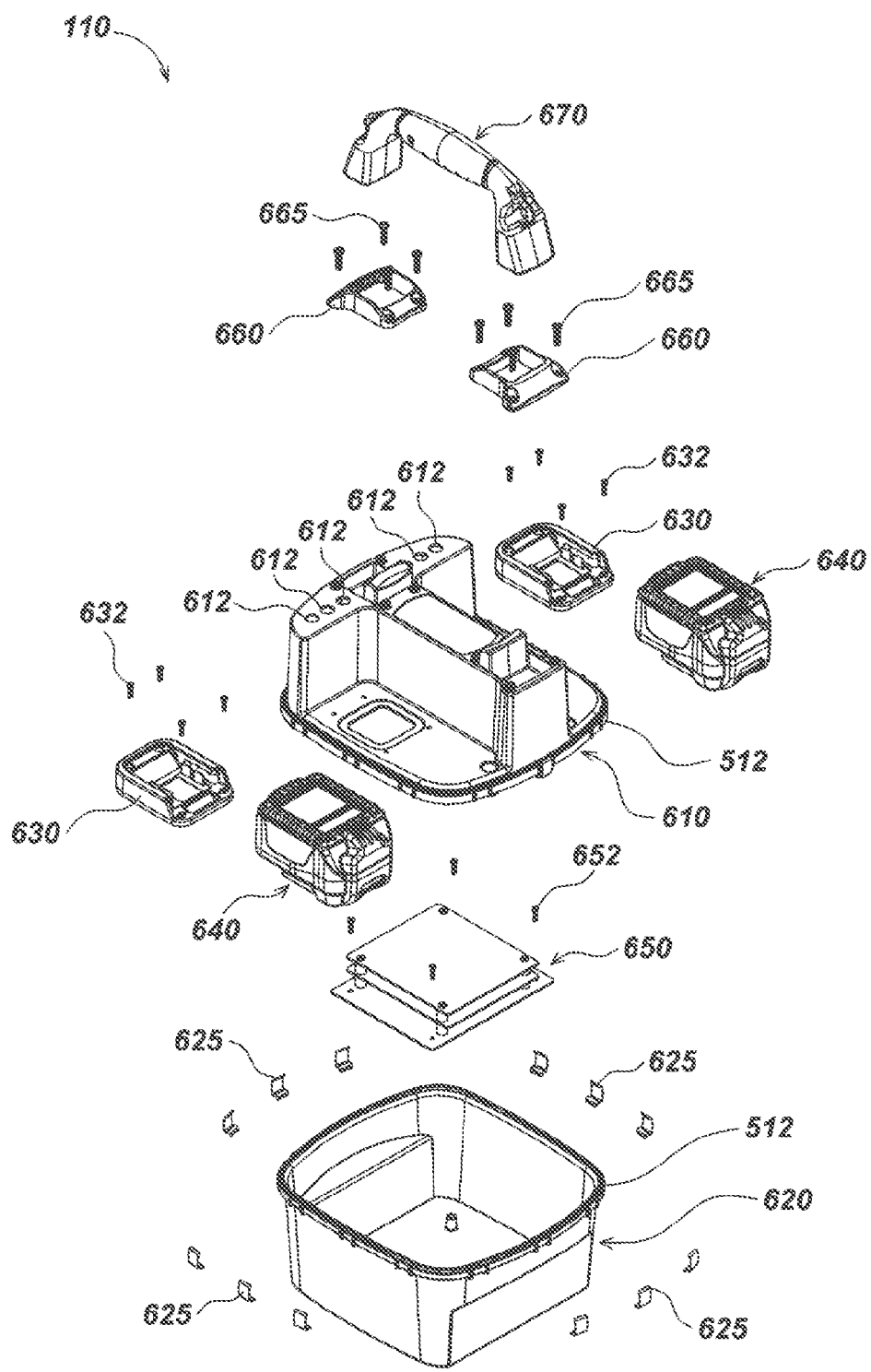
FIG. 6 is a top down exploded view of an embodiment of a transmitter device.

Turning to FIG. 6, the transmitter module 110 may include a top shell half 610 and a bottom shell half 620. The top shell half 610 may include a series of accessory device and clamp jacks 612, whereby a series of clamps and other accessory devices (described in subsequent paragraphs) may be connected to the transmitter module 110. Electrical power and/or data link communication may be established with the transmitter module 110 through such accessory device and clamp jacks 615.

Still referring to FIG. 6, a lip feature 512 on the transmitter module 110 may be formed where the top shell half 610 and the bottom shell half 620 meet in assembly. A series of clips 625 may secure about the lip feature 512 so as to secure the top shell half 610 and the bottom shell half 620 together. The transmitter element may include or be coupled to a battery dock or other coupling element. For example, the battery dock may include two battery contacts or terminals 630, which may secure to the top surface of the top shell half 610 by a series of battery terminal screws 632 or other connectors. In use, one or more batteries, such as batteries 640, may connect to the transmitter device 610 through the battery terminals 630 and be used to power the transmitter module 110 and/or other attached accessories/devices.

For example, in an exemplary embodiment, the battery may be an intelligent battery configured similarly to those disclosed in U.S. patent application Ser. No. 13/532,721 entitled MODULAR BATTERY PACK APPARATUS, SYSTEMS, AND METHODS filed Jun. 25, 2012, the content of which is incorporated by reference herein in its entirety. In alternative embodiments, a different quantity and/or type of batteries may be used. Some embodiments may also include indicators, for instance audible or visual indicators, to indicate available power left on batteries or other battery or system power data or information. Some such indicators may individual indicators for each battery and audible indicators for low battery warnings.

The batteries 640 may electrically connect to a PCB stack 650 within the transmitter module 110. The PCB stack 650 may within the bottom shell half 620. Various electronic components, processor(s), and/or sensors not illustrated in FIG. 6 may be included in the PCB stack 650, such as processing elements, power circuits, control circuits, voltage and/or current sensors, and the like to generate signals in transmitter module 110, with the output signals then directly and/or indirectly coupled onto utilities, such as conductive underground pipes or other utilities having conductive tracer wires and the like. The output signals may be generated based in part on sensor information, such as to be time or phase synchronized and/or otherwise adjusted based on locator or transmitter position or location. Such sensors may include, but are not limited to, inertial sensors, GPS, GLONASS, Galileo, gyroscopic sensors, and compass sensors. Such embodiments may be configured to receive data from the positioning system devices, determine a transmitter devices own location and/or determine and/or track the relative location of other enabled system devices, such as enabled utility locators. For example, utility locator positional information may be determined simultaneously to that of the transmitter, and the relative position between the two devices may also be determined.

Still referring to FIG. 6, two handle mount elements 660 may secure to the top of the top shell half 610 by handle screws 665 so as to attach a handle 670 about the top of the transmitter element 110. The handle 670 may aid in ease of transport of the transmitter element 110 and/or overall transmitter with dockable tray system 100. In assembly, each of the handle mount elements 660 may be positioned about the bottom of the handle 670 such that, when attached to the top shell half 610 of the transmitter element 110 by handle screws 665, the bottom section of the handle 670 may be trapped by a lip on the handle mount element 660 and secure in place the handle 670.

Figure 7:
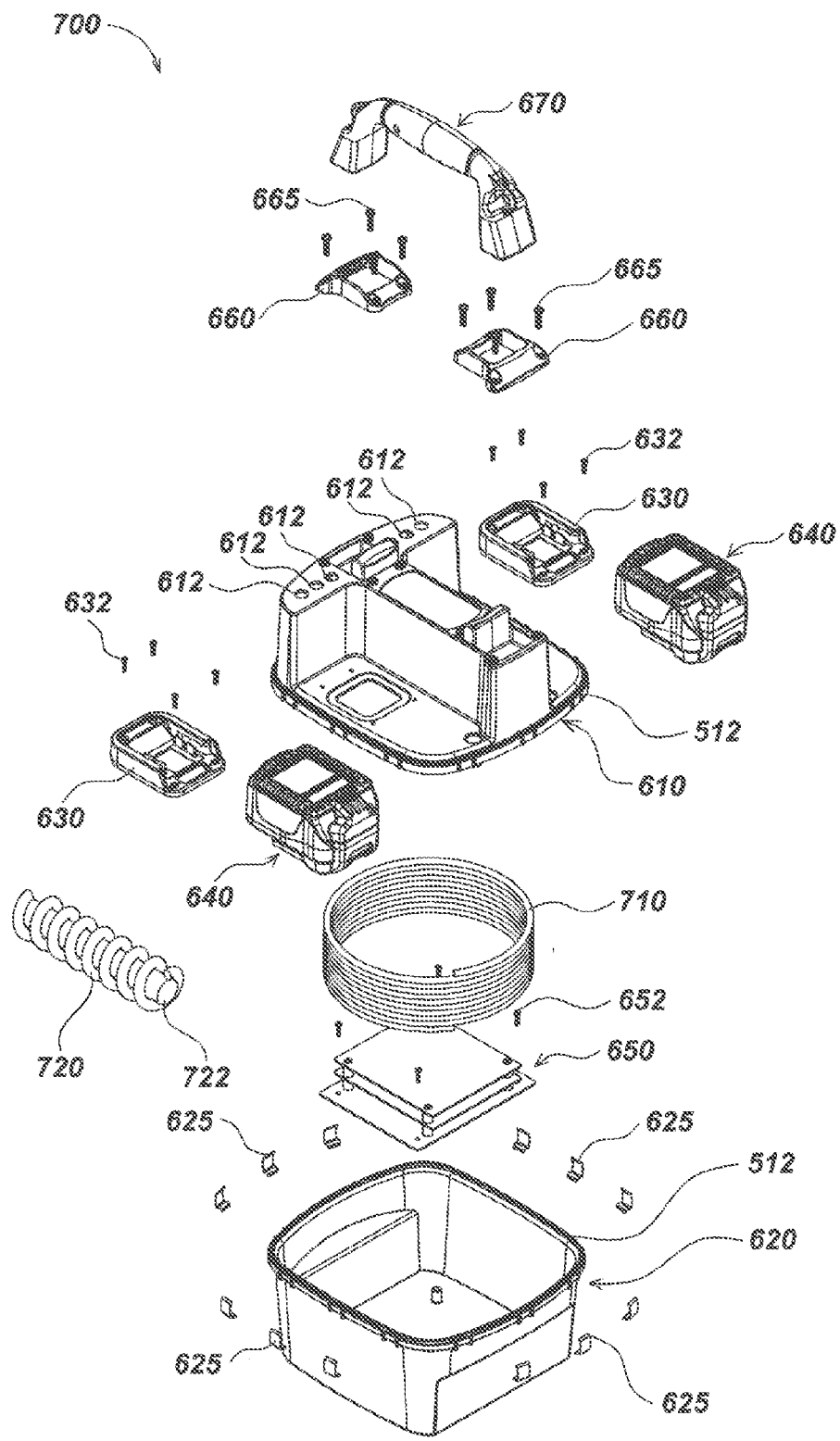
FIG. 7 is a top down exploded view of an alternative transmitter device embodiment.

Turning to FIG. 7, an alternative transmitter system embodiment 700 may include the assembly of transmitter element embodiment 110 as illustrated in FIG. 6 with the addition of an induction coil 710 or coil 720 which may have a magnetic core such as the ferrite core 722. The induction coil 710 may secure within the top shell half 610 and bottom shell half 620 and be configured to induce current signals into utility lines, pipes, and/or other conductors from provided transmitter output signals.

Figure 8:
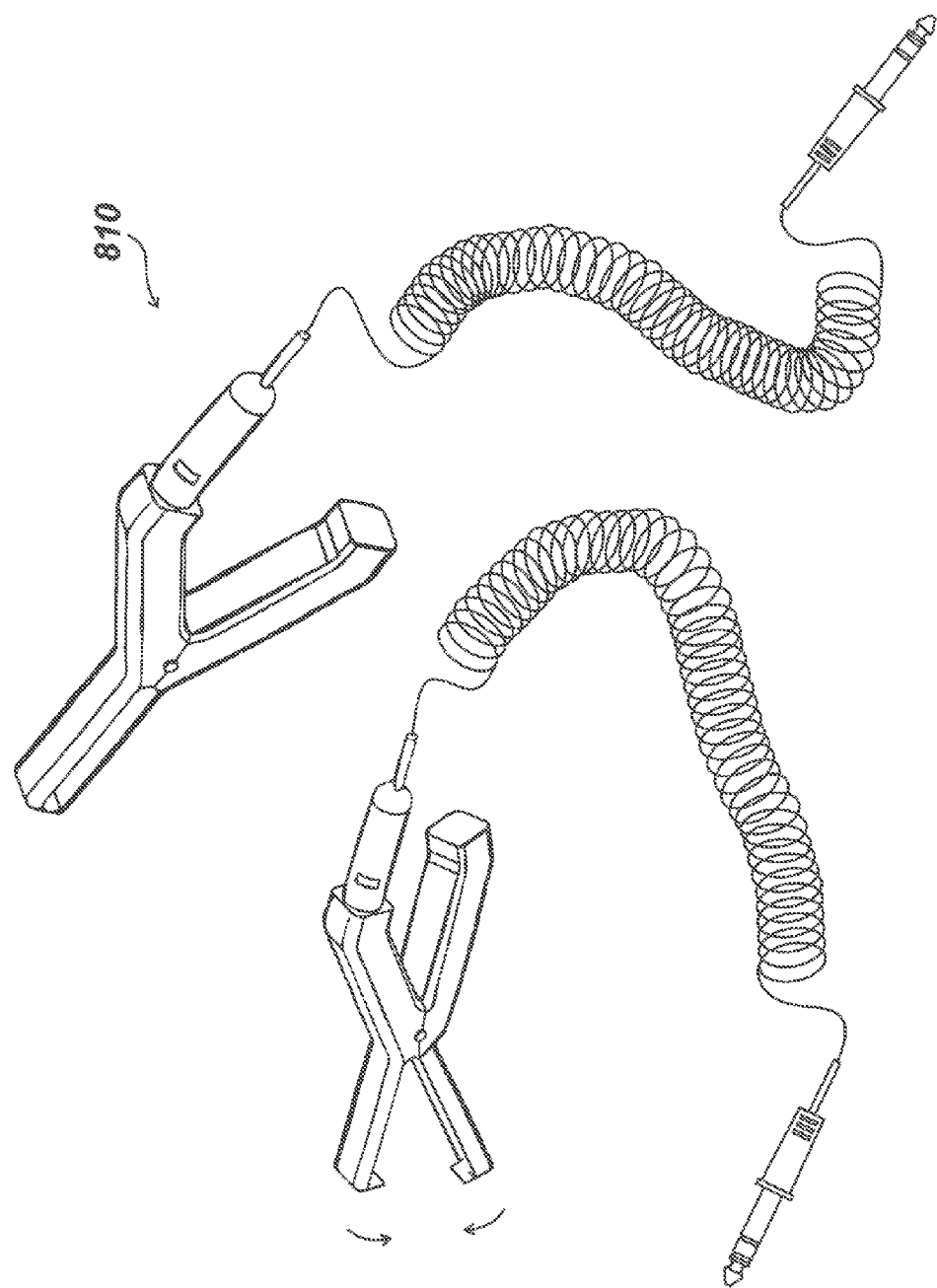
FIG. 8 is an illustration of a direct connect clamp embodiment.
Figure 9:
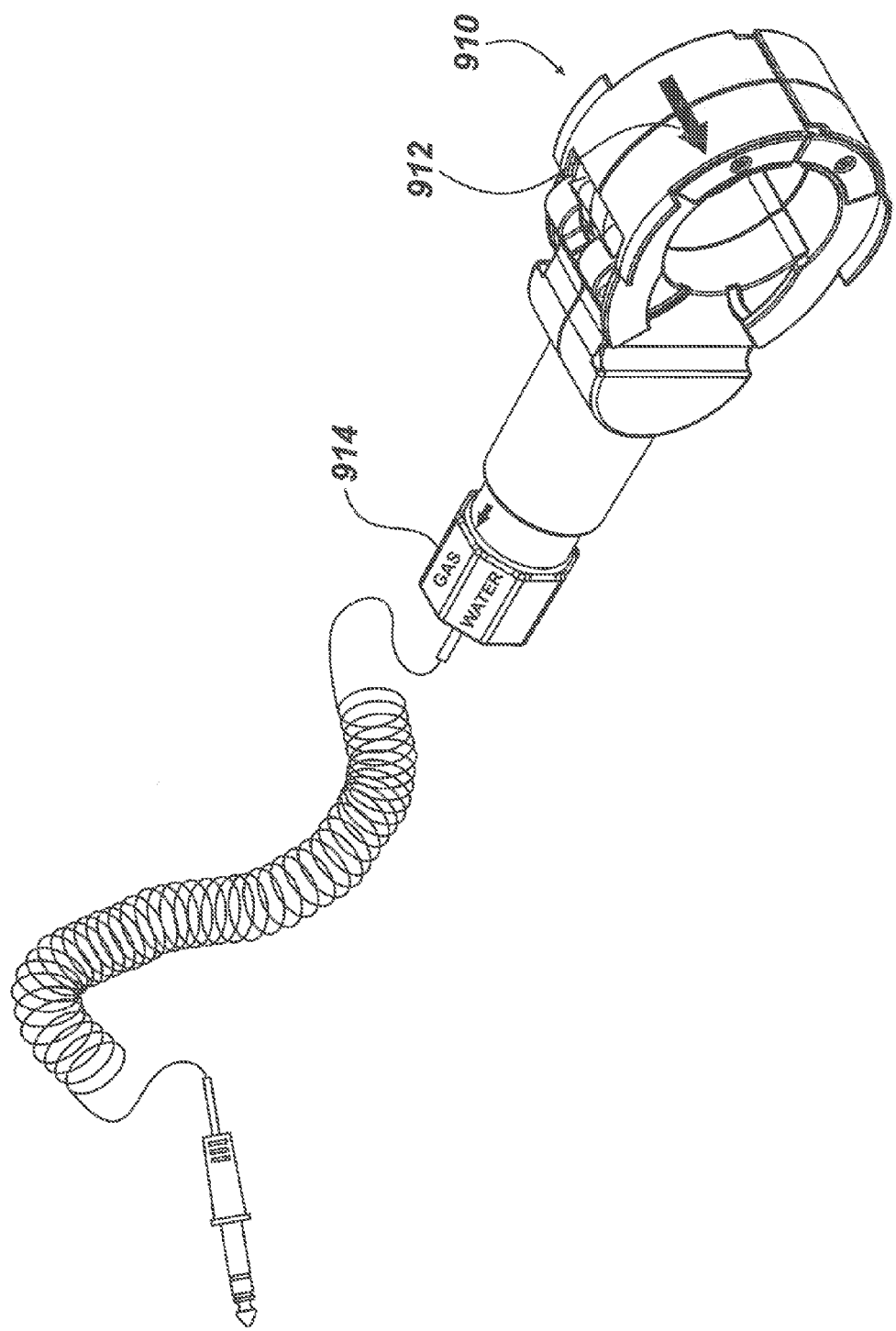
FIG. 9 is an illustration of a transmitter clamp embodiment.
Figure 10:
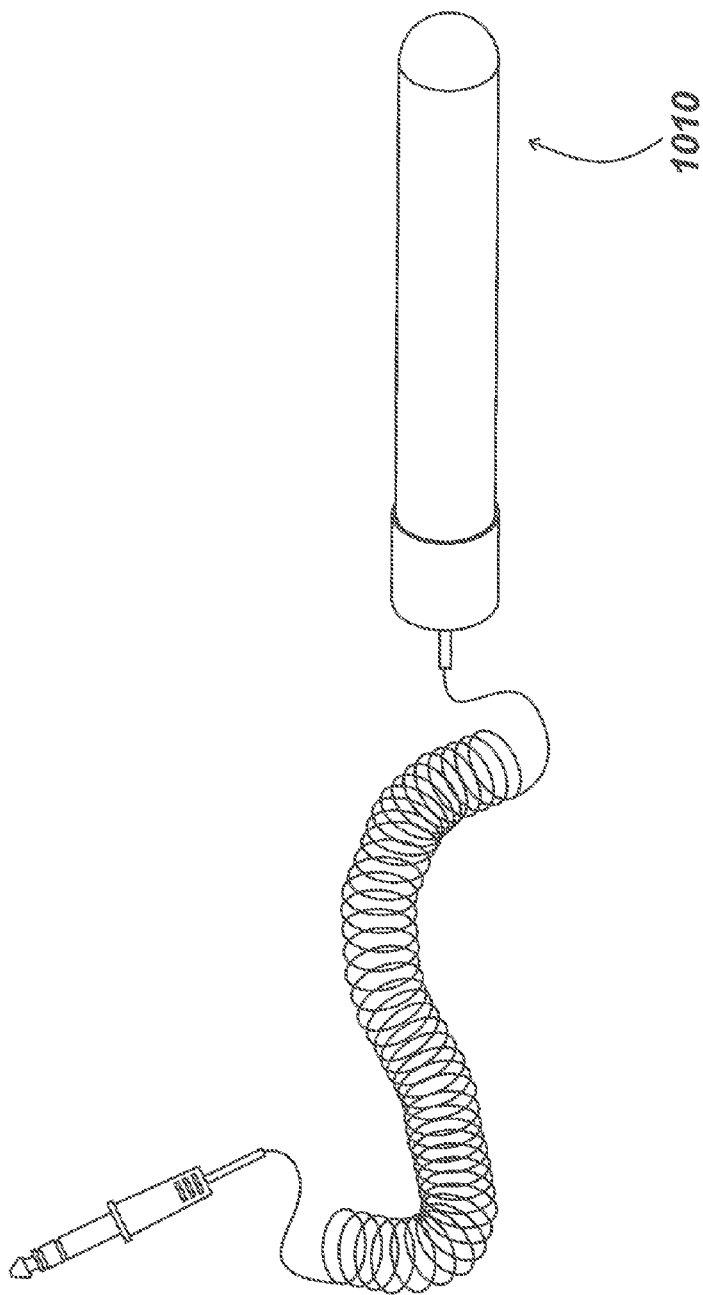
FIG. 10 is an illustration of a Hi-Q induction device embodiment.

As illustrated in FIGS. 8-10, some example clamps and other devices are shown. These devices may be connected through the accessory device and clamp jacks 615 (FIG. 6) and used with the transmitter element 110 (FIG. 6). Various other clamps, devices, and other accessories may also connect to a transmitter device in keeping with the present disclosure through the accessory device and clamp jacks, such as the accessory device and clamp jacks 615 illustrated in FIG. 6 and/or via other connection mechanism for connecting such clamps, devices, and/or other accessories. In various embodiments, clamps and associated elements, such as, for example, are described in co-assigned U.S. Patent Application Ser. No. 61/859,718 which is incorporated herein by reference, may be included in embodiments with the various elements and configurations as described herein.

In FIG. 8, direct connect clamps 810 may connect to a transmitter element 110 (FIG. 6) through an accessory device clamp jack 615 (FIG. 6) to provide a low resistance physical contact connection to the buried utility or a conductor connected to the utility. The direct connect clamps 810 may be configured to pinch open as illustrated and clamp back closed to grip a utility line, pipe, ground stake, and/or other conductor. Disclosures of example clamp embodiments that may be used in conjunction with the disclosures here in various embodiments are described in co-assigned U.S. Pat. No. 7,288,929, entitled INDUCTIVE CLAMP FOR APPLYING SIGNAL TO BURIED UTILITIES, issued Oct. 30, 2007, the entirety of which is included by reference herein. In the various clamps and other attachment devices, such as the direct connect clamps 810, a data-link may be established to an enabled transmitter, locator, and/or other systems allowing for the exchange of sensor or other data and commands.

In FIG. 9, a transmitter clamp 910 may connect to a transmitter element 110 (FIG. 6) through an accessory device clamp jack 615 (FIG. 6) and clamp to an accessible utility line or other conductor. In some applications, multiple clamps, such as multiple transmitter clamps 910, may be used simultaneously. In such applications, a transmitter in keeping with aspects of the present disclosure may be configured for multiplexing output signals in time and/or frequency through the different clamps and/or other active and passive signal inducing accessory devices. The transmitter clamp 910 may have a polarization indicator, such as the indicator mark 912, to indicate the orientation by which each transmitter clamp 910 should be attached to the utility and or other conductor such that an enabled locator may be phase synchronized with the transmitted signal or signals. In the transmitter clamp 910, a utility type selector 914 may allow the user to indicate the utility type by which the transmitter clamp 910 is connected (e.g., gas line, water line, sewer line, etc.). The utility type selector may generate a signal to be provided to the transmitter element so as to define a utility type to which the clamp is coupled and to select appropriate frequencies based at least in part on the selected type. The utility type information may be communicated via either a wired or wireless connection between the clamp and the transmitter. Details of this functionality are further described subsequently herein.

In the various clamps and other attachment devices, such as the transmitter clamp 910, a data-link may be established to an enabled transmitter and/or other systems allowing for the exchange of sensor or other data and commands. Various clamp configurations may include a data sensor or interface and/or a wired or wireless data communications module to provide information from the clamp, such as voltage, current, power, phase, and the like, to other devices in wireless communication, such as an associated locator or other electronic computing system. In some embodiments, data from sensors in the clamp may be provided to the transmitter element via wired or wireless connections, and may then be further communicated, such as via a wireless communications module in or coupled to the transmitter element, to associated devices such as locators, cellular phones, tablets, or other electronic computing devices or systems.

In FIG. 10, an inductive device, such as Hi-Q induction device 1010, may be connected to a transmitter element 110 (FIG. 6) through an accessory device clamp jack 615 (FIG. 6). In use, a Hi-Q inductive device 1010 may be configured to induce signal onto utilities, pipes, and/or other conductors without establishing a direct connection. In the various clamps and other attachment devices, such as the Hi-Q induction device 1010, a data-link may be established to an enabled transmitter and/or other systems allowing for the exchange of sensor or other data and commands. In some embodiments, data from sensors in the Hi-Q induction device may be provided to the transmitter element via wired or wireless connections, and may then be further communicated, such as via a wireless communications module in or coupled to the transmitter element, to associated devices such as locators, cellular phones, tablets, or other electronic computing devices or systems.

Figure 11:
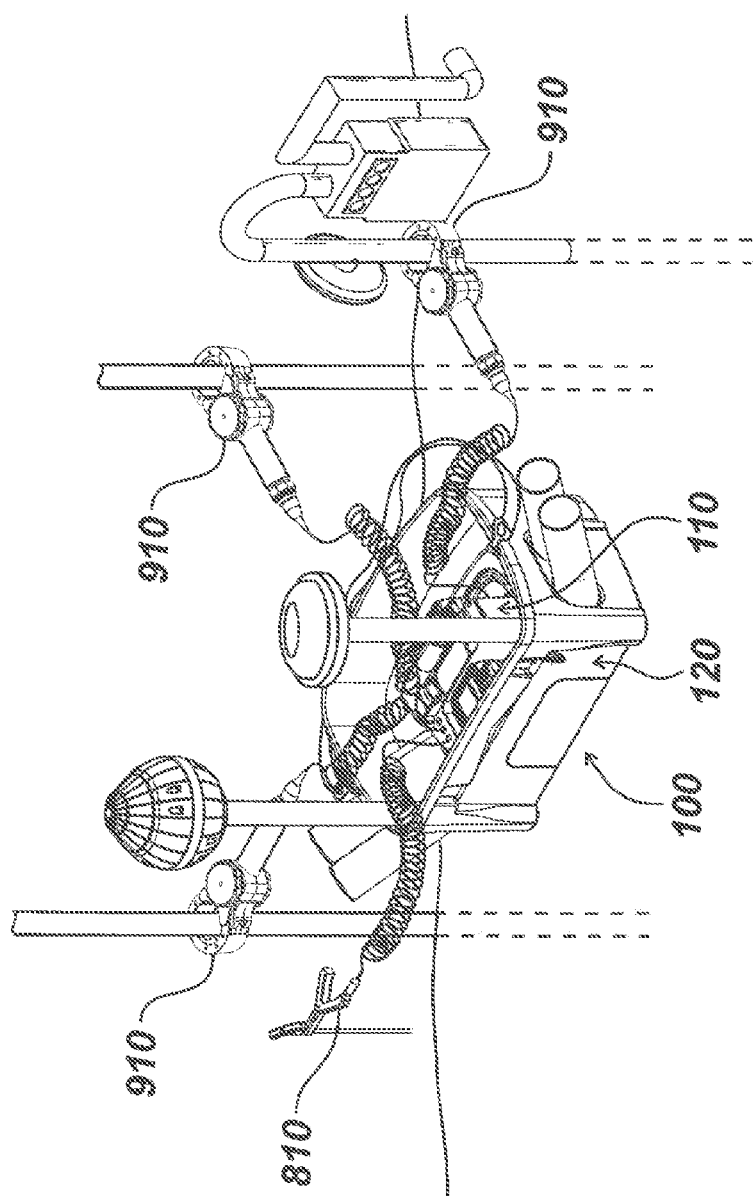
FIG. 11 is an illustration of the transmitter device embodiment with dockable tray apparatus from FIG. 1 utilizing multiple clamps on multiple utilities.
Figure 20:
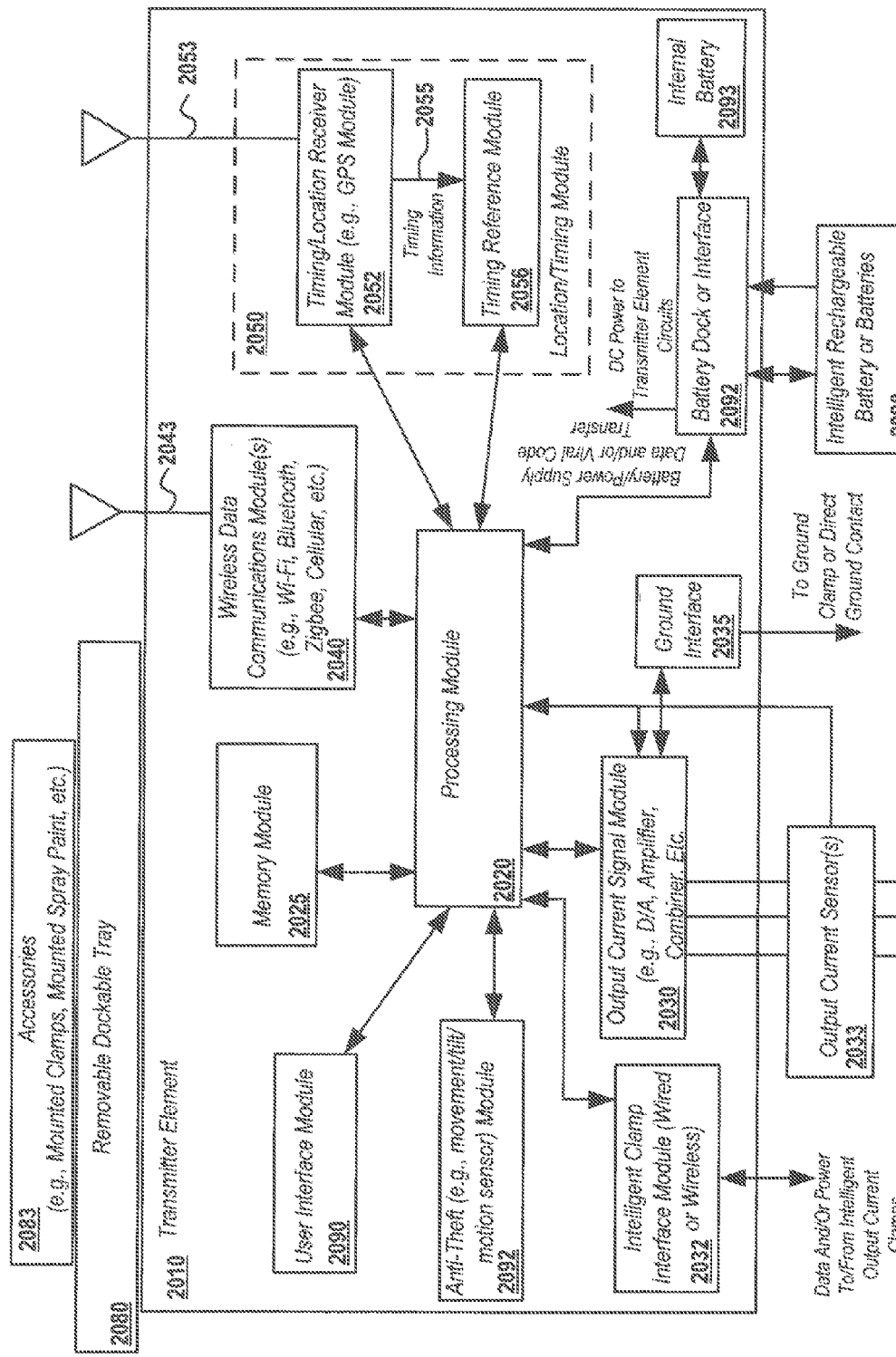
FIG. 20 illustrates details of one embodiment of a transmitter element.

Turning to FIG. 11, a transmitter element in keeping with aspects of the present disclosure, such as the transmitter element embodiment 110, may be configured to induce signals onto multiple utility lines and/or other conductors, either sequentially or simultaneously. Each connected utility line and/or other conductor may be induced with the same or different frequencies simultaneously and/or sequentially. The signals may be generated in a transmitter element embodiment such as the embodiment 2000 as shown in FIG. 20 and described subsequently herein. For example, a processing module 2010 may control generation of one or more output current signals from an output current signal module 2030, which may include analog and/or digital electronics to generate output current signals at desired amplitudes, frequencies, duty cycles, phases, and other waveform features. The output current signals may be sensed by one or more output current sensors 2033 as shown, with sensed information provided back to the output current signal module 2030 and/or processing element or module 2010.

Various multiplexing schemes, such as the multiplexing methods described subsequently with respect to FIGS. 12A to 12F, may be used in various embodiments and applications of a transmitter device system in keeping with the present disclosure. These may be implemented in, for example, a transmitter element embodiment such as embodiment 2000 as shown in FIG. 20. Code to implement these schemes may be stored or loaded into memory spaces in memory module 2020 and then executed in processing module 2010 to control output current generation from output current signal module 2030. Alternate configurations of code, processing functionality, and output analog and digital circuitry for generating the current signals may also be used in alternate embodiments.

A locator device that is time synchronized with such a transmitter device coupled to and multiplexing different frequencies through multiple utility lines simultaneously and/or at varied time intervals may be configured to identify and determine the positions and/or other information of each utility line either in an absolute sense or with respect to each other. Various time synchronization methods may be used including, but not limited to, the use of GPS or other GNS sensors with precise timing and/or other ways to synchronize timing of all system devices, or through use of other timing systems, such as dedicated time synchronization systems or systems provided time information as one output type. Description of example apparatus and methods for providing time synchronization between locators and transmitters as may be used in various embodiments in conjunction with the disclosures herein are described in the incorporated applications, including, for example, co-assigned U.S. patent application Ser. No. 13/570,211, entitled PHASE-SYNCHRONIZED BURIED OBJECT LOCATOR APPARATUS, SYSTEM, AND METHODS, filed Aug. 8, 2012, which is incorporated by reference herein.

Figure 12A:
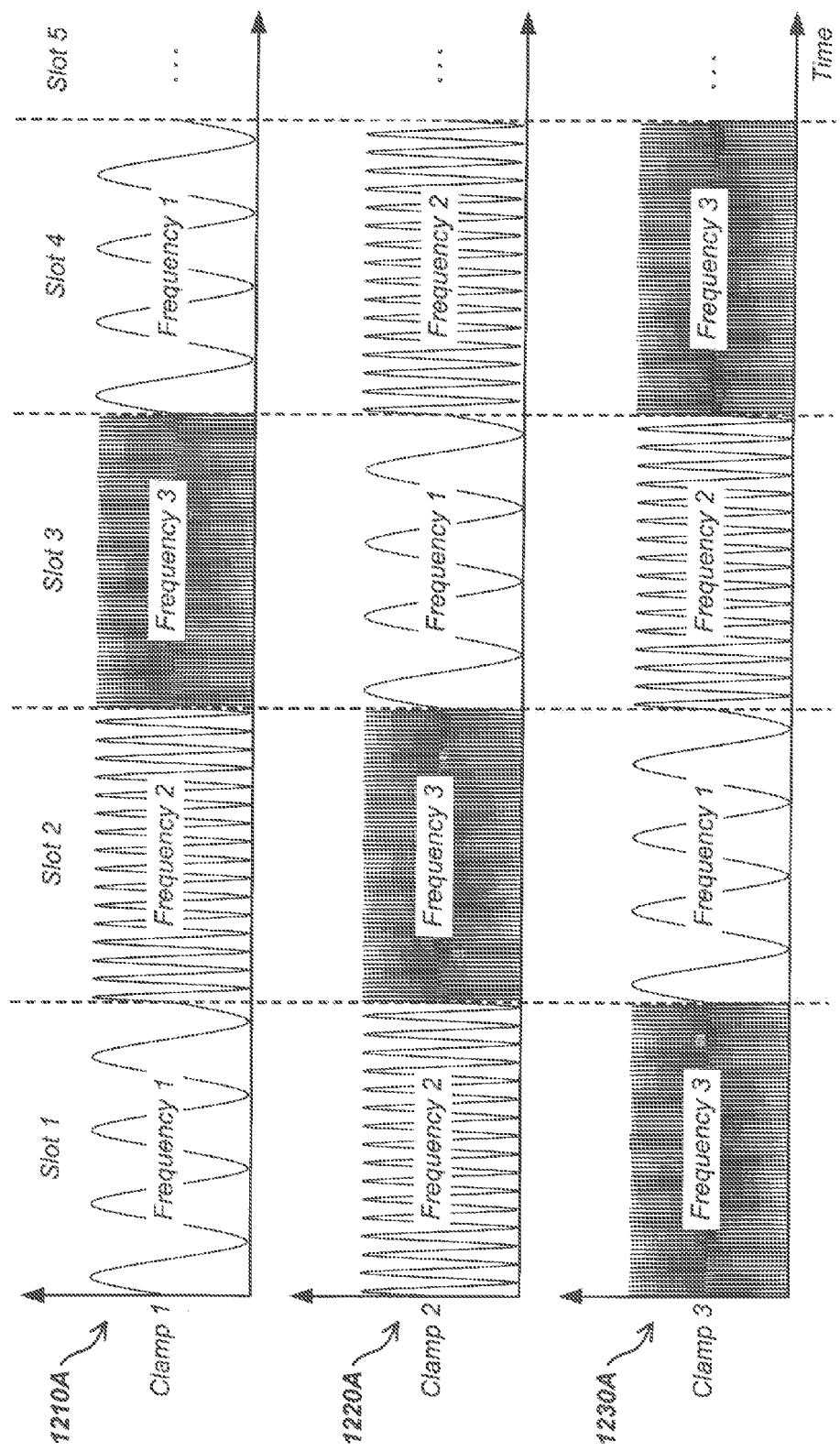
FIG. 12A is a diagram of one example embodiment of a time multiplexing scheme of frequencies.

FIG. 12A to 12F illustrate various example transmitted signal embodiments. It is noted that the signals shown in FIGS. 12A to 12F are provided for purposes of explanation, not limitation, and that various other signal sequences and timing may be used in various embodiments. FIG. 12A illustrates exemplary signal sequences where a transmitter in keeping with the present disclosure may, at three utilities or other conductors, simultaneously send output current signals, which may result in generation of corresponding magnetic fields, at three frequencies. In FIG. 12A, as well as FIGS. 12B-12F, output signals are divided into slots of equal time duration, although the slots need not be equal in time in some embodiments. In an exemplary embodiment the time slots are at least partially non-overlapping, however, in other embodiments two or more slots may overlap.

In some embodiments, the duration of this time slot may allow for a complete phase of each used frequency. A clamp 1, for instance, connected to a first utility line may be used to induce a frequency 1 in slot 1 of sequence 1210A, a clamp 2 connected to a second utility line may be used to induce a frequency 2 in slot 1 of sequence 1220A, and a clamp 3 connected to a third utility line may be used to induce a frequency 3 in slot 1 of sequence 1230A. In FIG. 12A, a switching of frequencies 1, 2, and 3 may occur in successive time slots whereby each frequency is used in each sequence for each clamp as shown.

In an exemplary embodiment, the various frequencies may include, but are not limited to, 810 kHz, 8,910 kHz, 80,190 kHz, 400,950 kHz, and 481,140 kHz. In some embodiments it may be desirable to maintain complete phase of each signal at the different frequencies in successive slots. This may be advantageous for a locator operation with respect to input filtering or other signal processing. For example, the time frame of each transmitted signal may include, but is not limited to, 1/60 of a second, 1/50 of a second, 1/25 of a second, or 1/30 of a second to maintain a complete power line frequency phase of the aforementioned exemplary frequencies. Other switching time frames which may allow for a complete phase of each used frequency may be dependent upon the selected frequencies. Furthermore, the number of frequencies used may not be dependent upon the number of clamps and/or other attached signal inducing devices coupled to utility lines. In various embodiments, one or more frequencies may be cycled through one or more clamps and/or other attached signal inducing devices.

Figure 12B:
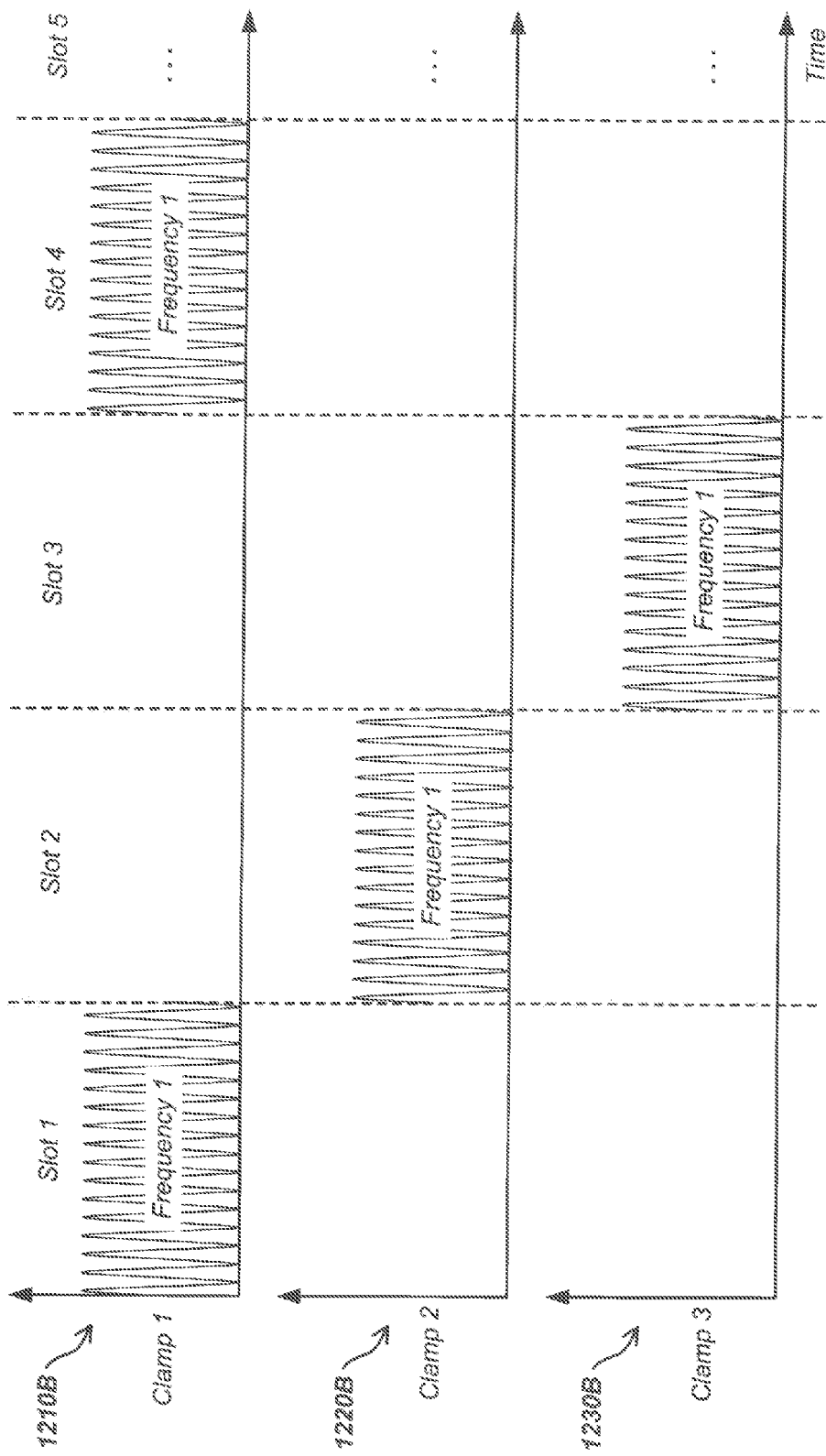
FIG. 12B is a diagram of another example embodiment of a time multiplexing scheme of frequencies.

FIG. 12B illustrates details of another embodiment of a signaling sequence using a single frequency. Signals may be sent at different frequencies simultaneously (as shown in FIG. 12A) and/or signals may be turned off in all but one utility during a given time slot. For example, 1210B illustrates a sequence of transmission of frequency 1 from clamp 1 in slot 1, with output then off for the next two slots and then repeated in slot 4. The transmission of frequency 1 may occur in time slot 2 in sequence 1220B and time slot 3 in sequence 1230B. FIG. 12C illustrates another embodiment similar to that shown in FIG. 12B, but using two frequencies, rather than one. In this case, sequences 1210C, 1220C, and 1230C each send frequency 1 and frequency 2, with off slots in between as shown.

Figure 12D:
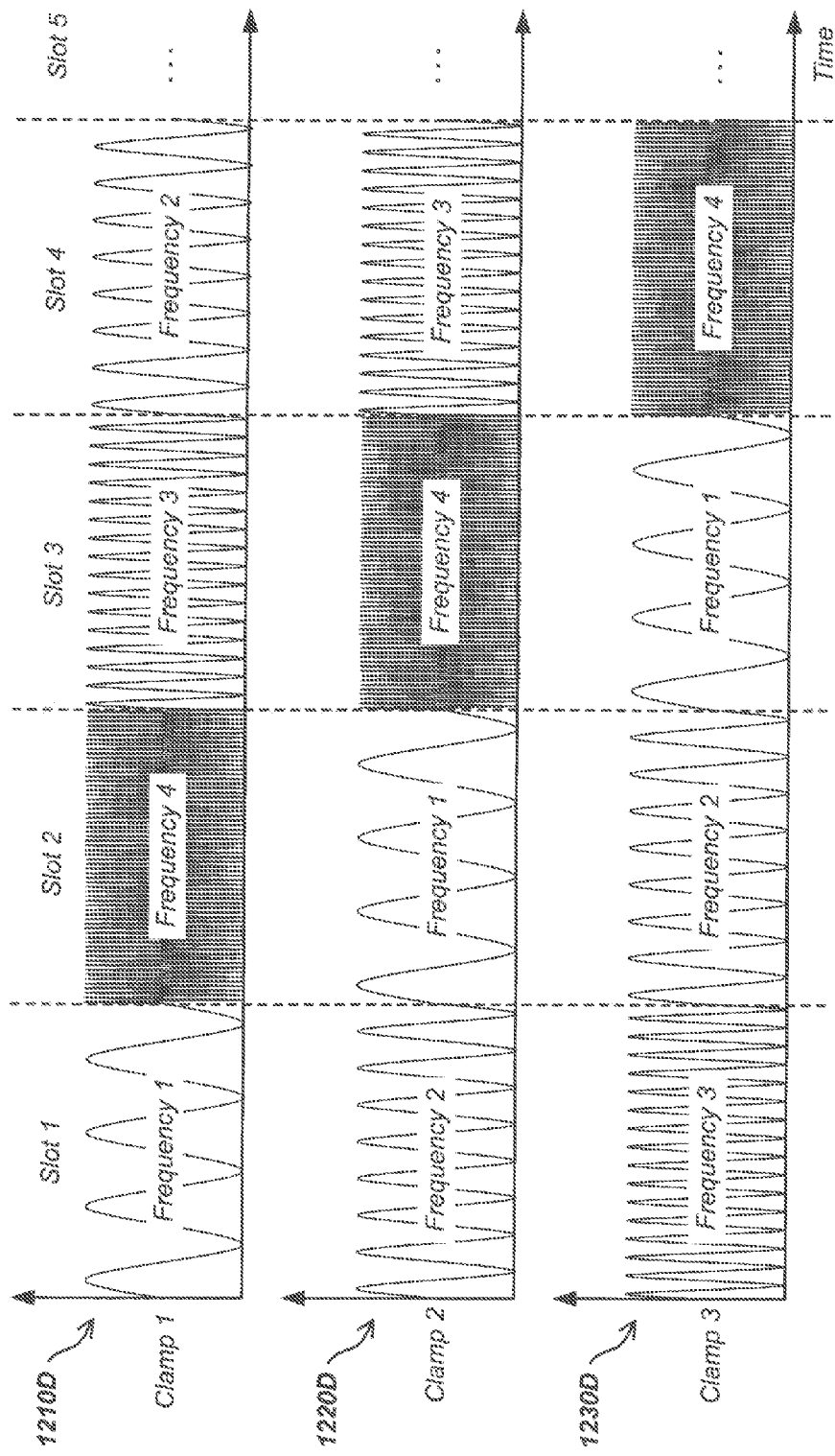
FIG. 12D is a diagram of another example embodiment of a time multiplexing scheme of frequencies.
Figure 12E:
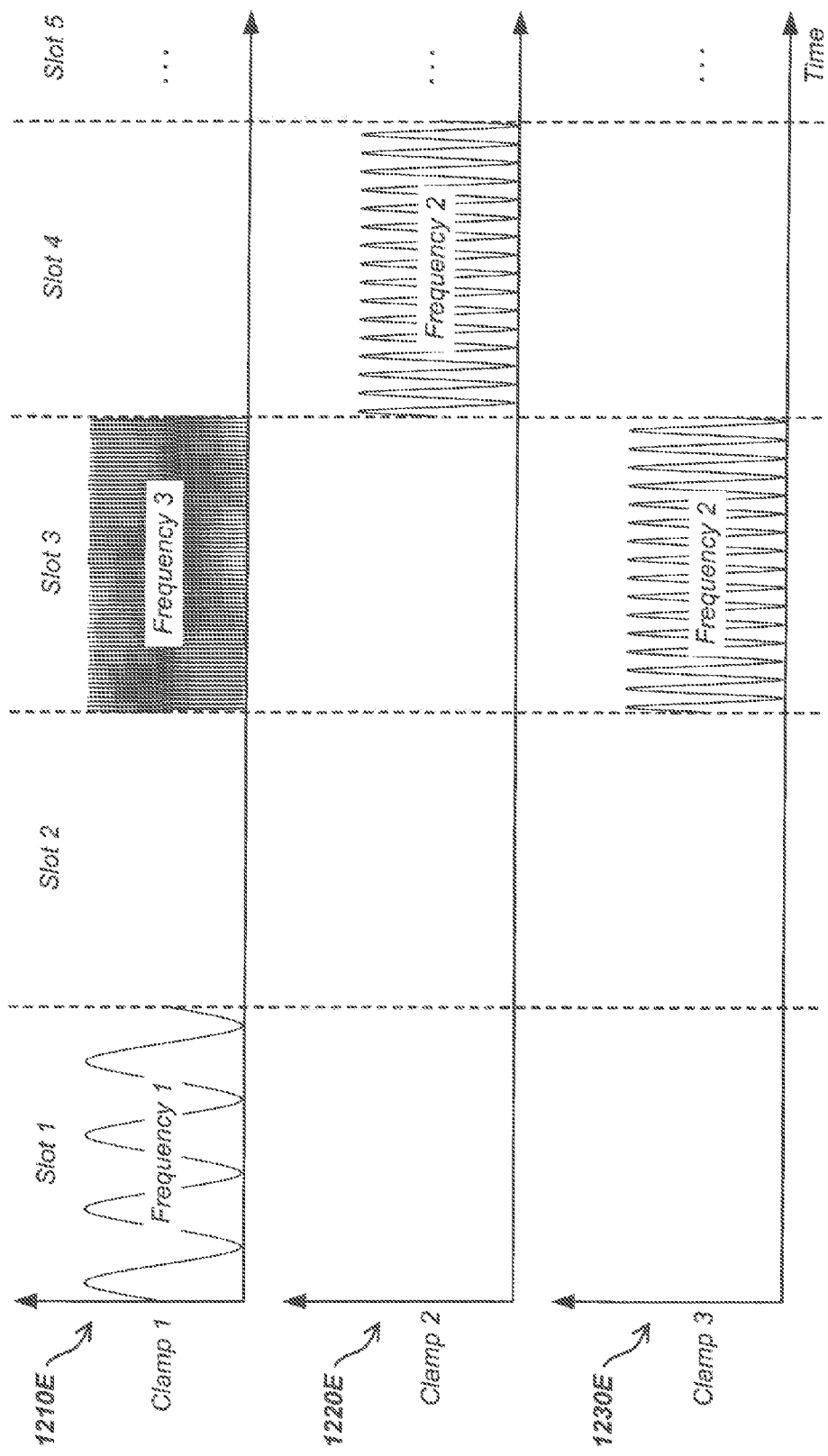
FIG. 12E is a diagram of another example embodiment of a time multiplexing scheme of frequencies.

Turning to FIG. 12D, four frequencies are shown used in sequences 1210D, 1220D, and 1230D. It is further noted that, while the sequences shown herein are illustrated as being periodic, they need not be. For example, a predefined pseudo-random sequence may be used, in which case, the sequence is preferable known or communicated to a corresponding locator or other communicatively coupled device. An example of such as sequence is shown in FIG. 12E, where each of sequences 1210E, 1220E, and 1230E may be selected, in time and/or frequency, based on some periodic or non-periodic sequence, such as a pseudo-random sequence. Other sequences, such as sequences using more slots of a particular frequency, dynamically determined frequencies, or other variations may also be used in some embodiments.

Figure 12F:
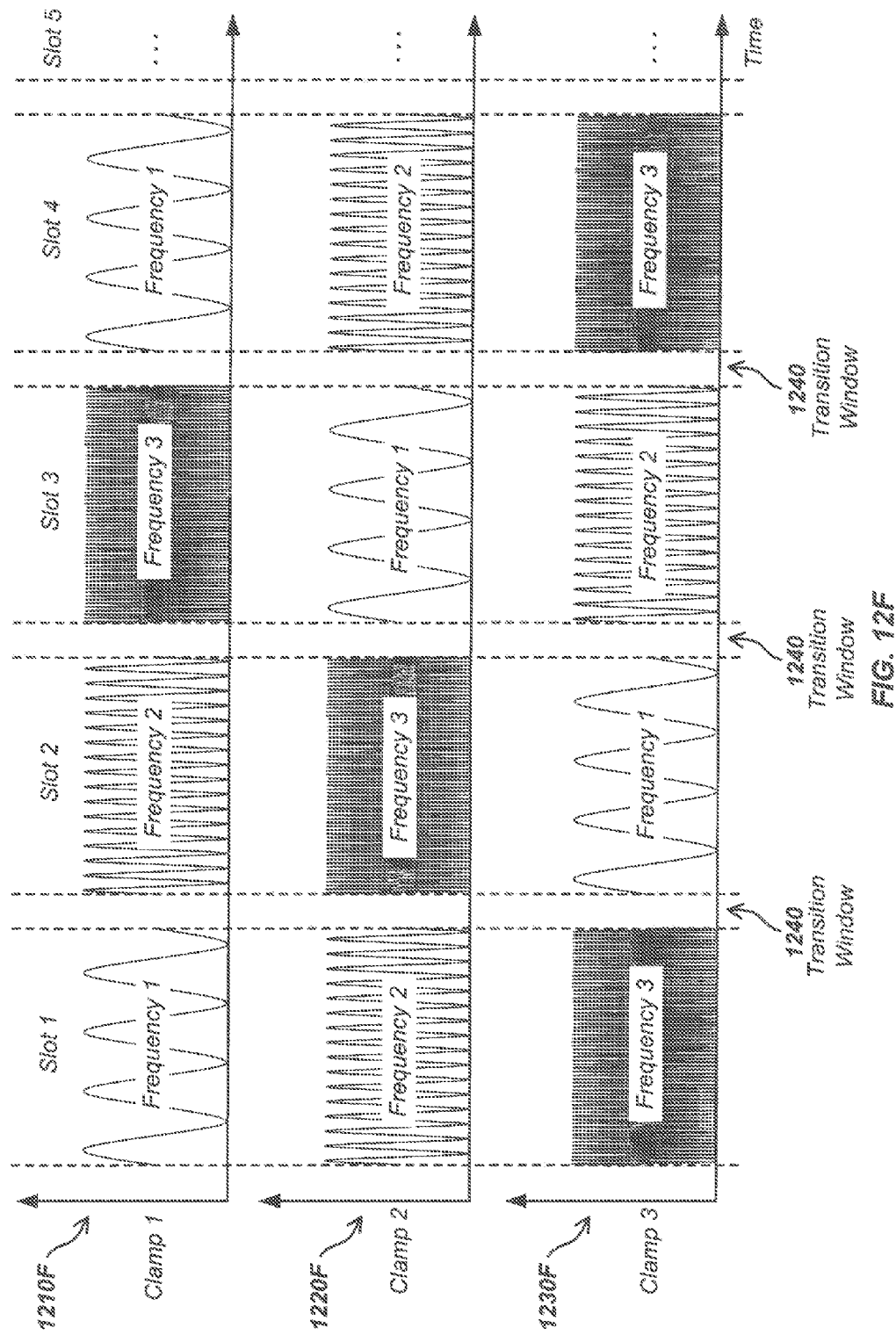
FIG. 12F is a diagram of another example embodiment of a time multiplexing scheme of frequencies.

Turning to FIG. 12F, a transition window, such as transition window 1240, may be used between time slots, such as between slots in sequences 1210F, 1220F, and 1230F as shown. The transition window 1240 may be used to allow for the ramping up of and/or down of current within the transmitter device in preparation of switching frequencies in each sequence.

Figure 12G:
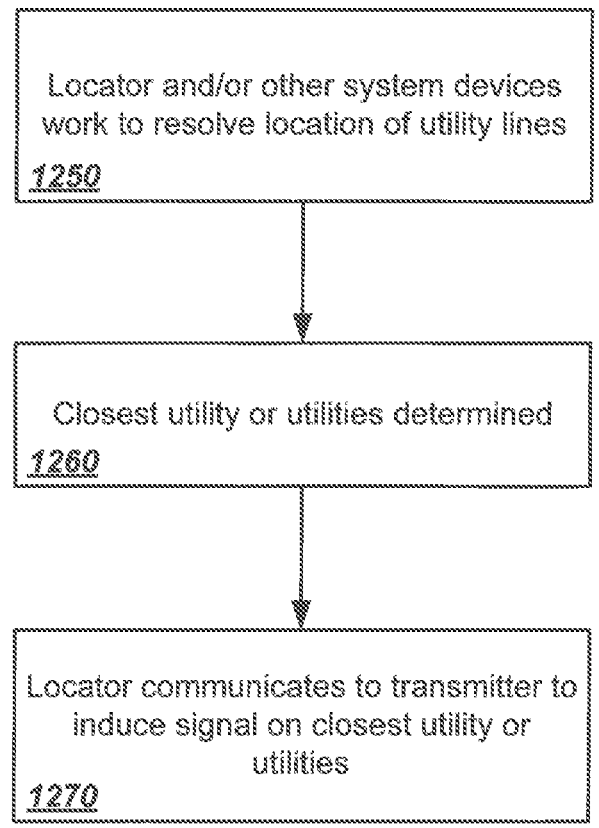
FIG. 12G is a flow chart illustrating an embodiment of an adaptive scheme for switching transmitter frequencies.

Turning to FIG. 12G, in some embodiments the switching of frequencies may be adaptive whereby the transmitted frequency or frequencies may be determined by the nearest utility or utilities. In a step 1250, the locator and/or other system devices may resolve location of utility lines, pipes, and/or other conductors in respect to the locator based on a utility type. This step may include data collection from one or more connected systems and devices (typically from all). In some embodiments, this may further include the use of historic data associated with the locate site. Utility location may be directly determined via sensing the electromagnetic signal. Such methods may also factor other sensor data such as navigational data and/or use of various filtering methods.

In yet other embodiments, the use of models, as described later herein, may also be used to interpret utility location. In a second step 1260, the closest utility line or lines in respect to an enabled locator device may be determined. In a last step 1270, the locator may communicate to the transmitter to induce signal only on the identified closest utility or utilities. This may be achieved by inducing signal only through the clamps connected to the desired utilities. In alternative embodiments, the user may be able to select the desired utility or utilities and directly or indirectly communicate to the transmitter which utility or utilities to induce signal onto. In yet some alternative embodiments, signal may not be fully shut off from being induced onto the undesired utility or utilities but rather predominantly induced onto the desired utility line or lines and occasionally induced onto the undesired utility line or lines as a periodic check. In yet further embodiments, signal may be induced onto all utility lines and software on the locator device may choose to display only the desired utility.

Figure 13:
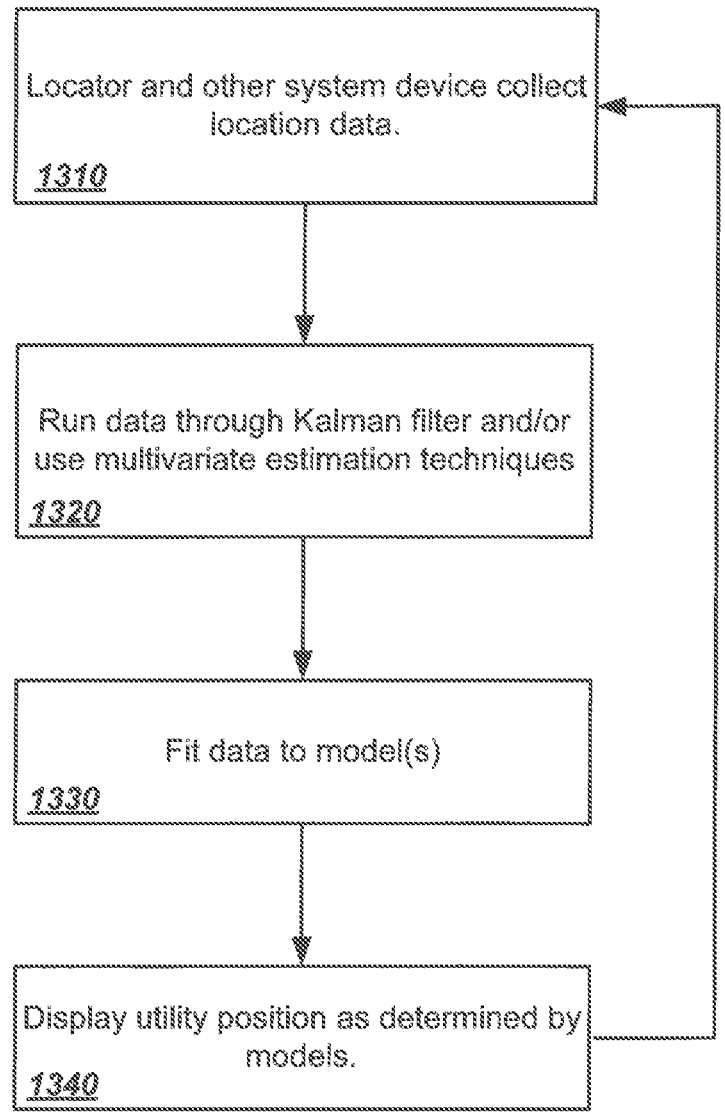
FIG. 13 is a flow chart illustrating how displayed utility location information may be generated by fitting collected sensor and signal data to a model.

Turning to FIG. 13, data models representing possible utility line location may be used to determine utility location rather than directly utilizing sensed electromagnetic data to determine utility location. In a step 1310, a locator device and/or other system devices may collect locate data. This data may include the sensed electromagnetic frequencies, navigational data, and/or other system data. In some embodiments, this may also include predetermined map or historical site data. In a step 1320, a Kalman filter and/or other filtering technique(s) and/or multivariate estimation techniques may be applied to the collected data. In a step 1330, the filtered data from step 1320 may be applied to one or more predetermined models. In a step 1340, the model data may be used to determine and display the utility or utilities position(s). This process may then be repeated as necessary. In alternative embodiments, both utility location of directly sensed data and utility location of model determined data location may be displayed.

Figure 14A:
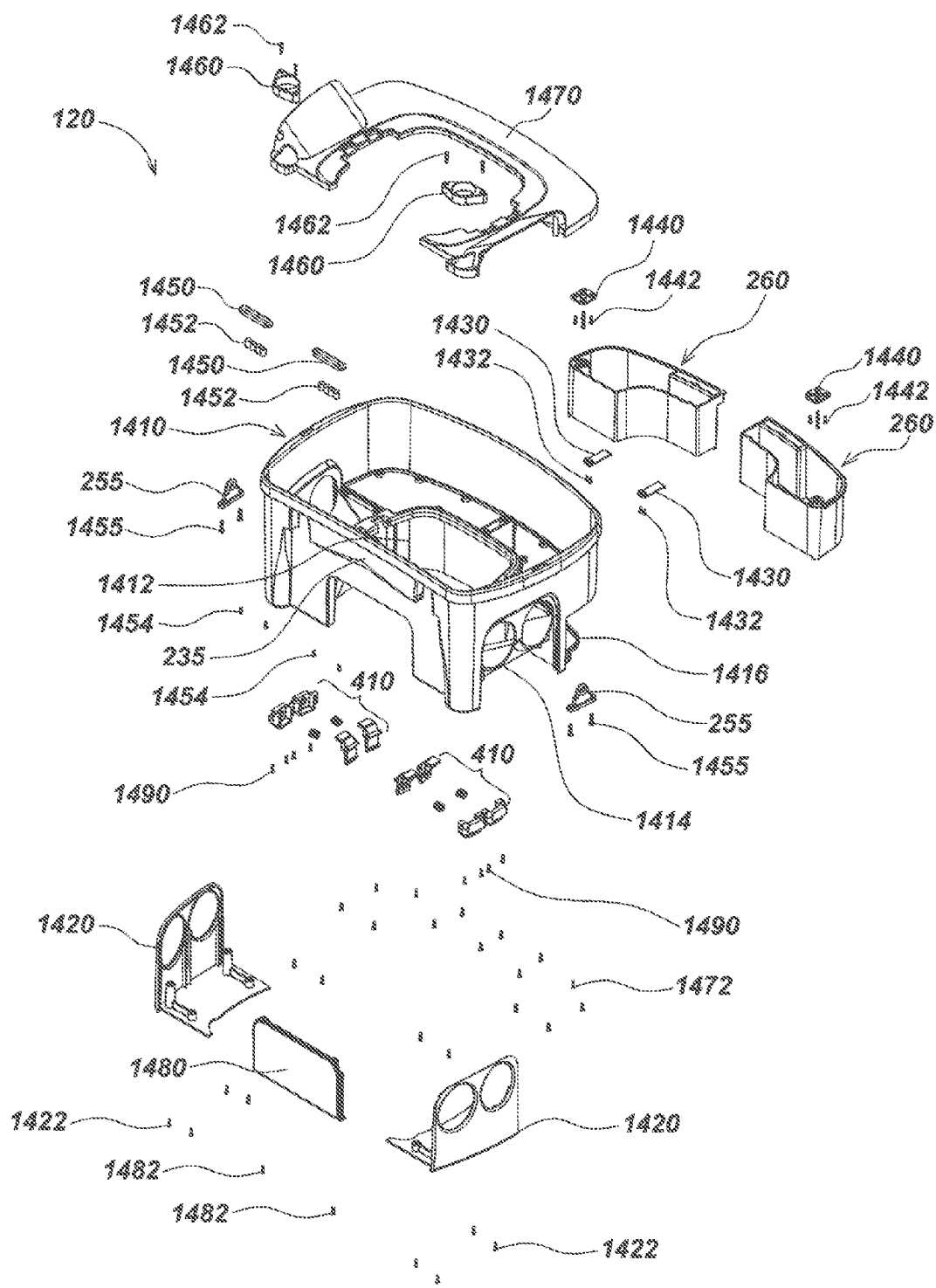
FIG. 14A is a top down exploded view of a tray apparatus embodiment.
Figure 14B:
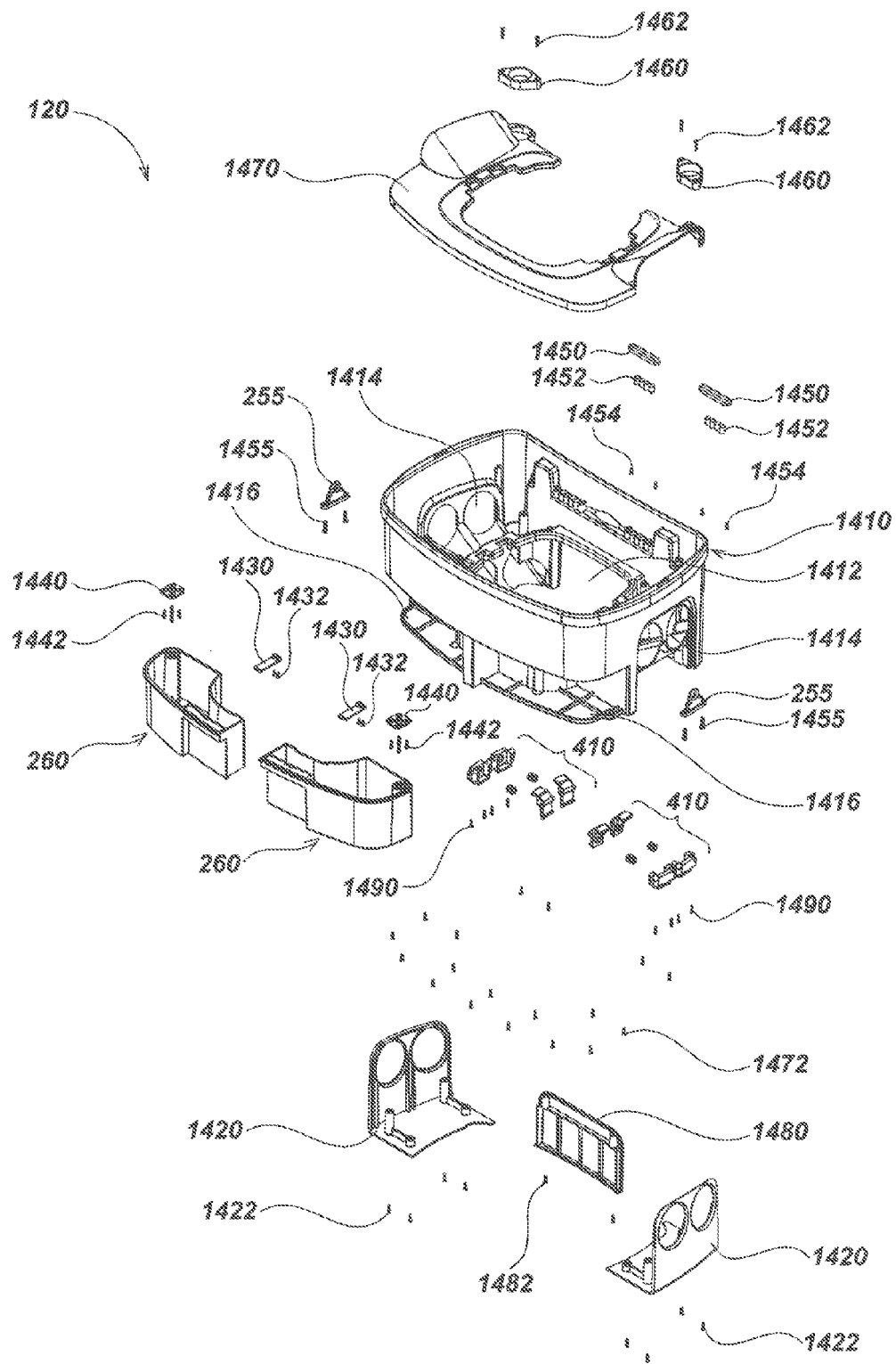
FIG. 14B is the view of the embodiment of FIG. 14A rotated to show the opposite side.

Turning to FIGS. 14A and 14B, the tray apparatus embodiment 120 may include a core tray element 1410 formed, molded with, among other features, a central opening 1412. The central opening 1412 may be dimensioned to fit a transmitter device in keeping with the present disclosure, such as the transmitter element 110 of FIG. 1. A series of paint canister openings 1414 may be formed or molded along the sides of the tray apparatus 120 and may be dimensioned to fit one end of a paint canister, such as the marking paint canisters 240 illustrated in FIG. 2A. A paint receptacle cover 1420 may secure about each side of the core tray element 1410 containing the paint canister openings 1414 by a series of paint receptacle cover screws 1422 or other attachment mechanisms, such as hinges, pins, and the like. Each paint receptacle cover 1420 may be formed or molded with openings dimensioned to fit a paint canister, such as the marking paint canisters 240 illustrated in FIG. 2A. In assembly, the openings formed or molded on each paint receptacle cover 1420 may align with a pairing one of the paint canister openings 1414 such that when a paint canister is placed within, the paint canister may be angled and more readily held in placed from movements of the tray apparatus 120 during use. When assembled, the combination of paint canister openings 1414 formed on the core tray element 1410 and paint receptacle covers 1420 with paint receptacle cover screws 1422 may form one embodiment of a paint canister receptacle element 245 as illustrated in FIG. 2.

Still referring to FIGS. 14A and 14B, the core tray element 1410 may also be formed with a set of drawer slots 1416 dimensioned to accommodate the storage drawers 260. Within each drawer slot 1416 a latch element 1430 may secure by latch element screws 1432. The latch element 1430 may hold the storage drawers 260 in place when closed. A hinge retainer element 1440 may secure via hinge retainer screws 1442 within each drawer slots 1416. Additional detail regarding the storage drawers 260 are described subsequently herein in connection with FIGS. 15 and 16.

Still referring to FIGS. 14A and 14B, the core tray element 1410 may also be formed with one or more ground stake receptacle element 235. Each ground stake receptacle element 235 may contain a set of magnet retainer element 1450 and a series of magnets 1452 to aid in holding a ground stake, such as the ground stake 230 of FIG. 2, in place. Each magnet retainer element 1450 may secure to the ground stake receptacle element 235 by magnet retainer screws 1454.

Still referring to FIGS. 14A and 14B, one shoulder strap mounting element 255 may secure to opposite sides of the core tray element 1410 so that a shoulder strap such as the shoulder strap 250 of FIG. 2 may secure to the tray apparatus 120. A series of strap mount screws 1455 may be used to secure in place each shoulder strap mounting element 255. A core tray top element 1470 may secure to the top surface of the core tray element 1410 via a series of top element screws 1472. The core tray top element 1470 may be formed with hole features in two corners dimensioned to hold the end of antenna masts such as the masts 222 of FIG. 2A.

A series of mast retainer elements 1460 may secure within corners above the core tray top element 1470 where the hole features are located. A series of mast retainer screws 1462 may be used to secure the mast retainer elements in place. The mast retainer elements 1460, in conjunction with the hole features of the core tray top element 1470, may function to aid in securing in place masts such as the masts 222 of FIG. 2A. A front plate 1480 may secure to a front section of the core tray element 1410 via a series of front plate screws 1482. A series of latch mechanisms 410, as described in connection with FIG. 4, may secure to the lip of the central opening 1412 on the core tray element 1410. The latch mechanisms 410 may be secured by a series of latch mechanism screws 1490.

Figure 15:
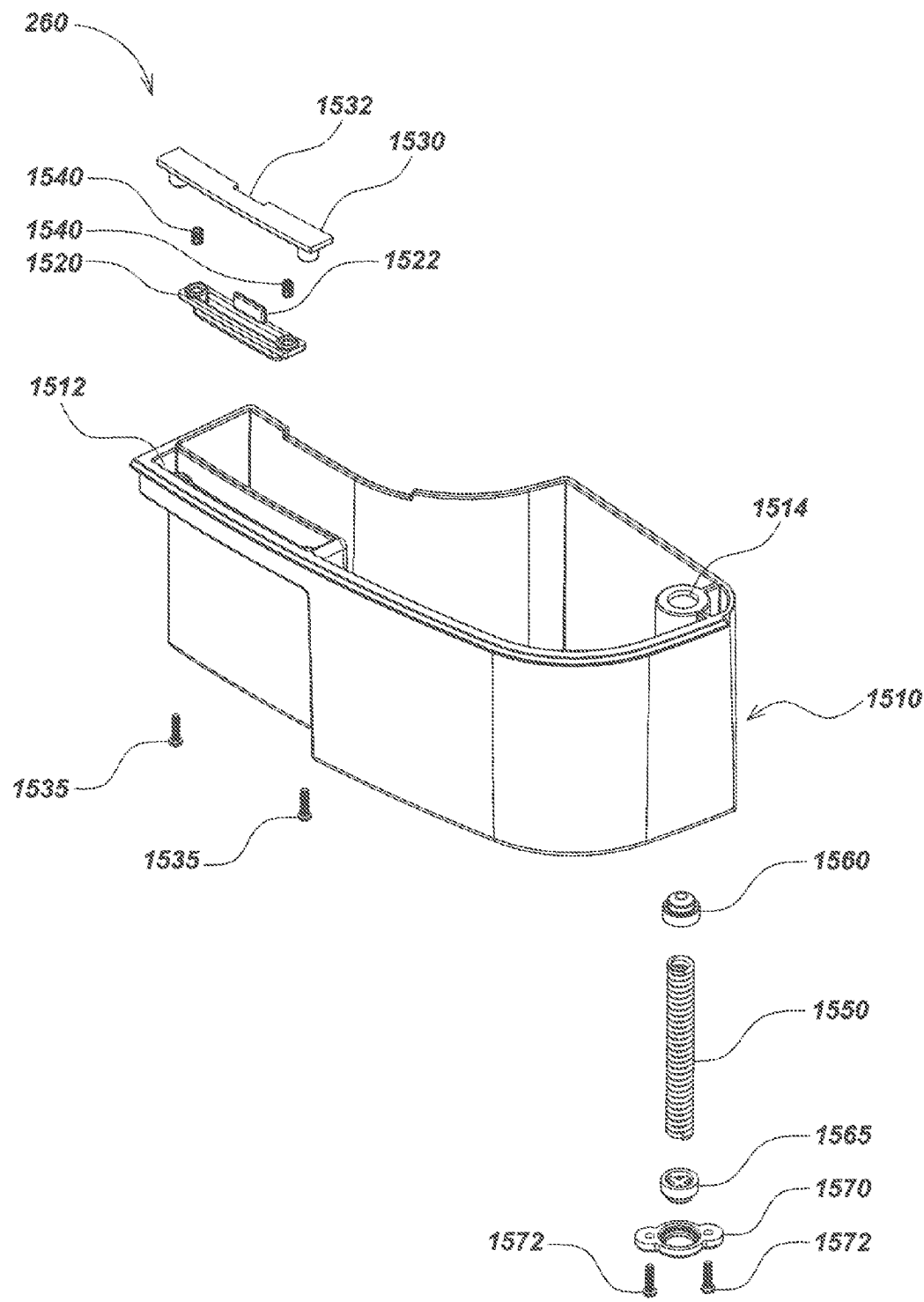
FIG. 15 is a top down exploded view of a storage drawer embodiment.

Referring to FIG. 15, each storage drawer 260 may include a drawer element 1510 that may allow for storage of tools and/or other items. Each drawer element 1510 may further be formed with a latch release pocket 1512 on its front face with a central opening formed along the bottom thereof and a hinge component pocket feature 1514 formed along the corner of the drawer element 1510. The latch release pocket 1512 may accommodate a latch punch element 1520 such that a narrow bottom section on the latch punch element 1520 may protrude through the central opening formed through the bottom of the latch release pocket 1512. The latch punch element 1520 may be further formed with a punch section 1522 that may stick upwards along a section of the top surface of the latch punch element 1520. A latch punch retainer element 1530 may secure to the top of the latch release pocket 1512 so as to encapsulate the latch punch element 1520 within. A set of punch retainer element screws 1535 may secure the latch punch retainer element 1530 in place. When in use, a user may press on the narrow bottom section of the latch punch element 1520 made to protrude through the central opening on the latch release pocket 1512 moving the latch punch element 1520 upwards. When made to move upwards, the punch section 1522 of the latch punch element 1520 may pass through an opening 1532 formed on the latch punch retainer element 1530 and release the latch element 1430 (illustrated in FIG. 14A) and allow the storage drawer 260 to open. When released, the latch punch element 1520 may return via a restoring force provided by the small springs 1540 positioned between the latch punch element 1520 and the latch punch retainer element 1530.

Still referring to FIG. 15, the hinge component pocket feature 1514 may be formed to accommodate a long hinge spring 1550 with a top pivot element 1560 and a bottom pivot element 1565 secured about the respective ends thereto. A hinge component retainer element 1570 may secure to the drawer element 1512 about the bottom of the hinge component pocket feature 1514 via hinge retainer screws 1572 and hold the hinge spring 1550 with top pivot element 1560 and bottom pivot element 1565 secured within. The top opening of the hinge component pocket feature 1514 and opening on the hinge component retainer element 1570 may be dimensioned to allow a section of the top pivot element 1560 and bottom pivot element 1565 respectively to pass through while still containing the remainder of the hinge spring 1550 with top pivot element 1560 and bottom pivot element 1565 secured in place.

Figure 16:
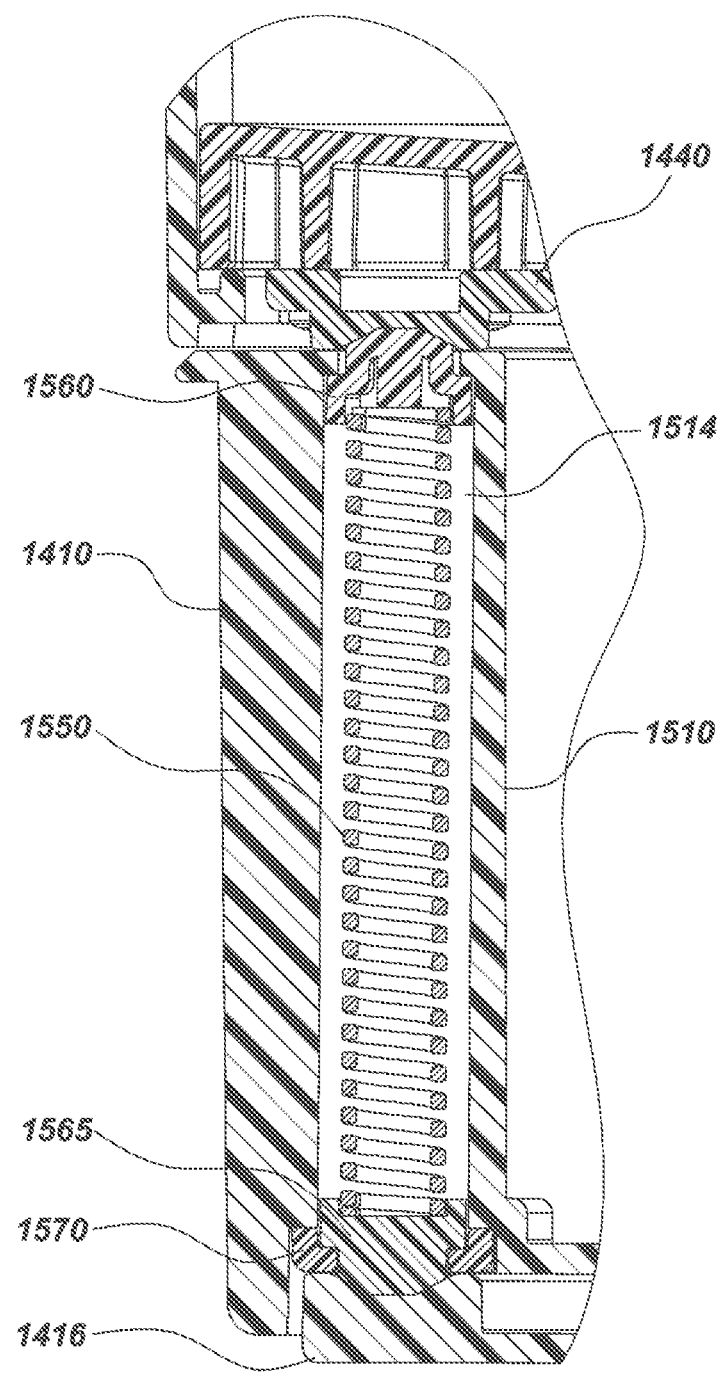
FIG. 16 is a sectional view along line 16-16 of the embodiment of FIG. 4.

As illustrated in FIG. 16, the bottom pivot element 1565 of each drawer element 1510 may secure within a divot formed within the bottom surface of the drawer slots 1416 on the core tray element 1410. The top pivot element 1560 of each drawer element 1510 may secure within the hinge retainer element 1440 secured to the top corner of the drawer slots 1416. In use, the hinge spring 1550 may be made to compress and allow the storage drawer 260 (FIG. 14B) to be removed.

Figure 17:
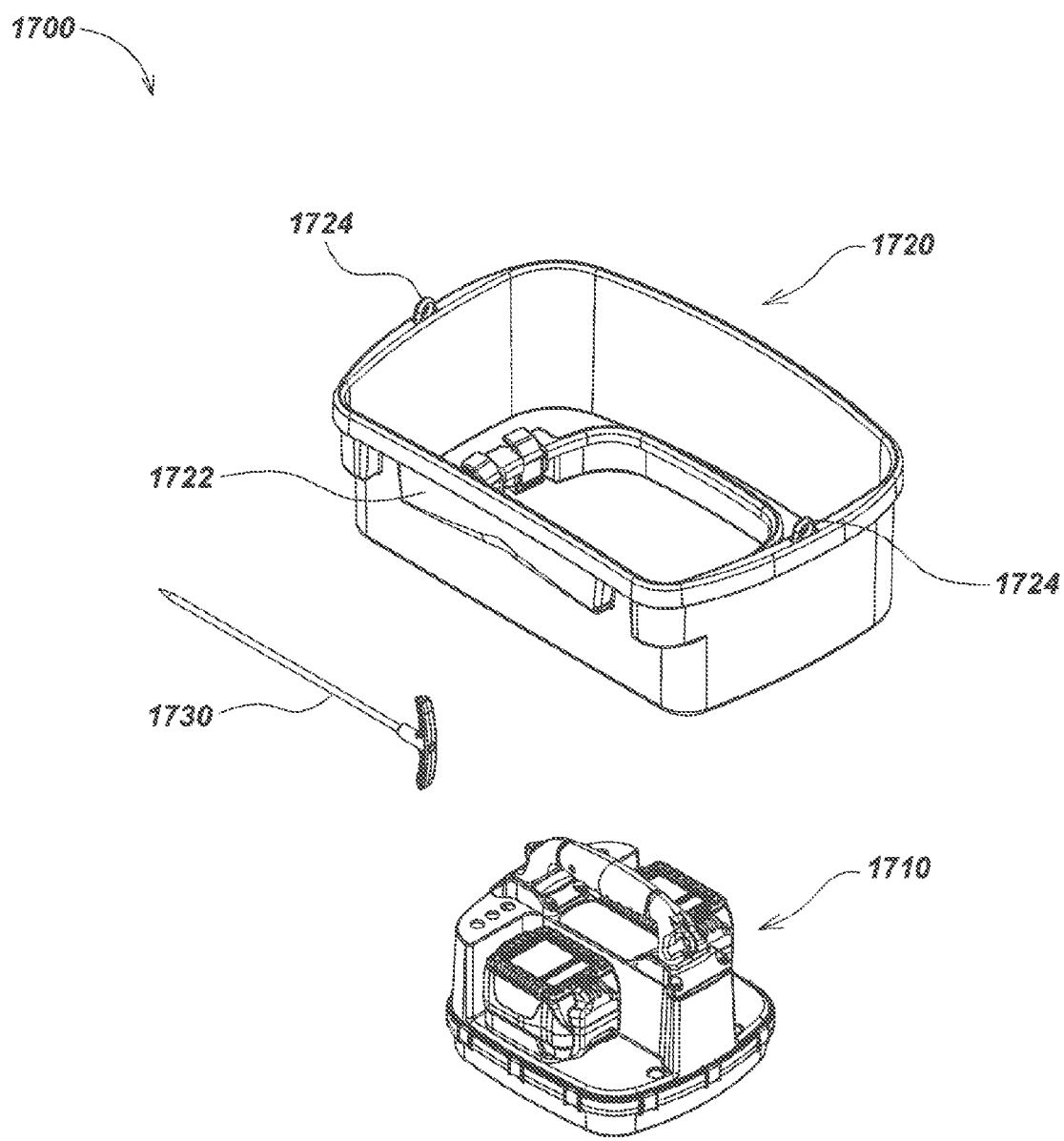
FIG. 17 is an alternative embodiment of a transmitter device with dockable tray apparatus.

Turning to FIG. 17, an alternative transmitter with dockable tray system embodiment 1700 is illustrated. The system embodiment 1700 may include a small transmitter element embodiment 1710 and low profile tray apparatus embodiment 1720. The transmitter element 1710 and tray apparatus 1720 may be similar to the transmitter element 110 and tray apparatus 120 of FIGS. 1-16 in function, with a reduced overall package size to increase portability for the user. In an embodiment such as the system embodiment 1700, the tray apparatus 1720 may reduce some features to allow for the reduced size. The tray apparatus 1720 may retain some features such as, but not limited to, a ground stake receptacle feature 1722, which may be similar in function and design to the ground stake receptacle element 235 of FIG. 2A, and used to transport a ground stake 1730. A shoulder strap mounting element 1724 may also be retained to accommodate the use of a shoulder strap, such as the shoulder strap 250 illustrated in FIG. 2A.

Figure 18:
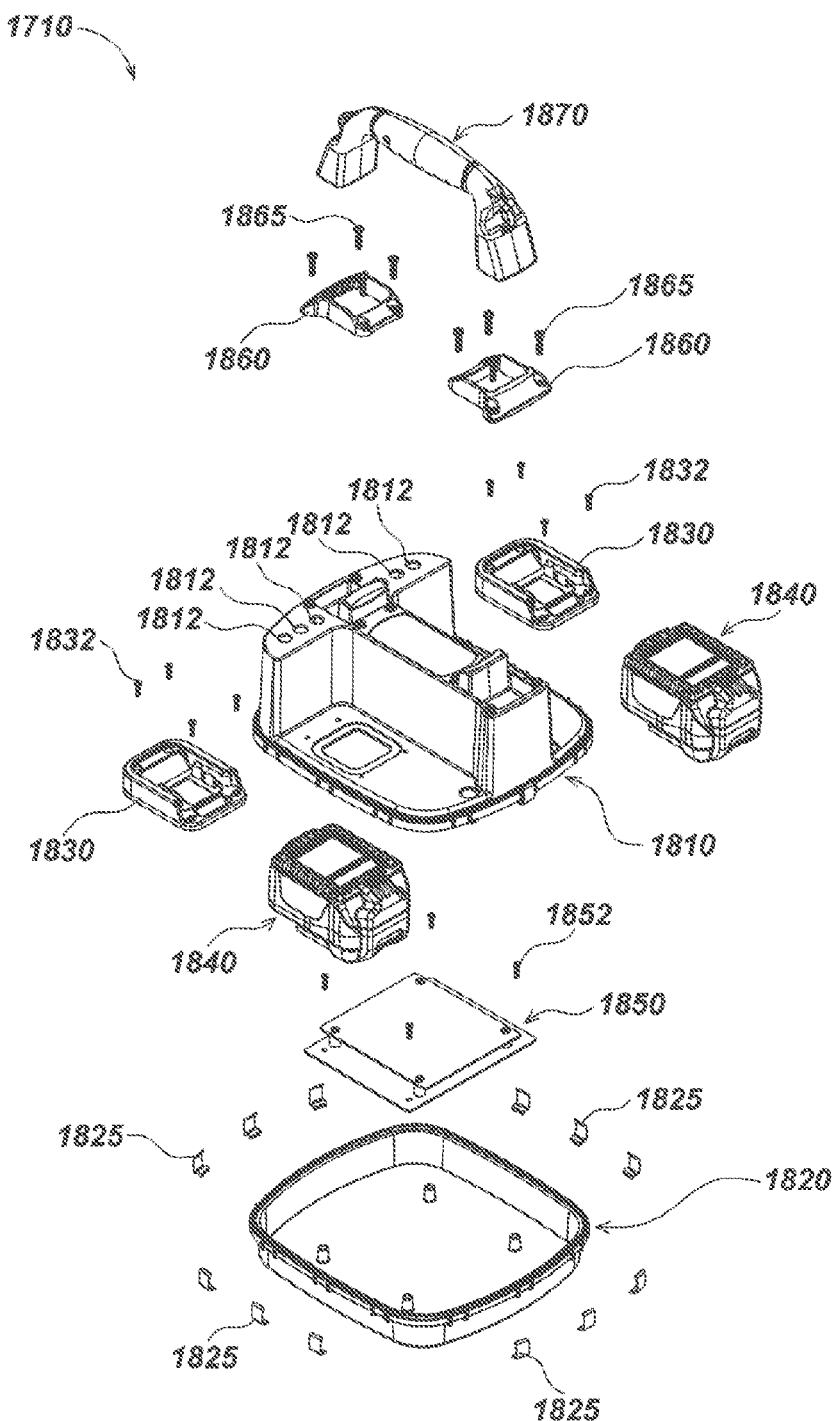
FIG. 18 is a top down exploded view of the transmitter device embodiment illustrated in FIG. 17.

Turning to FIG. 18, the transmitter element 1710 may include a top shell half 1810 and a bottom shell half 1820. The top shell half 1810 may include a series of accessory device and clamp jacks 1815, whereby a series of clamps and other accessory devices (as described in previous paragraphs) may be connected to the transmitter element 1710. Electrical power and/or data link communication may be established with the transmitter element 1710 through such accessory device and clamp jacks 1815.

Still referring to FIG. 18, in assembly a series of clips 1825 may secure the top shell half 1810 and the bottom shell half 1820 together. Two battery terminals 1830 may secure to the top surface of the top shell half 1810 by a series of battery terminal screws 1832. In use, one or more batteries, such as batteries 1840, may connect to the transmitter device 1710 through the battery terminals 1830 and be used to power the transmitter device 1710 and/or other attached accessories/devices.

For example, in an exemplary embodiment, the battery may be an intelligent battery configured the same as or similarly to those disclosed in U.S. patent application Ser. No. 13/532,721 entitled MODULAR BATTERY PACK APPARATUS, SYSTEMS, AND METHODS filed Jun. 25, 2012, the content of which is incorporated by reference herein. In alternative embodiments, a different quantity or type of batteries may be used. Some embodiments may also include indicators, for instance audible or visual indicators, to indicate available power left on batteries. Some such embodiments may include individual indicators for each battery. The batteries 1840 may electrically connect to a PCB stack 1850 within the transmitter device 1710. The PCB stack 1850 may secure within the bottom shell half 1820.

Various electronic components, processor(s), and/or sensors not illustrated in FIG. 18 may be included in the PCB stack 1850 to allow the transmitter element 1710 to directly and/or indirectly induce signals onto conductors such as buried utility lines. Some such sensors may include, but are not limited to, inertial sensors, GNS, gyroscopic sensors, and compass sensors. Such embodiments may be configured to determine a transmitter device's own location and/or determine and/or track the relative location of other enabled system devices, such as enabled utility locators.

Still referring to FIG. 18, two handle mount elements 1860 may secure to the top of the top shell half 1810 by a series of handle screws 1865 so as to attach a handle 1870 about the top of the transmitter device 1710. The handle 1870 may aid in ease of transport of the transmitter device 1710 and/or overall transmitter with dockable tray embodiment 1700. In assembly, each of the handle mount elements 1860 may be positioned about the bottom of the handle 1870 such that, when attached to the top shell half 1810 of the transmitter device 1710, the bottom section of the handle 1870 may be secured by a lip on the handle mount element 1860 and secure the handle 1870 in place.

Figure 19:
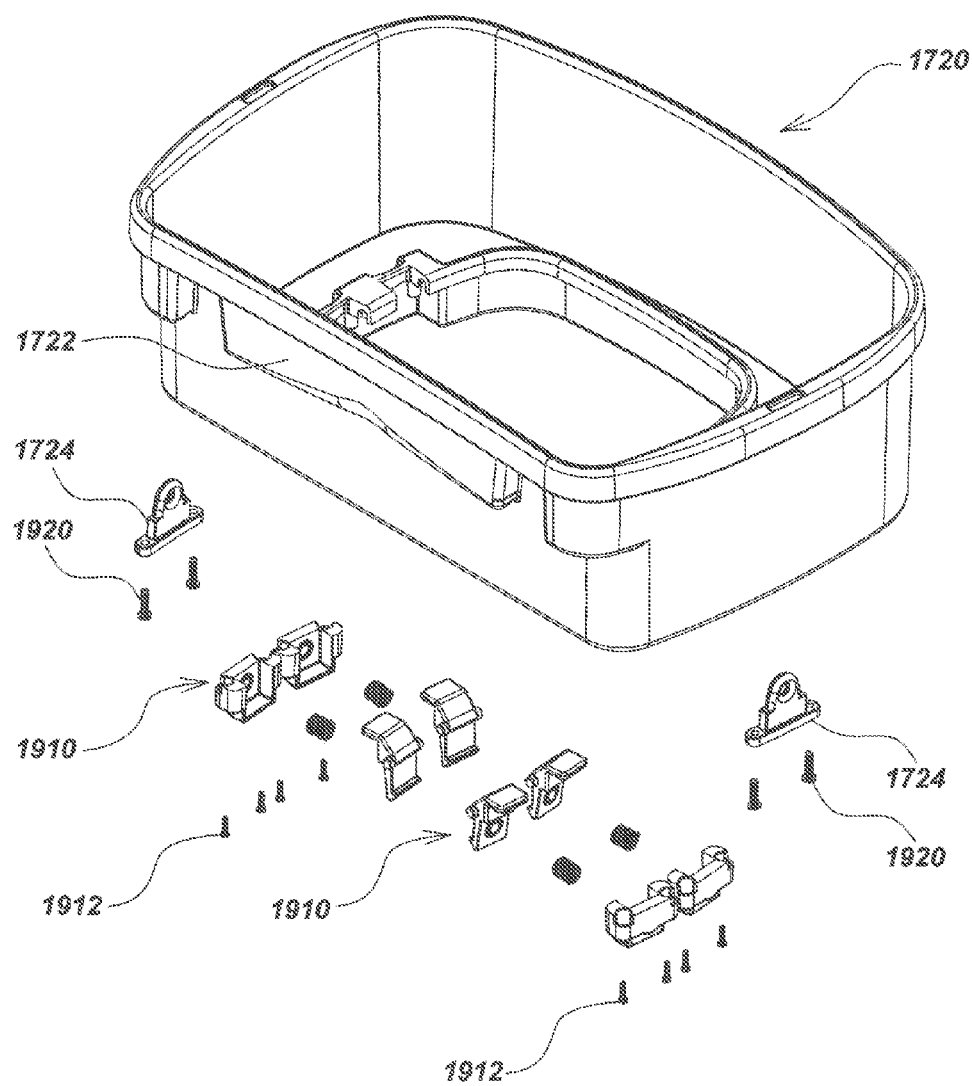
FIG. 19 is a top down exploded view of the tray apparatus embodiment illustrated in FIG. 17.

Turning to FIG. 19, a latch mechanism 1910 may attach within the central opening within the tray apparatus 1720 and be secured in place by a series of latch mechanism screws 1912. The latch mechanism 1910 may be similar in design and function to the latch mechanism 410 described in relation to the embodiments of FIGS. 4 through 5B. A series of shoulder mounting element screws 1920 may be used to secure the shoulder strap mounting element 1724 in place.

Turning to FIG. 20, details of one embodiment of a transmitter element 2010, which may correspond with transmitter element 110 of FIG. 1 or transmitter element 1710 of FIG. 17, is illustrated. Transmitter element 2010 may be mechanically and/or electrically coupled to a removable dockable tray 2080, which may be in accordance with any of the previously disclosed dockable tray apparatus embodiments or their equivalents. Transmitter element 2010 may be mechanically and/or electrically or wirelessly coupled to various transmitter system accessories such as, for example, intelligent or non-intelligent output current clamps, intelligent or non-intelligent batteries, external devices such as utility locators, cellular phones, tablet devices, notebook computers, other electronic computing devices, mobile base stations, and the like. Intelligent clamps are output current clamps that include sensors and processing elements along with associated analog and digital electronics and mechanical elements for structure, supports, and attachment to utilities. For example, an intelligent inductive clamps may include sensors to measure current and voltage parameters of provided output signals, time and/or position reference modules, such as GPS modules or other time or location modules, wired or wireless communications interfaces, such as serial wired communication modules and/or wireless data communications modules such as Bluetooth, Zigbee, 802.11 (WiFi), and the like. Intelligent batteries may include various functions such as are described in the incorporated applications.

In an exemplary embodiment as shown, transmitter element 2010 may include one or more processing elements to provide overall operational management of the transmitter and associated functions, as well as, in some embodiments, signal processing and/or control functions. The processing module may be coupled to or may be integral with one or more memory modules 2025, in which data, instructions or code, and/or other information may be stored. The memory modules may comprise one or more physical memory devices. The transmitter element may include one or more wireless data communications modules 2040 to provide data communications via external devices, such as, for example, associated locators, intelligent clamps, mobile base stations, cellular phones, tablet devices, notebook computers, and/or other electronic computing systems and devices. The transmitter element may include one or more timing/location modules 2050 to provide location and/or timing information. For example, module 2050 may include a receiver module 2052, such as a GPS, GLONASS, Galileo, or other location receiver device, which may also provide time synchronization data. Timing information provided from the module 2052 (e.g., GPS receiver) may be provided as an output 2055 to a timing reference module 2056, which may use the timing information to generate output signals for use a time reference or "heartbeat" or for phase synchronization between the transmitter and other devices, such as associated utility locators.

The transmitter element 2010 may include a battery dock or interface 2092, which may, for example, be an intelligent battery interface to allow coupling of one or more intelligent batteries 2090. The dock and/or intelligent batteries may be intelligent or "Lucid" batteries as described in the related applications. The battery dock or interface may provide output power and/or signals, such as data on battery condition, battery control signals, switching information, viral data or code transfer (e.g., as described in the related applications), and the like. In some embodiments, two intelligent batteries may be dynamically switched in or out depending on battery state or condition. Intelligent batteries may also be synchronized in operation with internal rechargeable batteries 2093, such as to allow charging of an internal battery from an external intelligent battery.

The transmitter element may include one or more ground connection interfaces 2035 to provide a ground connection to the soil or other ground at a site at which a locate is being done. The ground output may be via a clamp or other direct ohmic ground connection. The transmitter element 2010 may include one or more output current signal modules 2030, which may include analog and/or digital electronics to generate output current signals at desired frequencies, amplitudes, phase angles, and waveforms and switching cycles. In transmitter element 2010 there are three output current signals shown, however, various embodiments may include fewer or more output current signals, and the output current signals may be provided separately at the same or different frequencies, such as described subsequently with respect to FIG. 22, or two or more signals may be combined, such as described subsequently with respect to FIG. 23.

In some embodiments, an intelligent clamp interface module 2032 may be included to provide an interface to an intelligent clamp so as to receive and/or send information between the intelligent clamp and transmitter element, as well as to supply power to the intelligent clamp. The transmitter element may also include an anti-theft module 2092, which may include or be coupled to a motion or tilt sensor to provide a signal indicating movement of the transmitter element. For example, in one embodiment, a tilt sensor may be used to indicate motion of the transmitter element to the processing module 2020. If this motion occurs when the transmitting element is in a fixed location or in storage or in a state where movement is undesired, an alarm or other theft indication, such as a buzzer, lights, paging signal, text message, or other signaling may be provided to a user to indicate possible theft. The transmitter element may also include a user interface module to receive user inputs (e.g., in the form of a keypad, mouse, magnetically sensed user interface device, joystick, switches, and the like) and provide user outputs, such as on a display or via lights or audible indications. User interface functions such as inputs or output information may also be provided via the wireless data communications module 2040, such as to external devices such as cellular phones, tablets, computers, or associated locators or mobile base stations. Accessories 2083, such as clamps and the like as described herein, may be attached or stored in the tray accessory 2080 during either transportation or operation of the transmitting system.

Figure 21:
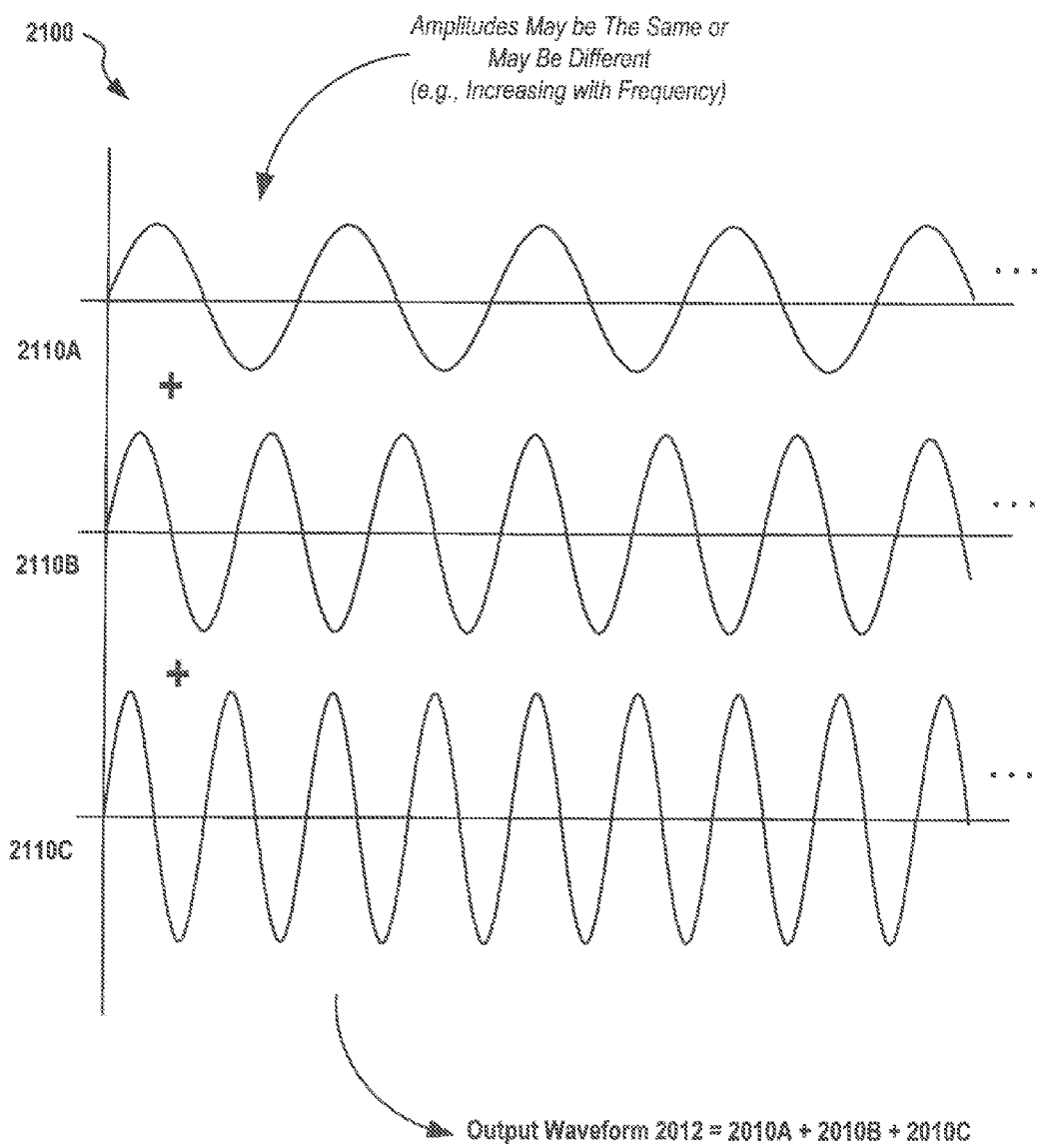
FIG. 21 illustrated details of one embodiment of multi-frequency waveform generation.

As noted previously herein, in some embodiments, output current signals may be provided at multiple frequencies on either a single output current channel or multiple channels, and via either direct or indirect coupling clamps. FIG. 21 illustrates details 2100 of one embodiment of multi-frequency output signal waveform generation. In this example embodiment, signals at three frequencies, denoted as 2110A, 2110B, and 2110C are generated, such as in a processing element in the form of a digital signal processor (DSP) or other processing device and converted from digital to analog form in an analog-to-digital converter (A/D). Two or more of the resulting signals at different frequencies may then be added together to form combined signal 2012, and may then be further processed, such as via amplification, filtering, and the like, before being provided to an output current clamp (direct or indirect).

In some embodiments, multiple output current signals may be provided. Generation of output current signals as shown in FIG. 21, with multiple frequency signals combined to generate a single output current signal, may be used. Further, in embodiments of transmitter elements with multiple outputs, different combinations of output frequency signals may be provided on different output. For example, a first output may include the set of three frequencies as shown in FIG. 21, wherein as a second output may include a set of three different frequencies. These frequencies may, for example, be selected from a table of frequencies, such as the frequency tables shown in FIG. 25 and FIG. 26.

Figure 22:
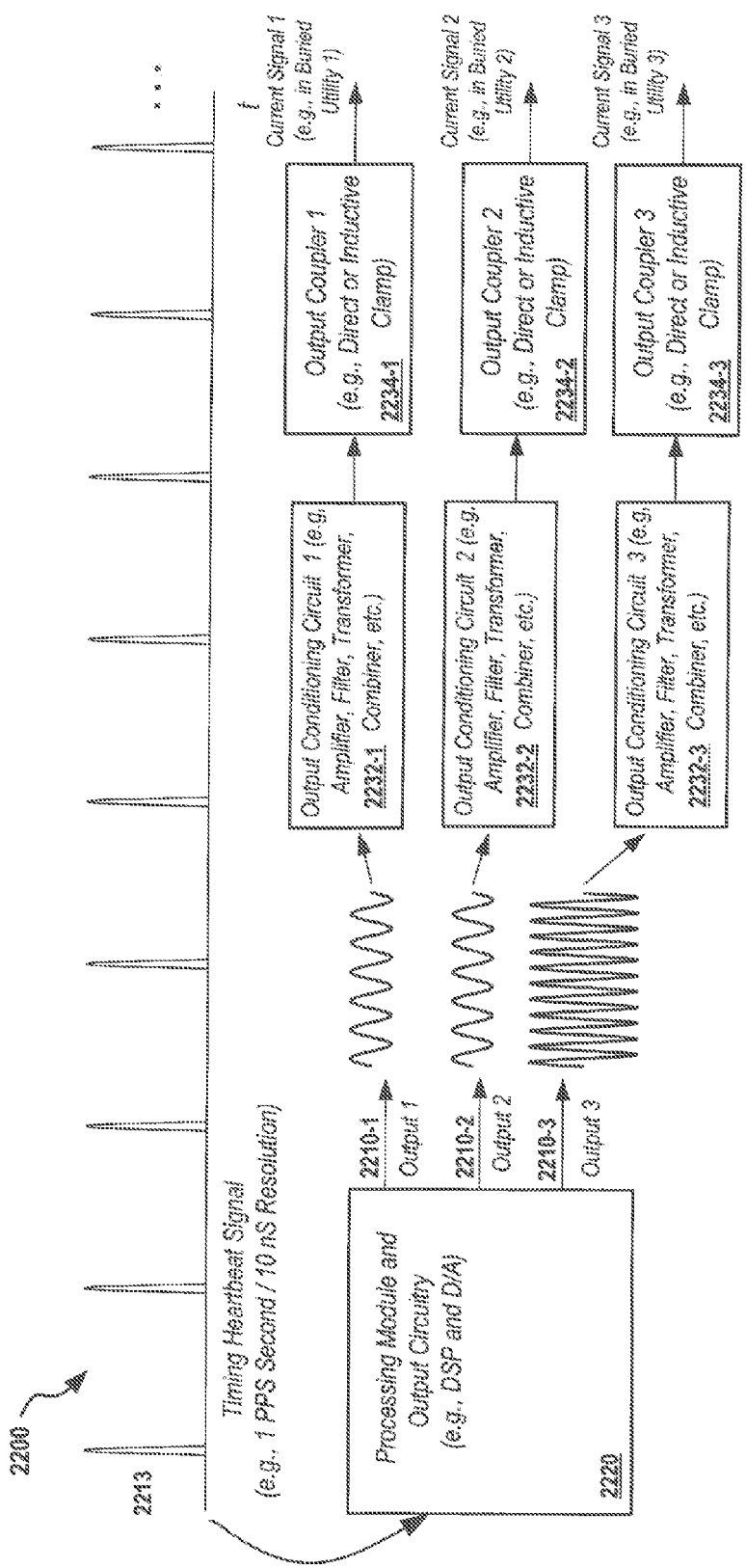
FIG. 22 illustrates details of one embodiment of multi-output current signal generation from a transmitter element.

FIG. 22 illustrates details of one embodiment of apparatus 2200 for providing a plurality of output current signals from a transmitting element at three different frequencies to three different outputs. It is noted that, in some embodiments, that two or more of the output signals may be provided at the same frequency rather than at the three different frequencies as shown, and that fewer or more than three output signals may be provided in various embodiments.

In operation, a timing or heartbeat signal 2213 may be generated in the transmitting element, such as in the location/timing module 2050 as shown in FIG. 20 of transmitting element 2010. This timing signal may be used by a processing module and output circuitry 2220 to generate output signals in particular time slots, such as described previously herein. The outputs 2210 may then be provided to output conditioning circuits 2232 and output couplers 2234, with the resulting current signals then flowing in one or more utilities.

Figure 23:
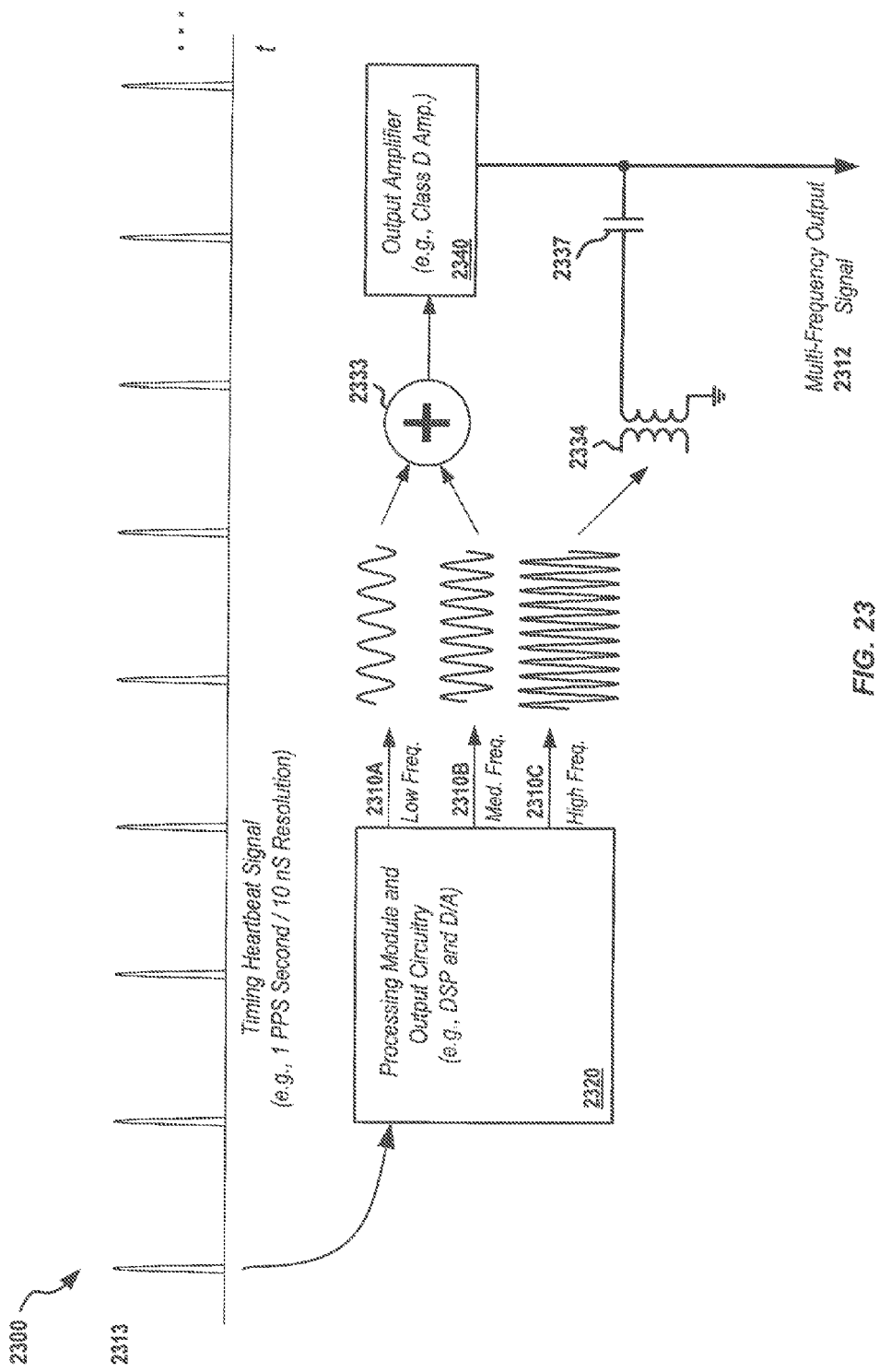
FIG. 23 illustrated details of one embodiment of multi-frequency output current signal generation from a transmitter element.

FIG. 23 illustrates details of another embodiment of an apparatus 2300 for providing multi-frequency output current signals from a transmitting element. In operation, a timing or heartbeat signal 2313 may be generated in the transmitting element, such as in the location/timing module 2050 as shown in FIG. 20 of transmitting element 2010. This timing signal may be used by a processing module and output circuitry 2320 to generate output signals, which may be in particular time slots at different frequencies, such as described previously herein. Two or more of the outputs 2310 may be combined and provided to an output coupling element, such as an inductive clamp. For example, low frequency and medium frequency signals 2310A and 2310B may be added together in a summing device 2333 and then provided to an output amplifier 2340. High frequency signal 3210C may be coupled, via coupling transformer 2334 and capacitor 2337, or other coupling elements, to the amplifier 2340 output, with the resulting multi-frequency output current signal 2312 provided to an inductive clamp for application to a utility. It is noted that the amplitudes of the various component signals in either embodiment 2200 or 2300 may be different. For example, the amplitudes of the output signals may increase with frequency as shown in FIG. 23, with the higher frequency signal having a substantially larger amplitude that the lower frequency signals (the lower frequency signals may be constrained in amplitude for, for example, safety reasons.

Figure 24:
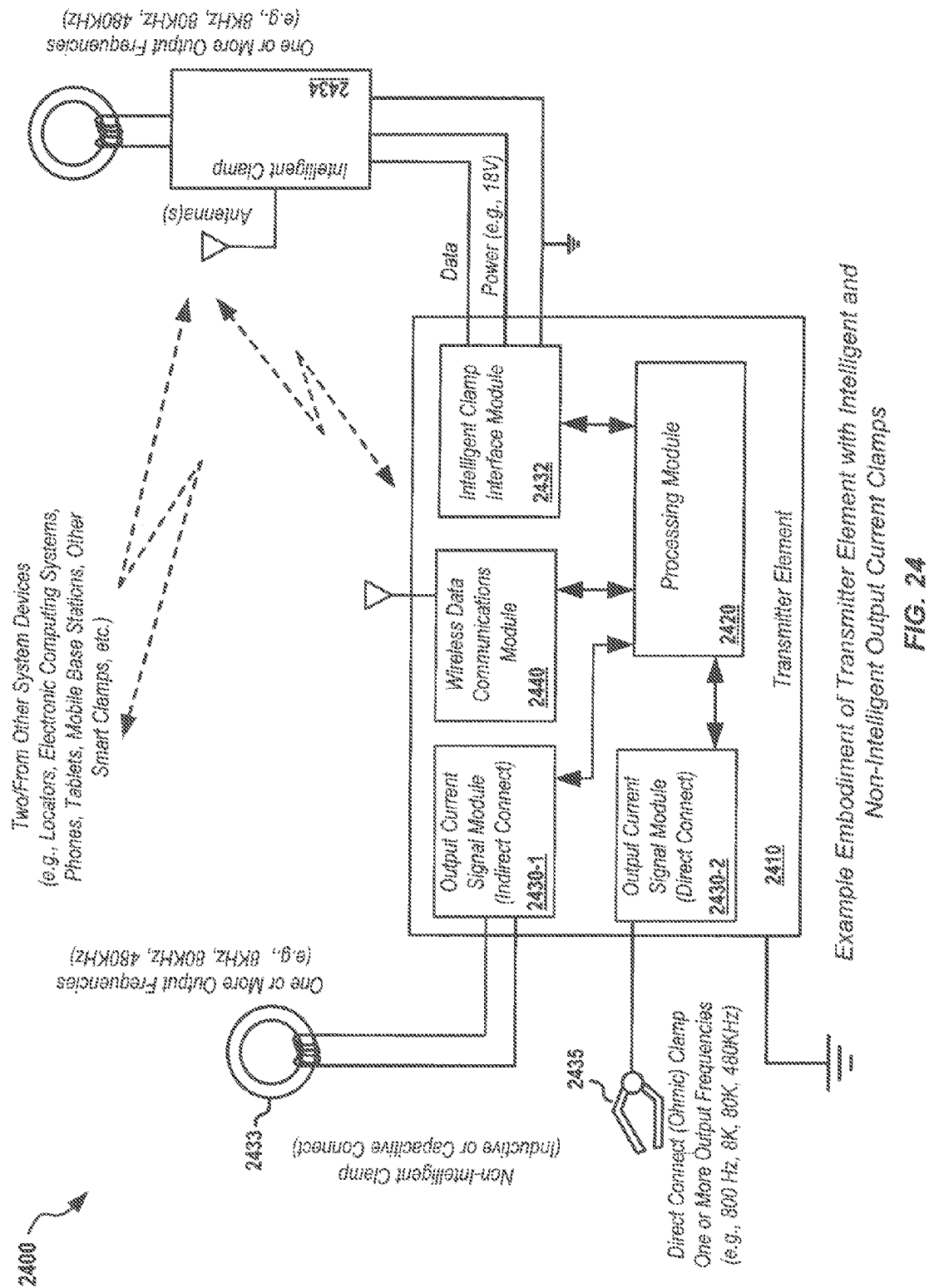
FIG. 24 illustrates details of one embodiment of a transmitter element with intelligent and non-intelligent clamps for coupling output current to a utility.

FIG. 24 illustrates details of an embodiment 2400 of a transmitter element 2410, which may correspond with transmitter elements as previously described herein, coupled to both an intelligent and a non-intelligent output current clamp, as well as a non-intelligent ohmic (direct connect) clamp.

Transmitter element 2410 may include various modules such as described herein including, for example, an output current signal module for indirect (e.g., inductive) connections 2430-1, to which a non-intelligent inductive clamp 2433 may be coupled, as well as a direct connect clamp 2435 and associated direct connect signal module 2430-2 for providing a direct ohmic physical output current connection. Signals may be provided on these clamps at one or more frequencies, during the same or alternate slots, and/or at the same or different amplitudes. Example operating frequencies may be in the 800 Hz range, the 8 KHz range, the 80 kHz range, and the 480 kHz range, although other frequencies or combinations of frequencies may be used in various embodiments.

The transmitter element 2410 may also be coupled, via an intelligent clamp interface module 2432, to one or more intelligent clamps 2434. These intelligent clamps may include analog and/or digital electronics and sensors to generate and communicate data or information between the intelligent clamp 2434 and either the transmitter element 2410 or external devices, such as associated utility locators, tablets, cellular phones, notebook computers, other electronic computing systems, and/or mobile base stations. Intelligent clamp 3434 may include an antenna and a wireless data communications module (not shown) to wirelessly send or receive data from other devices, such as the transmitter element and any associated utility locators.

A processing module 2420 may be used to provide signal processing, control, and overall operations functions for the transmitting element. One or more wireless data communications modules 2440 may be included to communicate with intelligent clamps or other devices, such as associated utility locators, smart phones, tablets, notebook computers, other electronic computing systems, and/or mobile base stations.

Figure 26:
FIG. 26 illustrates details of one embodiment of a multi-frequency output current frequency table for use in environments with 50 Hz power.

FIGS. 25 and 26 illustrate embodiment of an example frequency table for multi-frequency transmitter operation as may be used with the various multi-frequency embodiments described previously herein. The frequencies in table 2500 are selected so as to avoid harmonics from 60 Hz power, but various other frequencies may be used in alternate embodiments. Similarly, the frequencies in table 2600 are selected so as to avoid harmonics from 50 Hz power, but various other frequencies may be used in alternate embodiments. The color coding is standards-based for particular utility types, and the lower four rows of the table are for sondes or induction usage.

Table 2500 was derived based on the following constraints: 1) Avoid odd harmonics +/−30 Hz, avoid even harmonics +/−10 Hz; 2) Keep Medium direct connect frequencies just under the 9 kHz FCC limit for unlimited power; 3) Cluster frequencies, including sonde and induction frequencies, as close together as possible (e.g., 20 Hz spacing) to narrow mixer ranges and filtering ranges for output circuits; 4) Keep the very high frequencies (for US, 60 Hz use) under 490 kHz.

Table 2600 was derived based on the following constraints: 1) Avoid odd harmonics +/−26 Hz, avoid even harmonics +/−8 Hz; 2) Cluster frequencies, including sonde and induction frequencies, as close together as possible (e.g., 16 Hz spacing) to narrow mixer ranges and filtering ranges for output circuits; 3) Keep the very high frequencies (for 50 Hz world use) under 133 kHz.

In an example operation, unique frequencies are used for particular utility types. For example, inductive clamp #1 or direct connect #2 may be set to the "Electric" frequencies and might broadcast one or more (or all) of the frequencies shown in the table (e.g., Table 2500 or 2600). GPS phase-locking and time synchronization, as well as use of higher voltages at higher frequencies, may also be used in various embodiments.

In the keeping with the present disclosure, spacing between chosen frequencies may be determined in a variety of ways and/or using a variety of frequency selection schemes. In some such frequency selection schemes, spacing of frequencies may be determined by a mathematical formula. In yet further embodiments, may be preset and/or chosen by the user and/or determined by the device/apparatus.

Figure 27:
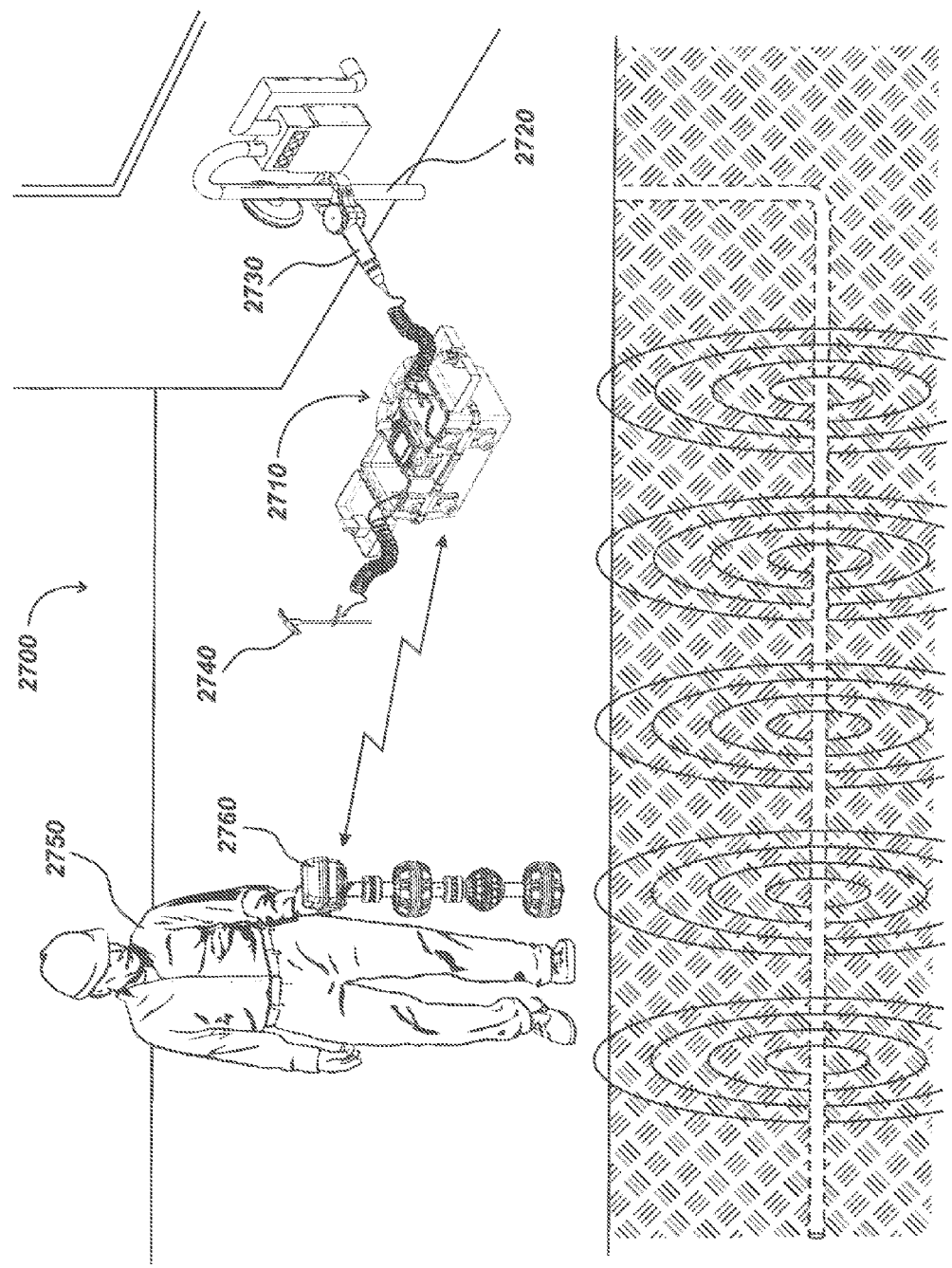
FIG. 27 is an illustration of a system using an alternative embodiment of a transmitter and tray device with a locator embodiment.

Turning to FIG. 27, an exemplary embodiment of a locating system 2700 which includes a transmitter and tray device 2710 in conjunction with a locator 2760 is shown. The transmitter and tray device 2710 may be configured to generate current signals to be provided to hidden or buried utilities to induce electromagnetic signals onto a conductor (s), such as the utility line 2720, which is typically buried underground or otherwise at least partially hidden from direct access. In use, a clamp 2730, which may be a smart clamp as described previously herein may physically attach to the utility line 2720. The clamp 2730 may be connected to the transmitter and tray device 2710 via a cord or cable. A grounding stake 2740 may further be connected to the transmitter and tray device 2710 via a cord or cable and used for grounding for instance, when the transmitter and tray device 2710 is used in a direct connect mode. A user 2750 equipped with a corresponding utility locator, such as locator device 2760 as shown, which is configured to sense the emitted magnetic field signal(s) associated with current flow in the utility 2720, may then determine information associated with the buried utility 2720, such as depth, position, location, orientation, conductor current, soil condition, presence of other utilities, and the like. The locator 2760 may further include or be communicatively coupled to a GPS system (not shown in FIG. 27) as described subsequently herein. The GPS system may include a combined GPS and sonde antenna array, a GPS receiver, and sonde driver circuitry and power supplies.

Figure 28:
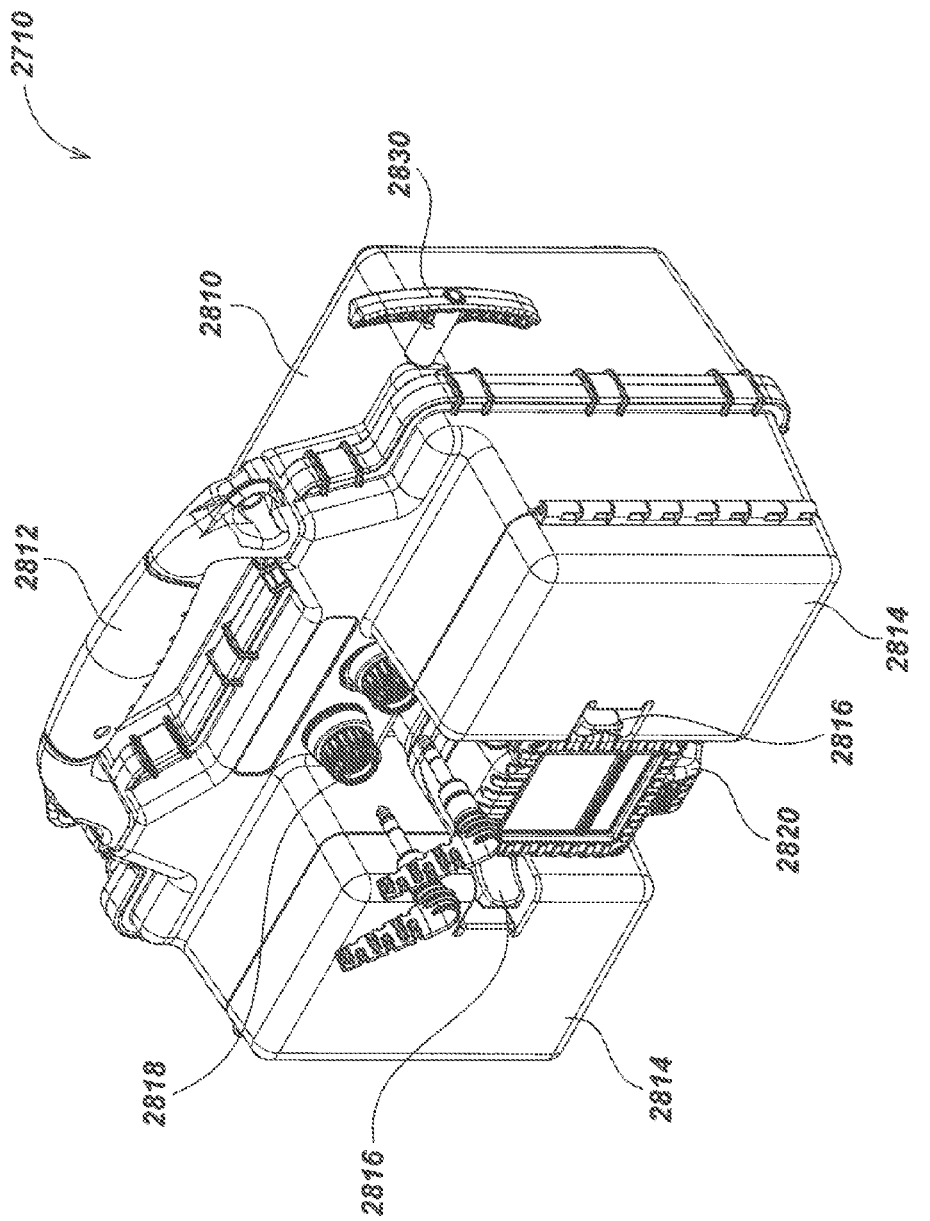
FIG. 28 is an isometric view of the transmitter and tray device from FIG. 27.
Figure 29:
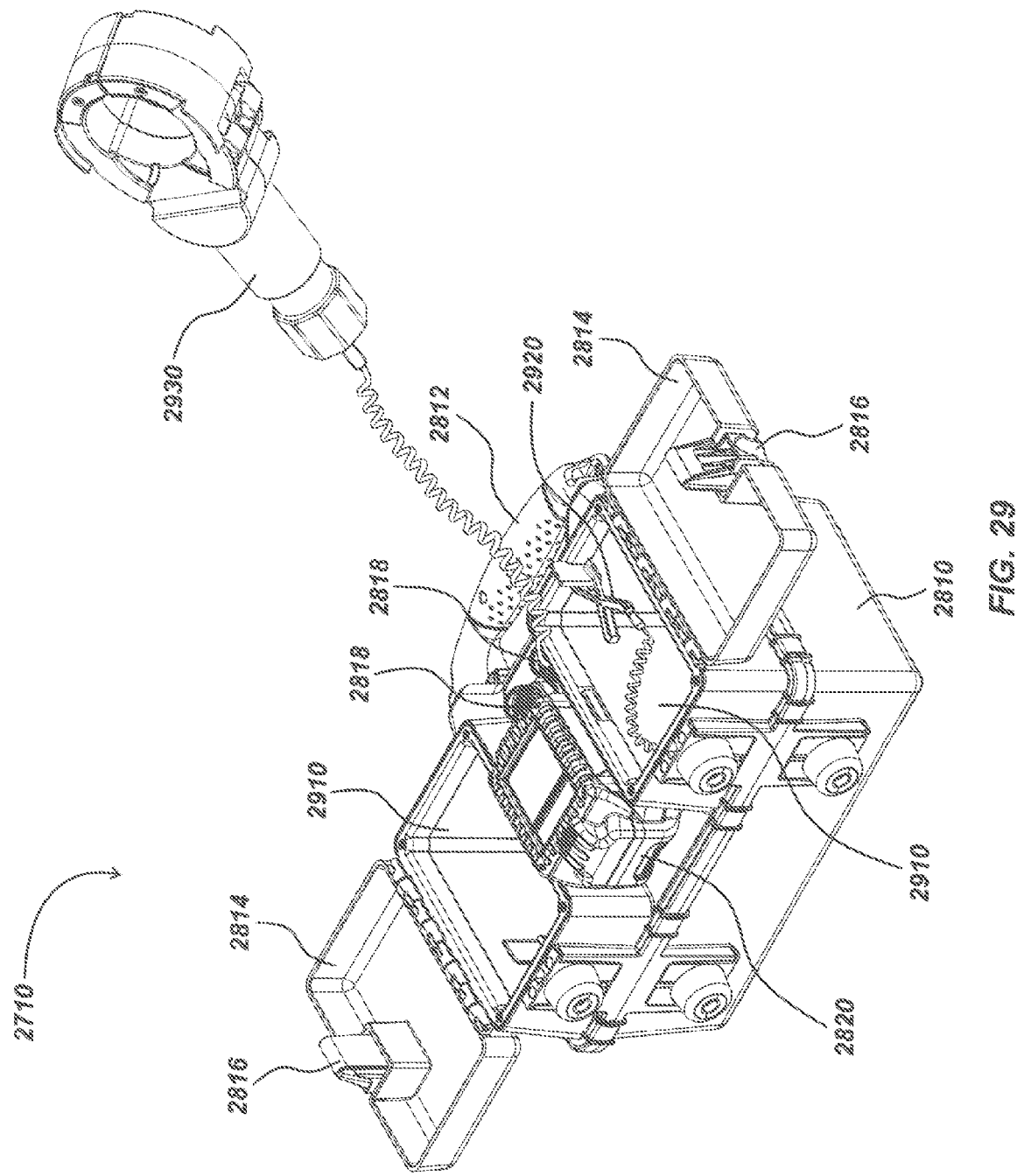
FIG. 29 is an isometric view of the transmitter and tray from FIG. 27 with stowage ports opened and clamps attached.

Turning to FIGS. 28 and 29, the transmitter and tray device 2710 may further be comprised of a substantially lunchbox shaped body 2810. The device body 2810 may further be formed with a handle feature 2812 and transparent stowage port doors 2814 along the front. The transparent stowage port doors 2814 may be configured to open as illustrated in FIG. 29 by release the latch mechanisms 2816. One or more clamp and peripheral interface connectors 2818 may be located centrally above a rechargeable battery 2820. In an exemplary embodiment, the battery may be an intelligent battery configured similarly to those disclosed in U.S. patent application Ser. No. 13/532,721 entitled MODULAR BATTERY PACK APPARATUS, SYSTEMS, AND METHODS filed Jun. 25, 2012, the content of which is incorporated by reference herein in its entirety. As illustrated in FIG. 28, a grounding stake 2830 may attach to the top of the transmitter and tray device 2710 and be secured thereto in transport and storage. Magnets (not illustrated) may be used to secure the grounding stake 2830 in place.

Figure 30:
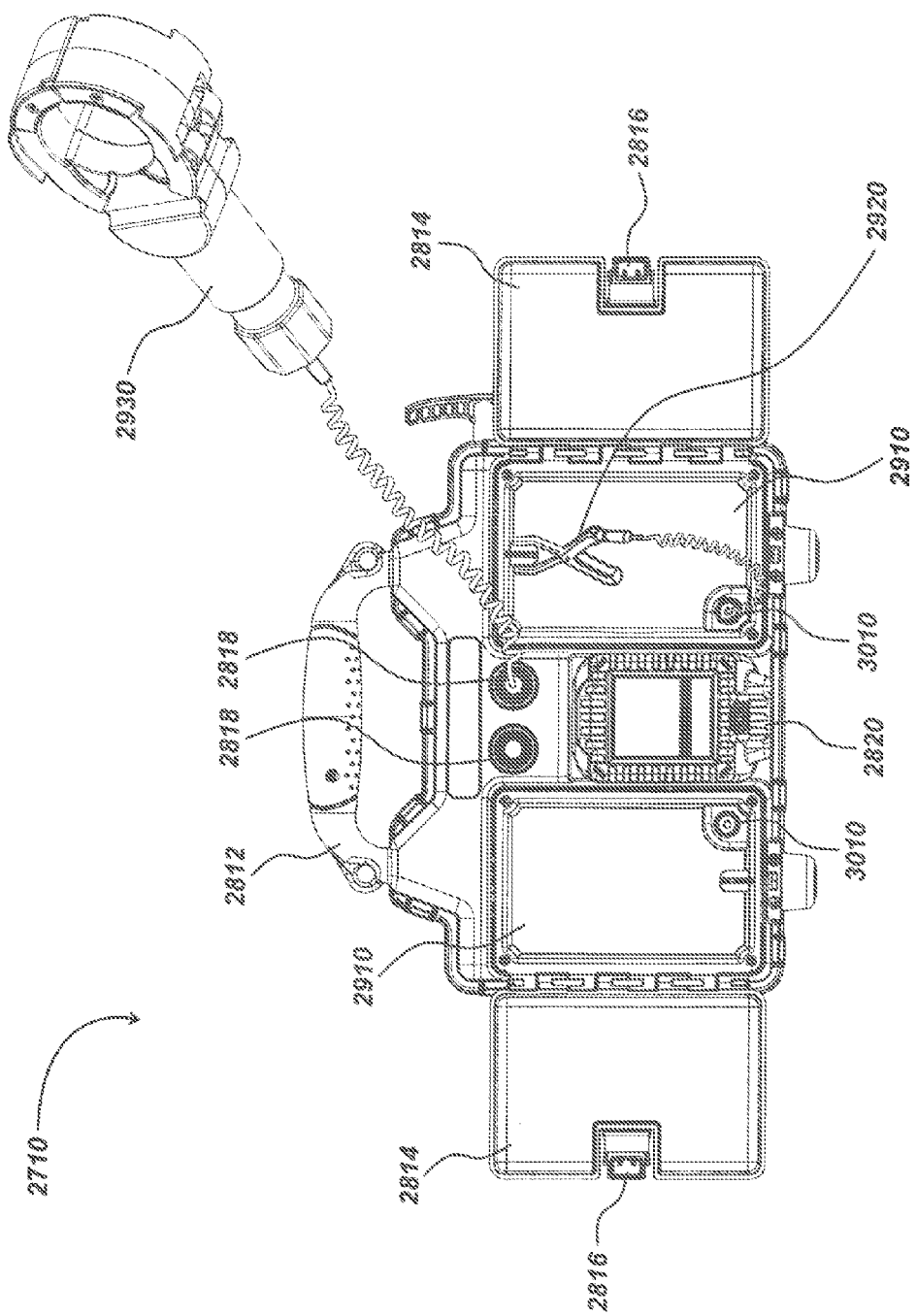
FIG. 30 is a side view detailing the inside of the stowage ports.
Figure 31:
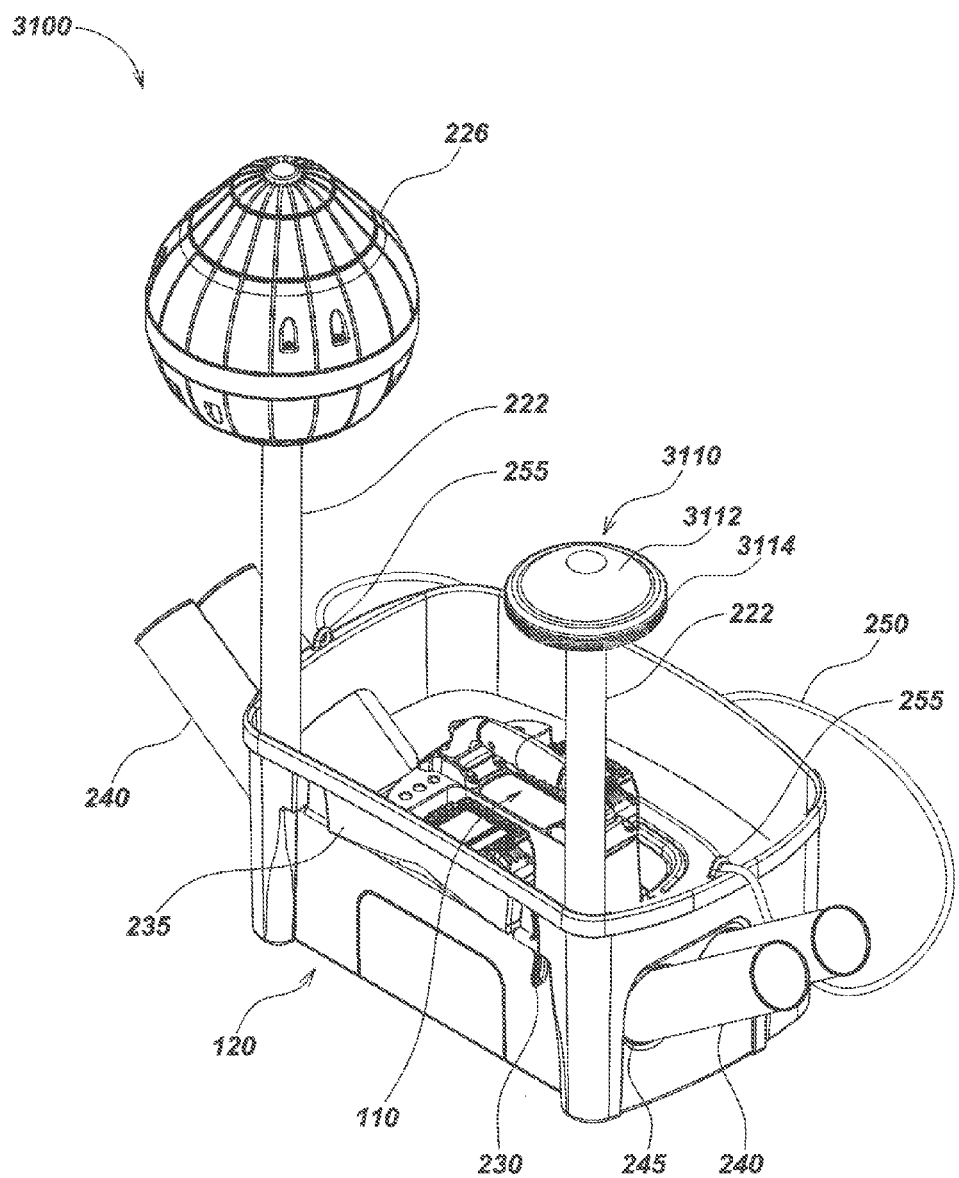
FIG. 31 illustrates details of an alternate embodiment of a transmitter device including a GPS and sonde antenna.
Figure 32:
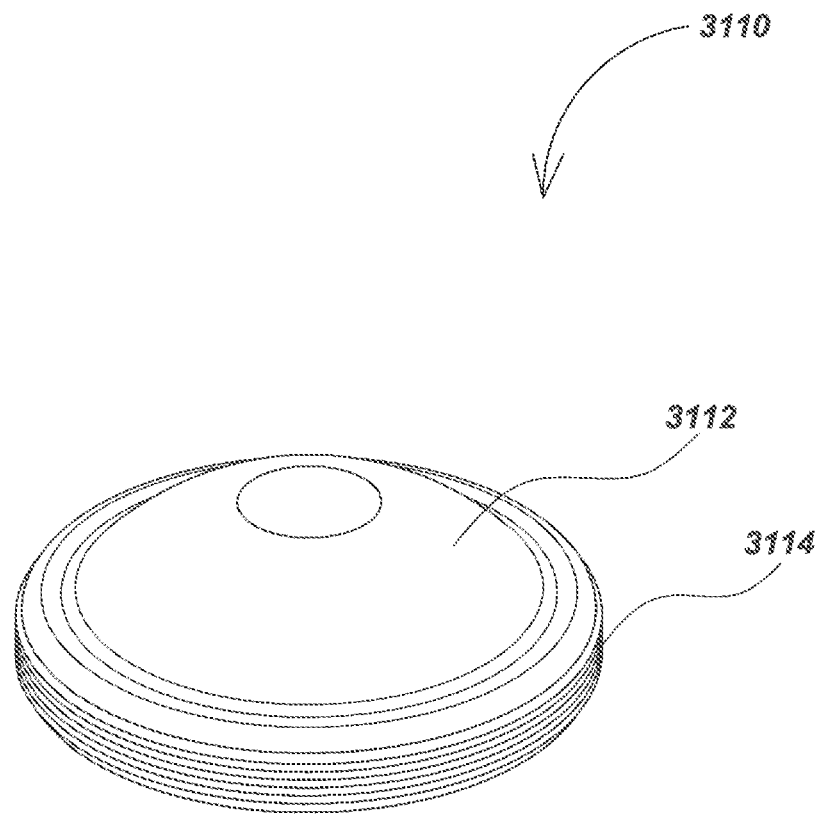
FIG. 32 illustrates details of an embodiment of a GPS and sonde antenna array.

Turning to FIGS. 29 and 30, stowage ports 2910 may be accessed on the transmitter and tray device 2710 when stowage port doors 2814 are opened. The stowage ports 2910 may be used, for instance, for cable and tool storage. More terminals for connecting additional clamps and/or other peripheral devices may be configured within the stowage ports 2910 such as the stowage port interface connectors 3010 illustrated in FIG. 30. A direct connect clamp 2920 may connect to such one of the stowage port interface connectors 3010. The transmitter and tray device 2710, as illustrated in FIGS. 29 and 30, show an intelligent clamp 2930 connected to one of the clamp and peripheral interface connectors 2818. In other embodiments, inductive clamps and associated elements, such as, for example, are described in co-assigned U.S. Provisional Patent Application Ser. No. 61/859,718, entitled INDUCTIVE CLAMP DEVICES, SYSTEMS, AND METHODS, may also be used with a transmitter and tray device such as that shown in FIGS. 27-30.

As described previously herein, in some embodiments a GPS system or other location or positioning system may be communicatively coupled to a locator and/or transmitter. In an exemplary embodiment, a GPS system including a GPS and sonde antenna array, a GPS receiver, and associated elements including a GPS receiver module and power supply may be used to provide data for generating a precise location, in reference coordinates such as latitude, longitude, and/or altitude or depth, of a buried utility or object. If the GPS antenna is located separately from the locator, such a configuration may be used to provide both accurate GPS location data and relative distance data between the GPS system antenna and the locator so that an absolute location of a buried utility can be determined, displayed on a locator display, stored in a memory for future use, and/or transmitted to other locate system elements or to external computing systems or databases.

Figure 33:
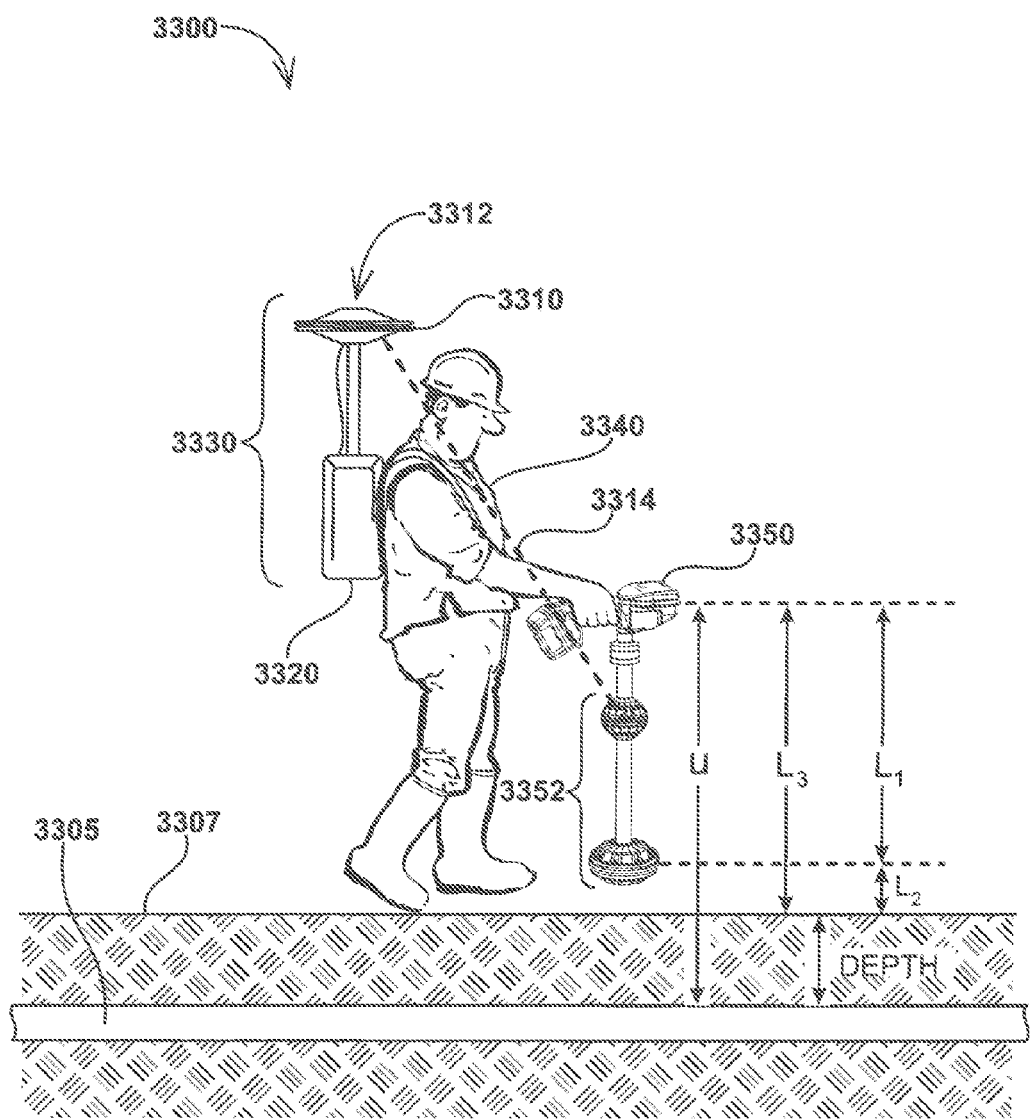
FIG. 33 illustrates details of an embodiment of a locator system with a GPS and sonde system.

An example embodiment of such a configuration is shown in system embodiment 3300 of FIG. 33. In this embodiment, a user 3340 has a GPS sonde system 3330 with a combined GPS and sonde antenna array 3310 and associated electronics 3320, such as a GPS receiver, sonde power supply and driver circuitry, and the like. This system may be worn on the back of a user 3340 or elsewhere on the user or positioned on the ground, another object, on a vehicle, and the like. Satellite or other positioning system signals 3312 may be received by the antenna array 3310, and sonde magnetic field signals 3314 may be sent by the array 3310 and received by omnidirectional antenna arrays of locator 3350. Locator 3350 may also receive magnetic field signals from buried utility or object 3305. A GPS receiver module in electronics 3320 may be used to determine reference location information, such as in latitude/longitude/altitude coordinates or in other coordinates or data forms, and this information may be provided to the locator system 3350.

Electronics, such as in one or more processing elements of locator 3350, may determine a distance L1 between the buried utility 3305 and a reference position on the locator 3350 based on the positioning of the locator antenna array element 3352. Additional elements in the locator 3350 (not shown), such as an optical or acoustic ground tracker module or other distance measuring elements may be used to determine the distance L3 between the locator 3350 and the ground surface 3307, and the distance L2 of the locator 3350 above the ground may be determined by subtracting L4 (a known length of the locator) from L3.

In addition, the locator 3350 may similarly determine relative distance information between the reference position on the locator and the GPS antenna 3310 phase center (either based on a shared GPS antenna phase center and sonde centroid or a known offset between the two). This relative distance information may then be used in the locator (and/or post-processed) to determine an offset of the buried utility location relative to the reference coordinates determined by the GPS receiver.

Figure 34A:
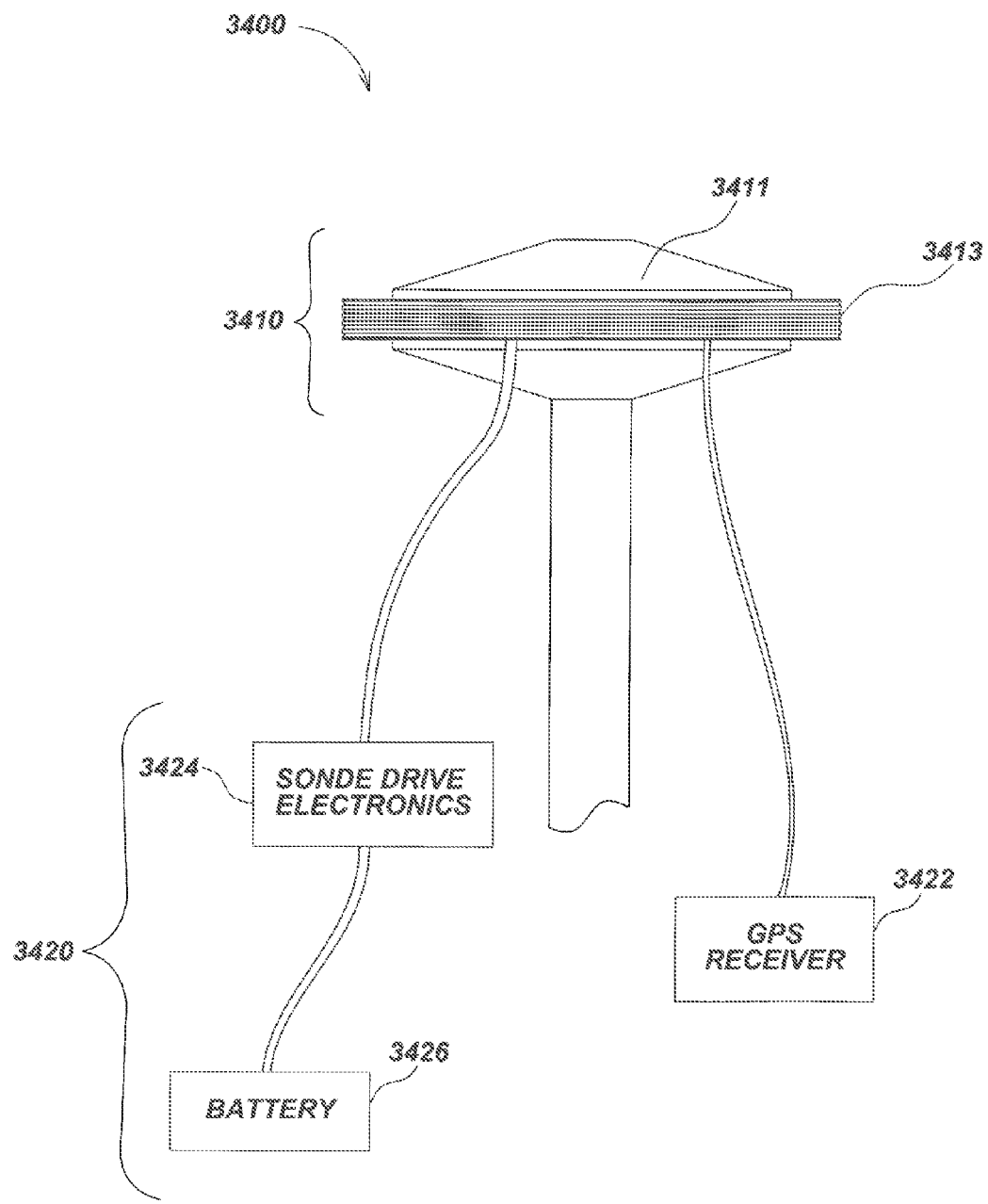
FIGS. 34A and 34B illustrate details of an embodiment of a GPS and sonde antenna array.

FIG. 34A illustrates details of one embodiment of a GPS and sonde system 3400 from a side view, which may correspond with GPS sonde system 3300 of FIG. 33. As shown in FIG. 34A, a GPS and sonde antenna array 3410 may include a GPS disk, puck, or patch-type antenna element 3411 and a sonde antenna element 3413 that are integral with or coupled to each other in a fixed, known orientation. In an exemplary embodiment the GPS antenna coil center or centroid is at substantially the same point in space as the sonde antenna centroid, however, in other embodiments the two may be offset at a known distance and orientation relative to each other. Electronics 3420 may include sonde drive circuitry 3424 and/or a power supply, such as a battery 3426, which may be an intelligent battery as described previously herein or another battery or power supply module. The electronics may additionally include one or more GPS receiver modules 3422 for determining a reference position relative to the GPS antenna phase center. In addition the electronics may include a wired or wireless communications module (not shown) for sending the reference position information from the GPS and sonde system 3400 to an associated locator (e.g., such as the locator 3350 of FIG. 33).

Figure 34B:
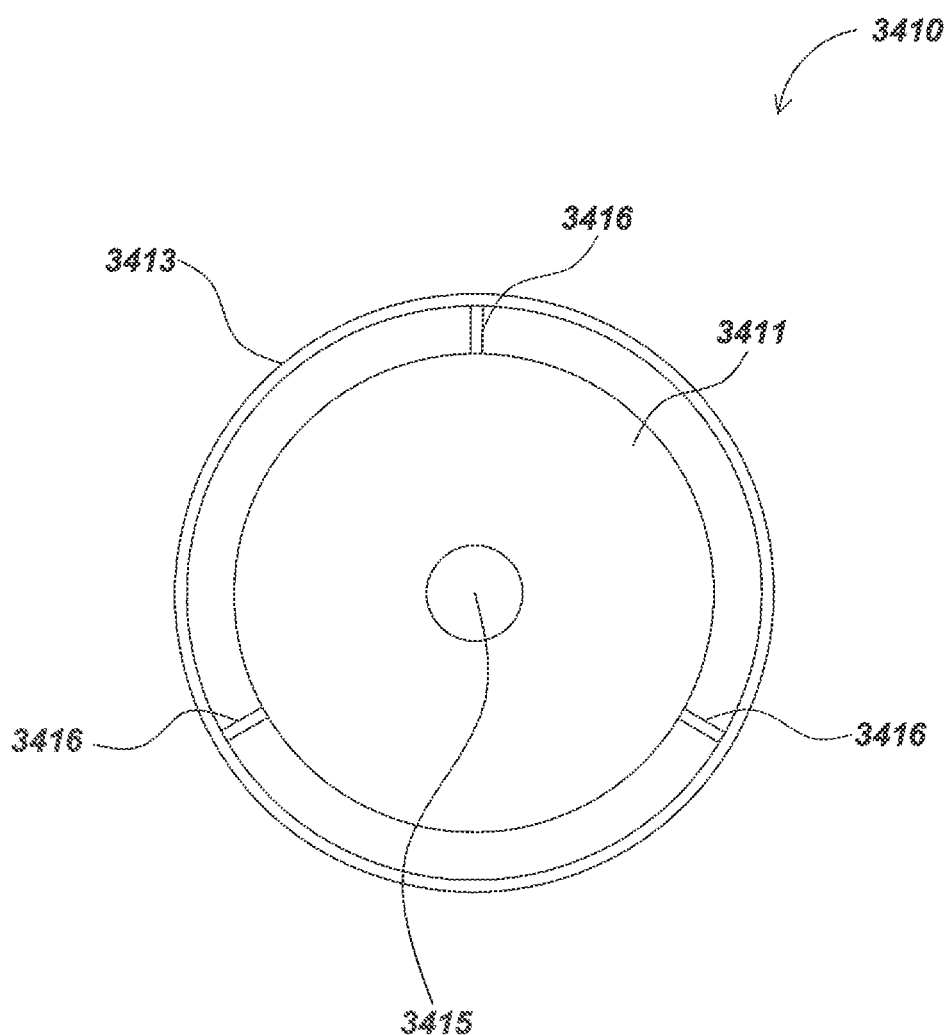

FIG. 34B illustrates additional details of an exemplary embodiment of the GPS and sonde antenna array 3410 from a top view. As shown in FIG. 34B, a sonde coil 3413, having coils wound circularly around the circular-shaped GPS antenna element 3411, may be fixedly coupled to GPS antenna element 3411 so that the GPS antenna phase center and sonde coil centroid share substantially the same point in space at point 3415. Spacers or other connection mechanisms may be used to mechanically join elements 3411 and 3413, or they may alternately be integral with or otherwise coupled to each other in a fixed orientation.

In one or more exemplary embodiments, the functions, methods, and processes described may be implemented in whole or in part in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media The various illustrative functions, modules, and circuits described in connection with the embodiments disclosed herein with respect to locator signal processing and/or transmitter signal switching and output signal generation and coupling, control functions, data communication functions, wireless communications functions, and/or other functions described herein may be implemented or performed in one or more processing elements or modules with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The presently claimed invention is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of a, b, or c" is intended to cover: a; b; c; a and b; a and c; b and c; and a, b and c.

The previous description of the disclosed aspects is provided to enable any person skilled in the art to make or use embodiments of the presently claimed invention. Various modifications to these aspects will be readily apparent to those skilled in the art, and the generic principles defined herein may be applied to other aspects without departing from the spirit or scope of the disclosure and presently claimed invention. Thus, the invention is not intended to be limited to the aspects shown herein but is to be accorded the widest scope consistent with the appended Claims and their equivalents.

We claim:

1. A transmitter system for providing current to a utility when performing a locate operation, comprising: a body or frame; a transmitter element for generating an output current for provision to the utility so as to generate a corresponding magnetic field for detection by a utility locator; a GPS antenna and a GPS receiver operatively coupled to the GPS antenna to generate positional information about a position of the transmitter system and store the positional information in a memory of the transmitter system; a tray apparatus configured to be removably dockable to the body or frame of the transmitter system, the tray apparatus including one or more mounting elements for securing the GPS and/or omnidirectional induction antennas to the tray; and an omnidirectional induction antenna operatively coupled to the transmitter element to generate an three-dimensional magnetic field signal for inducing current into a buried conductive utility.

2. The system of claim 1, wherein the tray apparatus includes one or more container holders including a paint canister receptacle feature configured to hold one or more spray paint cans.

3. The system of claim 1, wherein the GPS and/or omnidirectional antennas include an antenna mast, and wherein the antenna mast is removably attached to the tray apparatus or a body or frame of the transmitter system.

4. A transmitter system for providing current to a utility when performing a locate operation, comprising: a body or frame; a transmitter element for generating an output current for provision to the utility so as to generate a corresponding magnetic field for detection by a utility locator; a tray apparatus, including a ground stake receptacle element, configured to be removably dockable to the body or frame of the transmitter system; a GPS antenna and a GPS receiver operatively coupled to the GPS antenna to generate positional information about a position of the transmitter system and store the positional information in a memory of the transmitter; and an omnidirectional induction antenna operatively coupled to the transmitter module to generate an three-dimensional magnetic field signal for inducing current into a buried conductive utility; wherein the ground stake receptacle element comprises one or more magnets and an area of the apparatus is formed or molded to receive a ground stake.

5. The system of claim 1, wherein the tray apparatus further comprises one or more storage drawers.

6. A transmitter system for providing current to a utility when performing a locate operation, comprising: a body or frame; a transmitter element for generating an output current for provision to the utility so as to generate a corresponding magnetic field for detection by a utility locator; a tray apparatus, including a ground stake receptacle element, configured to be removably dockable to the body or frame of the transmitter system a GPS antenna and a GPS receiver operatively coupled to the GPS antenna to generate positional information about a position of the transmitter system and store the positional information in a memory of the transmitter and an omnidirectional induction antenna operatively coupled to the transmitter module to generate an three-dimensional magnetic field signal for inducing current into a buried conductive utility wherein the transmitter system includes one or more latch mechanisms to removably couple the tray apparatus to the body or frame of the transmitter system.

7. A transmitter system for providing current to a utility when performing a locate operation, comprising: a transmitter element for generating an output current for provision to the utility so as to generate a magnetic field for detection by a utility locator; a tray apparatus configured to be removably dockable to the transmitter element or a body or frame of the transmitter system; wherein the transmitter system includes one or more latch mechanisms to removably couple the tray apparatus to a body or frame of the transmitter system; and wherein the latch mechanisms include a latch element, a spring, and a spring retainer nubbin formed on the body of the tray apparatus.

8. The system of claim 1, wherein the transmitter element comprises a top shell half and a bottom shell half, and wherein the top shell half includes one or more clamp jacks.

9. The system of claim 1, further comprising a direct connect clamp.

10. The system of claim 9, wherein the direct connect clamp is electrically coupled to the transmitter element through an accessory device clamp jack.

11. A transmitter system for providing current to a utility when performing a locate operation, comprising: a transmitter element for generating an output current for provision to the utility so as to generate a magnetic field for detection by a utility locator; a tray apparatus configured to be removably dockable to a body or frame of the transmitter system; and a direct connection clamp; wherein the direct connection clamp includes a polarization indicator.

12. A transmitter system for providing current to a utility when performing a locate operation, comprising: a transmitter element for generating an output current for provision to the utility so as to generate a magnetic field for detection by a utility locator; a tray apparatus configured to be removably dockable to a body or frame of the transmitter system; and a direct connection clamp; wherein the direct connection claim includes a utility type selector.

13. The system of claim 1, wherein the transmitter element provides a plurality of output current signals.

14. The system of claim 13, wherein the plurality of output current signals includes three or more signals and the three or more signals are simultaneously provided as outputs.

15. The system of claim 14, wherein the plurality of output current signals include signals provided in different time slots.

16. The system of claim 15, wherein the different time slots are at least partially non-overlapping.

17. The system of claim 15, wherein the different time slots of two or more of the plurality of output current signals overlap.

18. The system of claim 15, wherein the plurality of output current signals are provided t a plurality of different frequencies and the time slots are selected to provide an integral number of phases of each of the plurality of different frequencies.

19. The system of claim 15, wherein the plurality of output current signals are provided at the same frequency.

20. The system of claim 19, wherein the plurality of output current signals are provided in a plurality of time slots; wherein the plurality of time slots are at least partially non- overlapping.

21. The system of claim 1, wherein the transmitter element is configured to receive information from an associated locator defining nearest utility information, and generate output current signals to be supplied only the defined nearest utility.

22. The system of claim 1, wherein the transmitter element is configured to receive information from an associated locator defining one or more utility to which output current should be coupled, and generate output current signals to be supplied to the defined one or more utilities.

23. The system of claim 1, further comprising a GPS timing system module.

24. The system of claim 1, further comprising a cellular data communications system module.

25. The system of claim 1, further comprising a wireless data communications module configured to communicate with an associated utility locator via a wireless data communications link.

26. A transmitter system for providing current to a utility when performing a locate operation, comprising: a transmitter element for generating an output current for provision to the utility so as to generate a magnetic field for detection by a utility locator; a tray apparatus configured to be removably dockable to a body or frame of the transmitter system; an omnidirectional induction antenna operatively coupled to the transmitter element to generate an three-dimensional magnetic field signal for inducing current into a buried conductive utility based on the output current signal; and an anti-theft module configured to sense a motion of the transmitter system and generate an alarm response.

27. The system of claim 26, further including a wireless transmitter, wherein the alarm response is wirelessly transmitted to a corresponding utility locator.

\* \* \* \* \*